(12) United States Patent
Chong et al.

(10) Patent No.: US 10,225,412 B2
(45) Date of Patent: Mar. 5, 2019

(54) DEVICE AND METHOD FOR IMPLEMENTING DATA SERVICE

(71) Applicant: Huawei Technologies Co., Ltd., Shenzhen (CN)

(72) Inventors: Weiwei Chong, Shanghai (CN); Xiaobo Wu, Shanghai (CN); Shengze Zu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 55 days.

(21) Appl. No.: 15/429,495

(22) Filed: Feb. 10, 2017

(65) Prior Publication Data
US 2017/0155772 A1    Jun. 1, 2017

Related U.S. Application Data

(63) Continuation of application No. PCT/CN2014/084113, filed on Aug. 11, 2014.

(51) Int. Cl.
H04M 15/00    (2006.01)
H04W 76/30    (2018.01)
(Continued)

(52) U.S. Cl.
CPC ............ H04M 15/60 (2013.01); H04M 15/66 (2013.01); H04W 4/24 (2013.01); H04W 8/18 (2013.01);
(Continued)

(58) Field of Classification Search
CPC ...... H04M 15/66; H04M 15/39; H04M 15/60; H04M 15/8292; H04M 2215/14;
(Continued)

(56) References Cited

U.S. PATENT DOCUMENTS 9,331,913 B2 * 5/2016 Campbell ........... H04L 41/5029
9,749,306 B2 * 8/2017 Zhu .................... H04L 63/08
(Continued)

FOREIGN PATENT DOCUMENTS

CN    101374341 A    2/2009
CN    103139750 A    6/2013
(Continued)

OTHER PUBLICATIONS

"3rd Generation Partnership Project; Technical Specification Group Core Network and Terminals; Policy and Charging Control signalling flows and QoS parameter mapping; (Release 9)," 3GPP TS 29.213, V9.1.0, Technical Specification, Dec. 2009, 128 pages.

(Continued)

Primary Examiner — Michael J Moore, Jr.
(74) Attorney, Agent, or Firm — Conley Rose, P.C.

(57) ABSTRACT

A device and a method for implementing a data service in order to avoid generating an unnecessary data usage fee for user equipment (UE) and further avoid data usage waste after a data service switch of the UE is turned off. The method includes determining, by a first network-side device, a status of a data service switch of UE, and sending, by the first network-side device, a first notification message to a second network-side device when the data service switch of the UE is turned off, where the UE is already registered with a network, the first notification message includes first instruction information and an identity of the UE, and the first instruction information instructs the second network-side device to skip charging for data packets of the UE flowing through the second network-side device.

20 Claims, 18 Drawing Sheets

(51) Int. Cl.
*H04W 4/24* (2018.01)
*H04W 8/18* (2009.01)
*H04W 72/04* (2009.01)

(52) U.S. Cl.
CPC ..... *H04W 72/042* (2013.01); *H04W 72/0413* (2013.01); *H04W 76/30* (2018.02)

(58) Field of Classification Search
CPC ............. H04M 15/8214; H04W 88/16; H04W 72/0406; H04W 72/0493; H04W 4/24; H04L 41/5029
See application file for complete search history.

(56) References Cited

U.S. PATENT DOCUMENTS

| | | |
|---|---|---|
| 2011/0090801 A1 | 4/2011 | Oku et al. |
| 2014/0119242 A1* | 5/2014 | Campbell ............. H04M 15/39 370/259 |
| 2015/0074761 A1 | 3/2015 | Zhu et al. |
| 2015/0124763 A1 | 5/2015 | Yu et al. |
| 2015/0358483 A1* | 12/2015 | Jeong ................ H04W 28/0289 370/328 |
| 2015/0365929 A1* | 12/2015 | Gu .......................... H04W 8/20 455/450 |
| 2016/0330748 A1* | 11/2016 | Bindrim .............. H04L 65/1013 |
| 2017/0230512 A1 | 8/2017 | Yu et al. |

FOREIGN PATENT DOCUMENTS

| | | |
|---|---|---|
| CN | 103313427 A | 9/2013 |
| CN | 103402178 A | 11/2013 |
| JP | 2015521430 A | 7/2015 |
| JP | 2015523819 A | 8/2015 |
| KR | 20040003651 A | 1/2004 |
| WO | 2009123265 A1 | 10/2009 |
| WO | 2011094083 A2 | 8/2011 |
| WO | 2013170576 A1 | 11/2013 |
| WO | 2014012227 A1 | 1/2014 |

OTHER PUBLICATIONS

Foreign Communication From a Counterpart Application, European Application No. 14899904.8, Extended European Search Report dated Jun. 30, 2017, 9 pages.
Machine Translation and Abstract of Chinese Publication No. CN103139750, Jun. 5, 2013, 10 pages.
Foreign Communication From a Counterpart Application, PCT Application No. PCT/CN2014/084113, English Translation of International Search Report dated Mar. 27, 2015, 2 pages.
Foreign Communication From a Counterpart Application, PCT Application No. PCT/CN2014/084113, English Translation of Written Opinion dated Mar. 27, 2015, 2 pages.
Ericsson, et al.,"PGW-SGW-charging-alignment in downlink," S2-133249, SA WG2 Meeting #99, Sep. 23-27, 2013, 13 pages.
Foreign Communication From a Counterpart Application, Japanese Application No. 2017-507712, Japanese Office Action dated Jul. 10, 2018, 3 pages.
Foreign Communication From a Counterpart Application, Japanese Application No. 2017-507712, English Translation of Japanese Office Action dated Jul. 10, 2018, 3 pages.

* cited by examiner

DEVICE AND METHOD FOR IMPLEMENTING DATA SERVICE

CROSS-REFERENCE TO RELATED APPLICATIONS

This application is a continuation of International Patent Application No. PCT/CN2014/084113 filed on Aug. 11, 2014, which is hereby incorporated by reference in its entirety.

TECHNICAL FIELD

The present disclosure relates to the field of communications technologies, and in particular, to a device and a method for implementing a data service.

BACKGROUND

Long Term Evolution (LTE) is a mainstream communications technology. In comparison with second generation (2G) and third generation (3G) networks, LTE can provide a data service at a higher speed.

In LTE data services, uplink or downlink transmission of data packets of various data services takes place on a data transmission channel established from User Equipment (UE), an access network, and a core network to an external Packet Data Network (PDN). The data transmission channel is generally a default bearer or a dedicated bearer or a PDN connection.

To avoid an unnecessary data usage loss caused by factors such as a user misoperation or malicious software, a data service switch is set in most UEs, and used to enable or disable data service functions of the UEs. The data service switch may be turned off when a user does not need to perform a data service. The data service switch may be turned on when the user needs to perform a data service.

In the UE, turn-off of the data service switch is generally implemented using a software or hardware method to forbid sending data packets to a network side. Therefore, when the user turns off the data service switch of the UE, sending of uplink data packets of all data services on the UE is stopped. However, downlink data packets (for example, data packets that are not downloaded completely before the data service switch is turned off, or data packets of a push service) sent by the network side are still delivered on a data transmission channel to the UE.

In the foregoing implementation process of turning off the data service switch, the inventors find at least the following problem. After the data service switch of the UE is turned off, only uplink data packets can be stopped, and no uplink data usage fee is generated for the UE. However, downlink data packets are still sent, and an unnecessary data usage fee may be generated for the UE, causing a problem of data usage waste.

SUMMARY

Embodiments of the present disclosure provide a device and a method for implementing a data service in order to avoid generating an unnecessary data usage fee for UE and further avoid data usage waste after a data service switch of the UE is turned off.

To achieve the foregoing objective, the following technical solutions are adopted in the embodiments of the present disclosure.

According to a first aspect, a first network-side device is provided and includes a determining unit configured to determine a status of a data service switch of UE, where the UE already registered with a network, and the status of the data service switch includes that the data service switch is turned on or that the data service switch is turned off, and a first sending unit configured to send a first notification message to a second network-side device if the determining unit determines that the data service switch of the UE is turned off, where the first notification message includes first instruction information and an identity of the UE, the first instruction information instructs the second network-side device to skip charging for data packets of the UE flowing through the second network-side device, and the data packets of the UE include downlink data packets, or uplink data packets and downlink data packets.

With reference to the first aspect, in a first possible implementation manner of the first aspect, the first network-side device further includes a first receiving unit configured to receive downlink data packets sent by the second network-side device to the UE, and a second sending unit configured to send the downlink data packet used for Internet Protocol (IP) management to the UE, and discard the downlink data packets except the downlink data packet used for IP management if the determining unit determines that the data service switch of the UE is turned off, and when the first receiving unit receives the downlink data packets sent by the second network-side device to the UE.

With reference to the first aspect or the first possible implementation manner of the first aspect, in a second possible implementation manner of the first aspect, the first sending unit is further configured to send a second notification message to the second network-side device if the determining unit determines that the data service switch of the UE is turned off, where the second notification message includes second instruction information and the identity of the UE, and the second instruction information instructs the second network-side device to notify, using a Policy and Charging Rules Function (PCRF), a server providing a data service to stop sending the downlink data packets to the UE.

With reference to the first aspect, in a third possible implementation manner of the first aspect, after sending the first notification message to the second network-side device, and if the determining unit determines that the data service switch of the UE is turned on, the first sending unit is further configured to send a third notification message to the second network-side device, where the third notification message includes third instruction information and the identity of the UE, and the third instruction information instructs the second network-side device to charge for the data packets of the UE flowing through the second network-side device.

With reference to the first possible implementation manner of the first aspect, in a fourth possible implementation manner of the first aspect, the second sending unit is further configured to send the downlink data packets to the UE after sending the downlink data packet used for IP management to the UE, and discarding the downlink data packets except the downlink data packet used for IP management, if the determining unit determines that the data service switch of the UE is turned on, when the first receiving unit receives the downlink data packets sent by the second network-side device to the UE.

With reference to the second possible implementation manner of the first aspect, in a fifth possible implementation manner of the first aspect, the first sending unit is further configured to send a fourth notification message to the second network-side device after sending the second notification message to the second network-side device, if the determining unit determines that the data service switch of the UE is turned on, where the fourth notification message includes fourth instruction information and the identity of the UE, and the fourth instruction information instructs the second network-side device to notify, using the PCRF, the server providing the data service to resume sending the downlink data packets to the UE.

With reference to any one of the first aspect, or the first possible implementation manner of the first aspect to the fifth possible implementation manner of the first aspect, in a sixth possible implementation manner of the first aspect, the first network-side device further includes a second receiving unit configured to receive an uplink data packet sent by the UE, and the determining unit is further configured to determine whether the second receiving unit receives, within a preset duration, the uplink data packet sent by the UE, where the preset duration is longer than or equal to a duration of a heartbeat packet interval of the UE, if the second receiving unit does not receive, within the preset duration, the uplink data packet sent by the UE, determine that the data service switch of the UE is turned off, and determine that the data service switch of the UE is turned on after determining that the data service switch of the UE is turned off, if the second receiving unit receives the uplink data packet sent by the UE.

With reference to the sixth possible implementation manner of the first aspect, in a seventh possible implementation manner of the first aspect, the first network-side device further includes a timing unit configured to restart timing of the preset duration after timing of the preset duration ends if the second receiving unit receives, within the preset duration, the uplink data packet sent by the UE, or restart timing of the preset duration at a time of receiving the uplink data packet sent by the UE if the second receiving unit receives, within the preset duration, the uplink data packet sent by the UE.

According to a second aspect, a second network-side device is provided and includes a receiving unit configured to receive a first notification message sent by a first network-side device, where the first notification message is sent to the second network-side device when the first network-side device determines that a data service switch of UE is turned off, the first notification message includes first instruction information and an identity of the UE, the first instruction information instructs the second network-side device to skip charging for data packets of the UE flowing through the second network-side device, and the data packets of the UE include downlink data packets, or uplink data packets and downlink data packets, and a charging unit configured to skip charging, according to the first notification message received by the receiving unit, for the data packets of the UE flowing through the second network-side device.

With reference to the second aspect, in a first possible implementation manner of the second aspect, the charging unit is further configured to ignore a policy control and charging (PCC) policy according to the first notification message received by the receiving unit, and directly skip charging for the data packets of the UE flowing through the second network-side device, or the second network-side device further includes a sending unit configured to send a second notification message to the PCRF according to the first notification message received by the receiving unit, where the second notification message includes second instruction information and the identity of the UE, and the second instruction information instructs the PCRF to use a preset non-charging PCC policy for the UE.

With reference to the second aspect or the first possible implementation manner of the second aspect, in a second possible implementation manner of the second aspect, the receiving unit is further configured to receive a third notification message sent by the first network-side device, where the third notification message is sent to the second network-side device when the first network-side device determines that the data service switch of the UE is turned off, the third notification message includes third instruction information and the identity of the UE, and the third instruction information instructs the second network-side device to notify, using the PCRF, a server providing a data service to stop sending the downlink data packets to the UE, and the second network-side device further includes a sending unit configured to send a fourth notification message to the PCRF according to the third notification message received by the receiving unit, where the fourth notification message includes fourth instruction information and the identity of the UE, and the fourth instruction information instructs the PCRF to notify the server providing the data service to stop sending the downlink data packets to the UE.

With reference to the second aspect or the first possible implementation manner of the second aspect, in a third possible implementation manner of the second aspect, the receiving unit is further configured to receive a fifth notification message sent by the first network-side device, where the fifth notification message is sent to the second network-side device if the first network-side device determines that the data service switch of the UE is turned on after the first network-side device sends the first notification message, the fifth notification message includes fifth instruction information and the identity of the UE, and the fifth instruction information instructs the second network-side device to charge for the data packets of the UE flowing through the second network-side device, and the charging unit is further configured to charge, according to the fifth notification message received by the receiving unit, for the data packets of the UE flowing through the second network-side device.

With reference to the third possible implementation manner of the second aspect, in a fourth possible implementation manner of the second aspect, the charging unit is further configured to charge, using the ignored PCC policy and according to the fifth notification message received by the receiving unit, for the data packets of the UE flowing through the second network-side device, or the sending unit is further configured to send a sixth notification message to the PCRF according to the fifth notification message received by the receiving unit, where the sixth notification message includes sixth instruction information and the identity of the UE, and the sixth instruction information instructs the PCRF to use a preset charging PCC policy for the UE.

With reference to the second possible implementation manner of the second aspect, in a fifth possible implementation manner of the second aspect, the receiving unit is further configured to receive a seventh notification message sent by the first network-side device, where the seventh notification message is sent to the second network-side device if the first network-side device determines that the data service switch of the UE is turned on after the first network-side device sends the third notification message, the seventh notification message includes seventh instruction information and the identity of the UE, and the seventh instruction information instructs the second network-side device to notify, using the PCRF, the server providing the data service to resume sending the downlink data packets to the UE, and the sending unit is further configured to send an eighth notification message to the PCRF according to the seventh notification message received by the receiving unit, where the eighth notification message includes eighth instruction information and the identity of the UE, and the eighth instruction information instructs the PCRF to notify the server providing the data service to resume sending the downlink data packets to the UE.

According to a third aspect, a third network-side device is provided and includes a determining unit configured to determine a status of a data service switch of UE, where the UE is UE already registered with a network, and the status of the data service switch includes that the data service switch is turned on or that the data service switch is turned off, and a charging unit configured to skip charging, if the determining unit determines that the data service of the UE is turned off, for data packets of the UE flowing through the third network-side device.

With reference to the third aspect, in a first possible implementation manner of the third aspect, the charging unit is further configured to ignore a PCC policy, and directly skip charging for the data packets of the UE flowing through the third network-side device, or the third network-side device further includes a first sending unit configured to send a first notification message to the PCRF if the determining unit determines that the data service of the UE is turned off, where the first notification message includes first instruction information and an identity of the UE, and the first instruction information instructs the PCRF to use a preset non-charging PCC policy for the UE.

With reference to the third aspect or the first possible implementation manner of the third aspect, in a second possible implementation manner of the third aspect, the third network-side device further includes a first receiving unit configured to receive downlink data packets sent by a server providing a data service to the UE, and a second sending unit configured to send the downlink data packet used for IP management to the UE, and discard the downlink data packets except the downlink data packet used for IP management if the determining unit determines that the data service switch of the UE is turned off, and when the first receiving unit receives the downlink data packets sent by the server providing the data service to the UE.

With reference to the third aspect, or the first possible implementation manner of the third aspect, or the second possible implementation manner of the third aspect, in a third possible implementation manner of the third aspect, the third network-side device further includes a first sending unit configured to send a second notification message to the PCRF if the determining unit determines that the data service of the UE is turned off, where the second notification message includes second instruction information and the identity of the UE, and the second instruction information instructs the PCRF to notify the server providing the data service to stop sending the downlink data packets to the UE.

With reference to the third aspect or the first possible implementation manner of the third aspect, in a fourth possible implementation manner of the third aspect, the charging unit is further configured to charge for the data packets of the UE flowing through the third network-side device after skipping charging for the data packets of the UE flowing through the third network-side device, if the determining unit determines that the data service switch of the UE is turned on.

With reference to the fourth possible implementation manner of the third aspect, in a fifth possible implementation manner of the third aspect, the charging unit is further configured to charge, using the ignored PCC policy, for the data packets of the UE flowing through the third network-side device, or the first sending unit is further configured to send a third notification message to the PCRF, where the third notification message includes third instruction information and the identity of the UE, and the third instruction information instructs the PCRF to use a preset charging PCC policy for the UE.

With reference to the second possible implementation manner of the third aspect, in a sixth possible implementation manner of the third aspect, the second sending unit is further configured to send the downlink data packets to the UE after sending the downlink data packet used for IP management to the UE, and discarding the downlink data packets except the downlink data packet used for IP management, if the determining unit determines that the data service switch of the UE is turned on, and when the first receiving unit receives the downlink data packets sent by the server providing the data service to the UE.

With reference to the third possible implementation manner of the third aspect, in a seventh possible implementation manner of the third aspect, the first sending unit is further configured to send a fourth notification message to the PCRF after sending the second notification message to the PCRF, if the determining unit determines that the data service switch of the UE is turned on, where the fourth notification message includes fourth instruction information and the identity of the UE, and the fourth instruction information instructs the PCRF to notify the server providing the data service to resume sending the downlink data packets to the UE.

With reference to any one of the third aspect, or the first possible implementation manner of the third aspect to the seventh possible implementation manner of the third aspect, in an eighth possible implementation manner of the third aspect, the third network-side device further includes a second receiving unit configured to receive an uplink data packet sent by the UE, and the determining unit is further configured to determine whether the second receiving unit receives, within a preset duration, the uplink data packet sent by the UE, where the preset duration is longer than or equal to a duration of a heartbeat packet interval of the UE, determine that the data service switch of the UE is turned off if the second receiving unit does not receive, within the preset duration, the uplink data packet sent by the UE, and determine that the data service switch of the UE is turned on after determining that the data service switch of the UE is turned off, if the second receiving unit receives the uplink data packet sent by the UE.

With reference to the eighth possible implementation manner of the third aspect, in a ninth possible implementation manner of the third aspect, the third network-side device further includes a timing unit configured to restart timing of the preset duration after timing of the preset duration ends if the second receiving unit receives, within the preset duration, the uplink data packet sent by the UE, or restart timing of the preset duration at a time of receiving the uplink data packet sent by the UE if the second receiving unit receives, within the preset duration, the uplink data packet sent by the UE.

According to a fourth aspect, a PCRF unit is provided and includes a receiving unit configured to receive a first notification message sent by a second network-side device or a third network-side device, where the first notification message is sent to the PCRF by the second network-side device instructed by a first network-side device when the first network-side device determines that a data service switch of UE is turned off, or the first notification message is sent to the PCRF when the third network-side device determines that a data service switch of the UE is turned off, the first notification message includes first instruction information and an identity of the UE, the first instruction information instructs the PCRF to use a preset non-charging PCC policy for the UE, the preset non-charging PCC policy is a policy for skipping charging for data packets of the UE flowing through the second network-side device or the third network-side device, and the data packets of the UE include downlink data packets, or uplink data packets and downlink data packets, a policy unit configured to use the preset non-charging PCC policy for the UE according to the first notification message received by the receiving unit, and a first sending unit configured to send the preset non-charging PCC policy to the second network-side device or the third network-side device.

With reference to the fourth aspect, in a first possible implementation manner of the fourth aspect, the receiving unit is further configured to receive a second notification message sent by the second network-side device or the third network-side device, where the second notification message is sent to the PCRF by the second network-side device instructed by the first network-side device when the first network-side device determines that the data service switch of the UE is turned off, or the second notification message is sent to the PCRF when the third network-side device determines that the data service switch of the UE is turned off, the second notification message includes second instruction information and the identity of the UE, and the second instruction information instructs the PCRF to notify a server providing a data service to stop sending the downlink data packets to the UE, and the PCRF unit further includes a second sending unit configured to send, according to the second notification message received by the receiving unit, a third notification message to the server providing the data service, where the third notification message includes third instruction information and the identity of the UE, and the third instruction information instructs the server providing the data service to stop sending the downlink data packets to the UE.

With reference to the fourth aspect, in a second possible implementation manner of the fourth aspect, the receiving unit is further configured to receive a fourth notification message sent by the second network-side device or the third network-side device, where the fourth notification message is sent by the second network-side device instructed by the first network-side device if the first network-side device determines that the data service switch of the UE is turned on after the first network-side device determines that the data service switch of the UE is turned off, or the fourth notification message is sent if the third network-side device determines that the data service switch of the UE is turned on after the third network-side device determines that the data service switch of the UE is turned off, the fourth notification message includes fourth instruction information and the identity of the UE, and the fourth instruction information instructs the PCRF to use a preset charging PCC policy for the UE, where the preset charging PCC policy is a policy for charging for the data packets of the UE flowing through the second network-side device or the third network-side device, the policy unit is further configured to use the preset charging PCC policy for the UE according to the fourth notification message received by the receiving unit, and the first sending unit is further configured to send the preset charging PCC policy to the second network-side device or the third network-side device.

With reference to the first possible implementation manner of the fourth aspect, in a third possible implementation manner of the fourth aspect, the receiving unit is further configured to receive a fifth notification message sent by the second network-side device or the third network-side device, where the fifth notification message is sent by the second network-side device instructed by the first network-side device if the first network-side device determines that the data service switch of the UE is turned on after the first network-side device determines that the data service switch of the UE is turned off, or the fifth notification message is sent if the third network-side device determines that the data service switch of the UE is turned on after the third network-side device determines that the data service switch of the UE is turned off, the fifth notification message includes fifth instruction information and the identity of the UE, and the fifth instruction information instructs the PCRF to notify the server providing the data service to resume sending the downlink data packets to the UE, and the second sending unit is further configured to send, according to the fifth notification message received by the receiving unit, a sixth notification message to the server providing the data service, where the sixth notification message includes sixth instruction information and the identity of the UE, and the sixth instruction information instructs the server providing the data service to stop sending the downlink data packets to the UE.

According to a fifth aspect, a server is provided, where the server is configured to provide a data service for UE, and includes a receiving unit configured to receive a first notification message sent by a PCRF, where the first notification message is sent using the PCRF by a second network-side device instructed by a first network-side device when the first network-side device determines that a data service switch of the UE is turned off, or the first notification message is sent using the PCRF when a third network-side device determines that a data service switch of the UE is turned off, the first notification message includes first instruction information and an identity of the UE, and the first instruction information instructs the server to stop sending downlink data packets to the UE, and a sending unit configured to stop sending the downlink data packets to the UE according to the first notification message received by the receiving unit.

With reference to the fifth aspect, in a first possible implementation manner of the fifth aspect, the receiving unit is further configured to receive a second notification message sent by the PCRF, where the second notification message is sent using the PCRF by the second network-side device instructed by the first network-side device if the first network-side device determines that the data service switch of the UE is turned on after the first network-side device determines that the data service switch of the UE is turned off, or the second notification message is sent using the PCRF if the third network-side device determines that the data service switch of the UE is turned on after the third network-side device determines that the data service switch of the UE is turned off, the second notification message includes second instruction information and the identity of the UE, and the second instruction information instructs the server to resume sending the downlink data packets to the UE, and the sending unit is further configured to resume sending the downlink data packets to the UE according to the second notification message received by the receiving unit.

According to a sixth aspect, a method for implementing a data service is provided and applied to a first network-side device, where the method includes determining a status of a data service switch of UE, where the UE is UE already registered with a network, and the status of the data service switch includes that the data service switch is turned on or that the data service switch is turned off, and sending a first notification message to a second network-side device if the data service switch of the UE is turned off, where the first notification message includes first instruction information and an identity of the UE, the first instruction information instructs the second network-side device to skip charging for data packets of the UE flowing through the second network-side device, and the data packets of the UE include downlink data packets, or uplink data packets and downlink data packets.

With reference to the sixth aspect, in a first possible implementation manner of the sixth aspect, the method further includes sending the downlink data packet used for IP management to the UE, and discarding the downlink data packets except the downlink data packet used for IP management if the data service switch of the UE is turned off, and when receiving downlink data packets sent by the second network-side device to the UE.

With reference to the sixth aspect or the first possible implementation manner of the sixth aspect, in a second possible implementation manner of the sixth aspect, the method further includes sending a second notification message to the second network-side device if the data service switch of the UE is turned off, where the second notification message includes second instruction information and the identity of the UE, and the second instruction information instructs the second network-side device to notify, using the PCRF, a server providing the data service to stop sending the downlink data packets to the UE.

With reference to the sixth aspect, in a third possible implementation manner of the sixth aspect, after sending a first notification message to the second network-side device, the method further includes sending a third notification message to the second network-side device if the data service switch of the UE is turned on, where the third notification message includes third instruction information and the identity of the UE, and the third instruction information instructs the second network-side device to charge for the data packets of the UE flowing through the second network-side device.

With reference to the first possible implementation manner of the sixth aspect, in a fourth possible implementation manner of the sixth aspect, after sending the downlink data packet used for IP management to the UE, and discarding the downlink data packets except the downlink data packet used for IP management, the method further includes sending the downlink data packets to the UE if the data service switch of the UE is turned on, and when receiving the downlink data packets sent by the second network-side device to the UE.

With reference to the second possible implementation manner of the sixth aspect, in a fifth possible implementation manner of the sixth aspect, after the sending a second notification message to the second network-side device, the method further includes sending a fourth notification message to the second network-side device if the data service switch of the UE is turned on, where the fourth notification message includes fourth instruction information and the identity of the UE, and the fourth instruction information instructs the second network-side device to notify, using the PCRF, the server providing the data service to resume sending the downlink data packets to the UE.

With reference to any one of the sixth aspect, or the first possible implementation manner of the sixth aspect to the fifth possible implementation manner of the sixth aspect, in a sixth possible implementation manner of the sixth aspect, determining a status of a data service switch of UE includes determining whether an uplink data packet sent by the UE is received within a preset duration, where the preset duration is longer than or equal to a duration of a heartbeat packet interval of the UE, determining that the data service switch of the UE is turned off if the uplink data packet sent by the UE is not received within the preset duration, and determining that the data service switch of the UE is turned on after determining that the data service switch of the UE is turned off, if the uplink data packet sent by the UE is received.

With reference to the sixth possible implementation manner of the sixth aspect, in a seventh possible implementation manner of the sixth aspect, the method further includes restarting timing of the preset duration after timing of the preset duration ends if the uplink data packet sent by the UE is received within the preset duration, or restarting timing of the preset duration at a time of receiving the uplink data packet sent by the UE if the uplink data packet sent by the UE is received within the preset duration.

According to a seventh aspect, a method for implementing a data service is provided and applied to a second network-side device, where the method includes receiving a first notification message sent by a first network-side device, where the first notification message is sent to the second network-side device when the first network-side device determines that a data service switch of UE is turned off, the first notification message includes first instruction information and an identity of the UE, the first instruction information instructs the second network-side device to skip charging for data packets of the UE flowing through the second network-side device, and the data packets of the UE include downlink data packets, or uplink data packets and downlink data packets, and skipping charging, according to the first notification message, for the data packets of the UE flowing through the second network-side device.

With reference to the seventh aspect, in a first possible implementation manner of the seventh aspect, the skipping charging, according to the first notification message, for the data packets of the UE flowing through the second network-side device, includes ignoring a PCC policy according to the first notification message, and directly skipping charging for the data packets of the UE flowing through the second network-side device, or sending a second notification message to the PCRF according to the first notification message, where the second notification message includes second instruction information and the identity of the UE, and the second instruction information instructs the PCRF to use a preset non-charging PCC policy for the UE.

With reference to the seventh aspect or the first possible implementation manner of the seventh aspect, in a second possible implementation manner of the seventh aspect, the method further includes receiving a third notification message sent by the first network-side device, where the third notification message is sent to the second network-side device when the first network-side device determines that the data service switch of the UE is turned off, the third notification message includes third instruction information and the identity of the UE, and the third instruction information instructs the second network-side device to notify, using the PCRF, a server providing the data service to stop sending the downlink data packets to the UE, and sending a fourth notification message to the PCRF according to the third notification message, where the fourth notification message includes fourth instruction information and the identity of the UE, and the fourth instruction information instructs the PCRF to notify the server providing the data service to stop sending the downlink data packets to the UE.

With reference to the seventh aspect or the first possible implementation manner of the seventh aspect, in a third possible implementation manner of the seventh aspect, the method further includes receiving a fifth notification message sent by the first network-side device, where the fifth notification message is sent to the second network-side device if the first network-side device determines that the data service switch of the UE is turned on after the first network-side device sends the first notification message, the fifth notification message includes fifth instruction information and the identity of the UE, and the fifth instruction information instructs the second network-side device to charge for the data packets of the UE flowing through the second network-side device, and charging, according to the fifth notification message, for the data packets of the UE flowing through the second network-side device.

With reference to the third possible implementation manner of the seventh aspect, in a fourth possible implementation manner of the seventh aspect, the charging, according to the fifth notification message, for the data packets of the UE flowing through the second network-side device, includes charging, using the ignored PCC policy and according to the fifth notification message, for the data packets of the UE flowing through the second network-side device, or sending a sixth notification message to the PCRF according to the fifth notification message, where the sixth notification message includes sixth instruction information and the identity of the UE, and the sixth instruction information instructs the PCRF to use a preset charging PCC policy for the UE.

With reference to the second possible implementation manner of the seventh aspect, in a fifth possible implementation manner of the seventh aspect, the method further includes receiving a seventh notification message sent by the first network-side device, where the seventh notification message is sent to the second network-side device if the first network-side device determines that the data service switch of the UE is turned on after the first network-side device sends the third notification message, the seventh notification message includes seventh instruction information and the identity of the UE, and the seventh instruction information instructs the second network-side device to notify, using the PCRF, the server providing the data service to resume sending the downlink data packets to the UE, and sending an eighth notification message to the PCRF according to the seventh notification message, where the eighth notification message includes eighth instruction information and the identity of the UE, and the eighth instruction information instructs the PCRF to notify the server providing the data service to resume sending the downlink data packets to the UE.

According to an eighth aspect, a method for implementing a data service is provided and applied to a third network-side device, where the method includes determining a status of a data service switch of UE, where the UE is already registered with a network, and the status of the data service switch includes that the data service switch is turned on or that the data service switch is turned off, and skipping charging for data packets of the UE flowing through the third network-side device if the data service of the UE is turned off.

With reference to the eighth aspect, in a first possible implementation manner of the eighth aspect, skipping charging for data packets of the UE flowing through the third network-side device includes ignoring a PCC policy, and directly skipping charging for the data packets of the UE flowing through the third network-side device, or sending a first notification message to the PCRF, where the first notification message includes first instruction information and an identity of the UE, and the first instruction information instructs the PCRF to use a preset non-charging PCC policy for the UE.

With reference to the eighth aspect or the first possible implementation manner of the eighth aspect, in a second possible implementation manner of the eighth aspect, the method further includes sending the downlink data packet used for IP management to the UE, and discarding the downlink data packets except the downlink data packet used for IP management if the data service switch of the UE is turned off, when receiving downlink data packets sent by the server providing the data service to the UE.

With reference to the eighth aspect, or the first possible implementation manner of the eighth aspect, or the second possible implementation manner of the eighth aspect, in a third possible implementation manner of the eighth aspect, the method further includes sending a second notification message to the PCRF if the data service of the UE is turned off, where the second notification message includes second instruction information and the identity of the UE, and the second instruction information instructs the PCRF to notify the server providing the data service to stop sending the downlink data packets to the UE.

With reference to the eighth aspect or the first possible implementation manner of the eighth aspect, in a fourth possible implementation manner of the eighth aspect, after skipping charging for data packets of the UE flowing through the third network-side device, the method further includes charging for the data packets of the UE flowing through the third network-side device if the data service switch of the UE is turned on.

With reference to the fourth possible implementation manner of the eighth aspect, in a fifth possible implementation manner of the eighth aspect, charging for the data packets of the UE flowing through the third network-side device includes charging, using the ignored PCC policy, for the data packets of the UE flowing through the third network-side device, or sending a third notification message to the PCRF, where the third notification message includes third instruction information and the identity of the UE, and the third instruction information instructs the PCRF to use a preset charging PCC policy for the UE.

With reference to the second possible implementation manner of the eighth aspect, in a sixth possible implementation manner of the eighth aspect, after sending the downlink data packet used for IP management to the UE, and discarding the downlink data packets except the downlink data packet used for IP management, the method further includes sending the downlink data packets to the UE if the data service switch of the UE is turned on, when receiving the downlink data packets sent by the server providing the data service to the UE.

With reference to the third possible implementation manner of the eighth aspect, in a seventh possible implementation manner of the eighth aspect, after sending a second notification message to the PCRF, the method further includes sending a fourth notification message to the PCRF if the data service switch of the UE is turned on, where the fourth notification message includes fourth instruction information and the identity of the UE, and the fourth instruction information instructs the PCRF to notify the server providing the data service to resume sending the downlink data packets to the UE.

With reference to any one of the eighth aspect, or the first possible implementation manner of the eighth aspect to the seventh possible implementation manner of the eighth aspect, in an eighth possible implementation manner of the eighth aspect, determining a status of a data service switch of UE includes determining whether an uplink data packet sent by the UE is received within a preset duration, where the preset duration is longer than or equal to a duration of a heartbeat packet interval of the UE, determining that the data service switch of the UE is turned off if the uplink data packet sent by the UE is not received within the preset duration, and determining that the data service switch of the UE is turned on after the data service switch of the UE is turned off, if the uplink data packet sent by the UE is received.

With reference to the eighth possible implementation manner of the eighth aspect, in a ninth possible implementation manner of the eighth aspect, the method further includes restarting timing of the preset duration after timing of the preset duration ends if the uplink data packet sent by the UE is received within the preset duration, or restarting timing of the preset duration at a time of receiving the uplink data packet sent by the UE if the uplink data packet sent by the UE is received within the preset duration.

According to a ninth aspect, a method for implementing a data service is provided and applied to a PCRF, where the method includes receiving a first notification message sent by a second network-side device or a third network-side device, where the first notification message is sent to the PCRF by the second network-side device instructed by a first network-side device when the first network-side device determines that a data service switch of UE is turned off, or the first notification message is sent to the PCRF when the third network-side device determines that a data service switch of the UE is turned off, the first notification message includes first instruction information and an identity of the UE, the first instruction information instructs the PCRF to use a preset non-charging PCC policy for the UE, the preset non-charging PCC policy is a policy for skipping charging for data packets of the UE flowing through the second network-side device or the third network-side device, and the data packets of the UE include downlink data packets, or uplink data packets and downlink data packets, using the preset non-charging PCC policy for the UE according to the first notification message, and sending the preset non-charging PCC policy to the second network-side device or the third network-side device.

With reference to the ninth aspect, in a first possible implementation manner of the ninth aspect, the method further includes receiving a second notification message sent by the second network-side device or the third network-side device, where the second notification message is sent to the PCRF by the second network-side device instructed by the first network-side device when the first network-side device determines that the data service switch of the UE is turned off, or the second notification message is sent to the PCRF when the third network-side device determines that the data service switch of the UE is turned off, the second notification message includes second instruction information and the identity of the UE, and the second instruction information instructs the PCRF to notify a server providing the data service to stop sending the downlink data packets to the UE, and sending, according to the second notification message, a third notification message to the server providing the data service, where the third notification message includes third instruction information and the identity of the UE, and the third instruction information instructs the server providing the data service to stop sending the downlink data packets to the UE.

With reference to the ninth aspect, in a second possible implementation manner of the ninth aspect, the method further includes receiving a fourth notification message sent by the second network-side device or the third network-side device, where the fourth notification message is sent by the second network-side device instructed by the first network-side device if the first network-side device determines that the data service switch of the UE is turned on after the first network-side device determines that the data service switch of the UE is turned off, or the fourth notification message is sent if the third network-side device determines that the data service switch of the UE is turned on after the third network-side device determines that the data service switch of the UE is turned off, the fourth notification message includes fourth instruction information and the identity of the UE, and the fourth instruction information instructs the PCRF to use a preset charging PCC policy for the UE, where the preset charging PCC policy is a policy for charging for the data packets of the UE flowing through the second network-side device or the third network-side device, using the preset charging PCC policy for the UE according to the fourth notification message, and sending the preset charging PCC policy to the second network-side device or the third network-side device.

With reference to the first possible implementation manner of the ninth aspect, in a third possible implementation manner of the ninth aspect, the method further includes receiving a fifth notification message sent by the second network-side device or the third network-side device, where the fifth notification message is sent by the second network-side device instructed by the first network-side device if the first network-side device determines that the data service switch of the UE is turned on after the first network-side device determines that the data service switch of the UE is turned off, or the fifth notification message is sent if the third network-side device determines that the data service switch of the UE is turned on after the third network-side device determines that the data service switch of the UE is turned off, the fifth notification message includes fifth instruction information and the identity of the UE, and the fifth instruction information instructs the PCRF to notify the server providing the data service to resume sending the downlink data packets to the UE, and sending, according to the fifth notification message, a sixth notification message to the server providing the data service, where the sixth notification message includes sixth instruction information and the identity of the UE, and the sixth instruction information instructs the server providing the data service to stop sending the downlink data packets to the UE.

According to a tenth aspect, a method for implementing a data service is provided and applied to a server, where the server is configured to provide the data service for UE, and the method includes receiving a first notification message sent by a PCRF, where the first notification message is sent using the PCRF by a second network-side device instructed by a first network-side device when the first network-side device determines that a data service switch of the UE is turned off, or the first notification message is sent using the PCRF when a third network-side device determines that a data service switch of the UE is turned off, the first notification message includes first instruction information and an identity of the UE, and the first instruction information instructs the server to stop sending downlink data packets to the UE, and stopping sending the downlink data packets to the UE according to the first notification message.

With reference to the tenth aspect, in a first possible implementation manner of the tenth aspect, the method further includes receiving a second notification message sent by the PCRF, where the second notification message is sent using the PCRF by the second network-side device instructed by the first network-side device if the first network-side device determines that the data service switch of the UE is turned on after the first network-side device determines that the data service switch of the UE is turned off, or the second notification message is sent using the PCRF if the third network-side device determines that the data service switch of the UE is turned on after the third network-side device determines that the data service switch of the UE is turned off, the second notification message includes second instruction information and the identity of the UE, and the second instruction information instructs the server to resume sending the downlink data packets to the UE, and resuming sending the downlink data packets to the UE according to the second notification message.

According to an eleventh aspect, a first network-side device is provided and includes a processor configured to determine a status of a data service switch of UE, where the UE is UE already registered with a network, and the status of the data service switch includes that the data service switch is turned on or that the data service switch is turned off, and a first transmitter configured to send a first notification message to a second network-side device if the processor determines that the data service switch of the UE is turned off, where the first notification message includes first instruction information and an identity of the UE, the first instruction information instructs the second network-side device to skip charging for data packets of the UE flowing through the second network-side device, and the data packets of the UE include downlink data packets, or uplink data packets and downlink data packets.

With reference to the eleventh aspect, in a first possible implementation manner of the eleventh aspect, the first network-side device further includes a first receiver configured to receive downlink data packets sent by the second network-side device to the UE, and a second transmitter configured to send the downlink data packet used for IP management to the UE, and discard the downlink data packets except the downlink data packet used for IP management if the processor determines that the data service switch of the UE is turned off, when the first receiver receives the downlink data packets sent by the second network-side device to the UE.

With reference to the eleventh aspect or the first possible implementation manner of the eleventh aspect, in a second possible implementation manner of the eleventh aspect, the first transmitter is further configured to send a second notification message to the second network-side device if the processor determines that the data service switch of the UE is turned off, where the second notification message includes second instruction information and the identity of the UE, and the second instruction information instructs the second network-side device to notify, using the PCRF, a server providing a data service to stop sending the downlink data packets to the UE.

With reference to the eleventh aspect, in a third possible implementation manner of the eleventh aspect, the first transmitter is further configured to send a third notification message to the second network-side device after sending the first notification message to the second network-side device, if the processor determines that the data service switch of the UE is turned on, where the third notification message includes third instruction information and the identity of the UE, and the third instruction information instructs the second network-side device to charge for the data packets of the UE flowing through the second network-side device.

With reference to the first possible implementation manner of the eleventh aspect, in a fourth possible implementation manner of the eleventh aspect, the second transmitter is further configured to send the downlink data packets to the UE after sending the downlink data packet used for IP management to the UE, and discarding the downlink data packets except the downlink data packet used for IP management, if the processor determines that the data service switch of the UE is turned on, and when the first receiver receives the downlink data packets sent by the second network-side device to the UE.

With reference to the second possible implementation manner of the eleventh aspect, in a fifth possible implementation manner of the eleventh aspect, the first transmitter is further configured to send a fourth notification message to the second network-side device after sending the second notification message to the second network-side device, if the processor determines that the data service switch of the UE is turned on, where the fourth notification message includes fourth instruction information and the identity of the UE, and the fourth instruction information instructs the second network-side device to notify, using the PCRF, the server providing the data service to resume sending the downlink data packets to the UE.

With reference to any one of the eleventh aspect, or the first possible implementation manner of the eleventh aspect to the fifth possible implementation manner of the eleventh aspect, in a sixth possible implementation manner of the eleventh aspect, the first network-side device further includes a second receiver configured to receive an uplink data packet sent by the UE, and the processor is further configured to determine whether the second receiver receives, within a preset duration, the uplink data packet sent by the UE, where the preset duration is longer than or equal to a duration of a heartbeat packet interval of the UE, if the second receiver does not receive, within the preset duration, the uplink data packet sent by the UE, determine that the data service switch of the UE is turned off, and determine that the data service switch of the UE is turned on after determining that the data service switch of the UE is turned off, if the second receiver receives the uplink data packet sent by the UE.

With reference to the sixth possible implementation manner of the eleventh aspect, in a seventh possible implementation manner of the eleventh aspect, the processor is further configured to restart timing of the preset duration after timing of the preset duration ends if the second receiver receives, within the preset duration, the uplink data packet sent by the UE, or restart timing of the preset duration at a time of receiving the uplink data packet sent by the UE if the second receiver receives, within the preset duration, the uplink data packet sent by the UE.

According to a twelfth aspect, a second network-side device is provided and includes a receiver configured to receive a first notification message sent by a first network-side device, where the first notification message is sent to the second network-side device when the first network-side device determines that a data service switch of UE is turned off, the first notification message includes first instruction information and an identity of the UE, the first instruction information instructs the second network-side device to skip charging for data packets of the UE flowing through the second network-side device, and the data packets of the UE include downlink data packets, or uplink data packets and downlink data packets, and a processor configured to skip charging, according to the first notification message received by the receiver, for the data packets of the UE flowing through the second network-side device.

With reference to the twelfth aspect, in a first possible implementation manner of the twelfth aspect, the processor is further configured to ignore a PCC policy according to the first notification message received by the receiver, and directly skip charging for the data packets of the UE flowing through the second network-side device, or the second network-side device further includes a transmitter configured to send a second notification message to the PCRF according to the first notification message received by the receiver, where the second notification message includes second instruction information and the identity of the UE, and the second instruction information instructs the PCRF to use a preset non-charging PCC policy for the UE.

With reference to the twelfth aspect or the first possible implementation manner of the twelfth aspect, in a second possible implementation manner of the twelfth aspect, the receiver is further configured to receive a third notification message sent by the first network-side device, where the third notification message is sent to the second network-side device when the first network-side device determines that the data service switch of the UE is turned off, the third notification message includes third instruction information and the identity of the UE, and the third instruction information instructs the second network-side device to notify, using the PCRF, a server providing a data service to stop sending the downlink data packets to the UE, and the second network-side device further includes a transmitter configured to send a fourth notification message to the PCRF according to the third notification message received by the receiver, where the fourth notification message includes fourth instruction information and the identity of the UE, and the fourth instruction information instructs the PCRF to notify the server providing the data service to stop sending the downlink data packets to the UE.

With reference to the twelfth aspect or the first possible implementation manner of the twelfth aspect, in a third possible implementation manner of the twelfth aspect, the receiver is further configured to receive a fifth notification message sent by the first network-side device, where the fifth notification message is sent to the second network-side device if the first network-side device determines that the data service switch of the UE is turned on after the first network-side device sends the first notification message, the fifth notification message includes fifth instruction information and the identity of the UE, and the fifth instruction information instructs the second network-side device to charge for the data packets of the UE flowing through the second network-side device, and the processor is further configured to charge, according to the fifth notification message received by the receiver, for the data packets of the UE flowing through the second network-side device.

With reference to the third possible implementation manner of the twelfth aspect, in a fourth possible implementation manner of the twelfth aspect, the processor is further configured to charge, using the ignored PCC policy and according to the fifth notification message received by the receiver, for the data packets of the UE flowing through the second network-side device, or the transmitter is further configured to send a sixth notification message to the PCRF according to the fifth notification message received by the receiver, where the sixth notification message includes sixth instruction information and the identity of the UE, and the sixth instruction information instructs the PCRF to use a preset charging PCC policy for the UE.

With reference to the second possible implementation manner of the twelfth aspect, in a fifth possible implementation manner of the twelfth aspect, the receiver is further configured to receive a seventh notification message sent by the first network-side device, where the seventh notification message is sent to the second network-side device if the first network-side device determines that the data service switch of the UE is turned on after the first network-side device sends the third notification message, the seventh notification message includes seventh instruction information and the identity of the UE, and the seventh instruction information instructs the second network-side device to notify, using the PCRF, the server providing the data service to resume sending the downlink data packets to the UE, and the transmitter is further configured to send an eighth notification message to the PCRF according to the seventh notification message received by the receiver, where the eighth notification message includes eighth instruction information and the identity of the UE, and the eighth instruction information instructs the PCRF to notify the server providing the data service to resume sending the downlink data packets to the UE.

According to a thirteenth aspect, a third network-side device is provided and includes a processor configured to determine a status of a data service switch of UE, where the UE is already registered with a network, and the status of the data service switch includes that the data service switch is turned on or that the data service switch is turned off, where the processor is further configured to skip charging, if the data service of the UE is turned off, for data packets of the UE flowing through the third network-side device.

With reference to the thirteenth aspect, in a first possible implementation manner of the thirteenth aspect, the processor is further configured to ignore a PCC policy, and directly skip charging for the data packets of the UE flowing through the third network-side device, or the third network-side device further includes a first transmitter configured to send a first notification message to the PCRF if the processor determines that the data service of the UE is turned off, where the first notification message includes first instruction information and an identity of the UE, and the first instruction information instructs the PCRF to use a preset non-charging PCC policy for the UE.

With reference to the thirteenth aspect or the first possible implementation manner of the thirteenth aspect, in a second possible implementation manner of the thirteenth aspect, the third network-side device further includes a first receiver configured to receive downlink data packets sent by a server providing a data service to the UE, and a second transmitter configured to send the downlink data packet used for IP management to the UE, and discard the downlink data packets except the downlink data packet used for IP management if the processor determines that the data service switch of the UE is turned off, when the first receiver receives the downlink data packets sent by the server providing the data service to the UE.

With reference to the thirteenth aspect, or the first possible implementation manner of the thirteenth aspect, or the second possible implementation manner of the thirteenth aspect, in a third possible implementation manner of the thirteenth aspect, the third network-side device further includes a first transmitter configured to send a second notification message to the PCRF if the processor determines that the data service of the UE is turned off, where the second notification message includes second instruction information and the identity of the UE, and the second instruction information instructs the PCRF to notify the server providing the data service to stop sending the downlink data packets to the UE.

With reference to the thirteenth aspect or the first possible implementation manner of the thirteenth aspect, in a fourth possible implementation manner of the thirteenth aspect, the processor is further configured to charge for the data packets of the UE flowing through the third network-side device after skipping charging for the data packets of the UE flowing through the third network-side device, and if the processor determines that the data service switch of the UE is turned on.

With reference to the fourth possible implementation manner of the thirteenth aspect, in a fifth possible implementation manner of the thirteenth aspect, the processor is further configured to charge, using the ignored PCC policy, for the data packets of the UE flowing through the third network-side device, or the first transmitter is further configured to send a third notification message to the PCRF, where the third notification message includes third instruction information and the identity of the UE, and the third instruction information instructs the PCRF to use a preset charging PCC policy for the UE.

With reference to the second possible implementation manner of the thirteenth aspect, in a sixth possible implementation manner of the thirteenth aspect, the second transmitter is further configured to send the downlink data packets to the UE after sending the downlink data packet used for IP management to the UE, and discarding the downlink data packets except the downlink data packet used for IP management, if the processor determines that the data service switch of the UE is turned on, and when the first receiver receives the downlink data packets sent by the server providing the data service to the UE.

With reference to the third possible implementation manner of the thirteenth aspect, in a seventh possible implementation manner of the thirteenth aspect, the first transmitter is further configured to send a fourth notification message to the PCRF after sending the second notification message to the PCRF, if the processor determines that the data service switch of the UE is turned on, where the fourth notification message includes fourth instruction information and the identity of the UE, and the fourth instruction information instructs the PCRF to notify the server providing the data service to resume sending the downlink data packets to the UE.

With reference to any one of the thirteenth aspect, or the first possible implementation manner of the thirteenth aspect to the seventh possible implementation manner of the thirteenth aspect, in an eighth possible implementation manner of the thirteenth aspect, the third network-side device further includes a second receiver configured to receive an uplink data packet sent by the UE, and the processor is further configured to determine whether the second receiver receives, within a preset duration, the uplink data packet sent by the UE, where the preset duration is longer than or equal to a duration of a heartbeat packet interval of the UE, determine that the data service switch of the UE is turned off if the second receiver does not receive, within the preset duration, the uplink data packet sent by the UE, and determine that the data service switch of the UE is turned on after determining that the data service switch of the UE is turned off, if the second receiver receives the uplink data packet sent by the UE.

With reference to the eighth possible implementation manner of the thirteenth aspect, in a ninth possible implementation manner of the thirteenth aspect, the processor is further configured to restart timing of the preset duration after timing of the preset duration ends if the second receiver receives, within the preset duration, the uplink data packet sent by the UE, or restart timing of the preset duration at a time of receiving the uplink data packet sent by the UE if the second receiver receives, within the preset duration, the uplink data packet sent by the UE.

According to a fourteenth aspect, a PCRF unit is provided and includes a receiver configured to receive a first notification message sent by a second network-side device or a third network-side device, where the first notification message is sent to the PCRF by the second network-side device instructed by a first network-side device when the first network-side device determines that a data service switch of UE is turned off, or the first notification message is sent to the PCRF when the third network-side device determines that a data service switch of the UE is turned off, the first notification message includes first instruction information and an identity of the UE, the first instruction information instructs the PCRF to use a preset non-charging PCC policy for the UE, the preset non-charging PCC policy is a policy for skipping charging for data packets of the UE flowing through the second network-side device or the third network-side device, and the data packets of the UE include downlink data packets, or uplink data packets and downlink data packets, a processor configured to use the preset non-charging PCC policy for the UE according to the first notification message received by the receiver, and a first transmitter configured to send the preset non-charging PCC policy to the second network-side device or the third network-side device.

With reference to the fourteenth aspect, in a first possible implementation manner of the fourteenth aspect, the receiver is further configured to receive a second notification message sent by the second network-side device or the third network-side device, where the second notification message is sent to the PCRF by the second network-side device instructed by the first network-side device when the first network-side device determines that the data service switch of the UE is turned off, or the second notification message is sent to the PCRF when the third network-side device determines that the data service switch of the UE is turned off, the second notification message includes second instruction information and the identity of the UE, and the second instruction information instructs the PCRF to notify a server providing a data service to stop sending the downlink data packets to the UE, and the PCRF unit further includes a second transmitter configured to send, according to the second notification message received by the receiver, a third notification message to the server providing the data service, where the third notification message includes third instruction information and the identity of the UE, and the third instruction information instructs the server providing the data service to stop sending the downlink data packets to the UE.

With reference to the fourteenth aspect, in a second possible implementation manner of the fourteenth aspect, the receiver is further configured to receive a fourth notification message sent by the second network-side device or the third network-side device, where the fourth notification message is sent by the second network-side device instructed by the first network-side device if the first network-side device determines that the data service switch of the UE is turned on after the first network-side device determines that the data service switch of the UE is turned off, or the fourth notification message is sent if the third network-side device determines that the data service switch of the UE is turned on after the third network-side device determines that the data service switch of the UE is turned off, the fourth notification message includes fourth instruction information and the identity of the UE, and the fourth instruction information instructs the PCRF to use a preset charging PCC policy for the UE, where the preset charging PCC policy is a policy for charging for the data packets of the UE flowing through the second network-side device or the third network-side device, the processor is further configured to use the preset charging PCC policy for the UE according to the fourth notification message received by the receiver, and the first transmitter is further configured to send the preset charging PCC policy to the second network-side device or the third network-side device.

With reference to the first possible implementation manner of the fourteenth aspect, in a third possible implementation manner of the fourteenth aspect, the receiver is further configured to receive a fifth notification message sent by the second network-side device or the third network-side device, where the fifth notification message is sent by the second network-side device instructed by the first network-side device if the first network-side device determines that the data service switch of the UE is turned on after the first network-side device determines that the data service switch of the UE is turned off, or the fifth notification message is sent if the third network-side device determines that the data service switch of the UE is turned on after the third network-side device determines that the data service switch of the UE is turned off, the fifth notification message includes fifth instruction information and the identity of the UE, and the fifth instruction information instructs the PCRF to notify the server providing the data service to resume sending the downlink data packets to the UE, and the second transmitter is further configured to send, according to the fifth notification message received by the receiver, a sixth notification message to the server providing the data service, where the sixth notification message includes sixth instruction information and the identity of the UE, and the sixth instruction information instructs the server providing the data service to stop sending the downlink data packets to the UE.

According to a fifteenth aspect, a server is provided, where the server is configured to provide a data service for UE, and includes a receiver configured to receive a first notification message sent by a PCRF, where the first notification message is sent using the PCRF by a second network-side device instructed by a first network-side device when the first network-side device determines that a data service switch of the UE is turned off, or the first notification message is sent using the PCRF when a third network-side device determines that a data service switch of the UE is turned off, the first notification message includes first instruction information and an identity of the UE, and the first instruction information instructs the server to stop sending downlink data packets to the UE, and a transmitter configured to stop sending the downlink data packets to the UE according to the first notification message received by the receiver.

With reference to the fifteenth aspect, in a first possible implementation manner of the fifteenth aspect, the receiver is further configured to receive a second notification message sent by the PCRF, where the second notification message is sent using the PCRF by the second network-side device instructed by the first network-side device if the first network-side device determines that the data service switch of the UE is turned on after the first network-side device determines that the data service switch of the UE is turned off, or the second notification message is sent using the PCRF if the third network-side device determines that the data service switch of the UE is turned on after the third network-side device determines that the data service switch of the UE is turned off, the second notification message includes second instruction information and the identity of the UE, and the second instruction information instructs the server to resume sending the downlink data packets to the UE, and the transmitter is further configured to resume sending the downlink data packets to the UE according to the second notification message received by the receiver.

The embodiments of the present disclosure provide a device and a method for implementing a data service. A status of a data service switch of UE is determined, and if the data service switch of the UE is turned off, a first notification message is sent to a second network-side device, where the first notification message includes first instruction information and an identity of the UE, and the first instruction information instructs the second network-side device to skip charging for data packets of the UE flowing through the second network-side device. Whether the data service switch of the UE is turned off is determined, and when the data service switch of the UE is turned off, the first notification message is sent to the second network-side device to instruct the second network-side device to skip charging for the data packets of the UE flowing through the second network-side device. Therefore, after the data service switch of the UE is turned off, charging is not performed for the data packets of the UE. This avoids generating an unnecessary data usage fee for the UE and further avoids data usage waste, and resolves a problem in the prior art that after a data service switch of UE is turned off, there is data usage waste because an unnecessary data usage fee may be generated for the UE.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
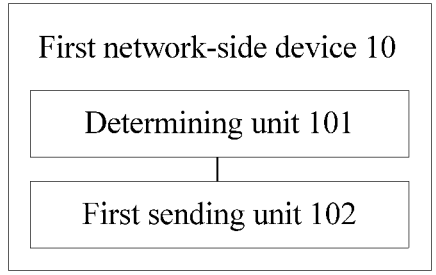
FIG. 1 is a schematic structural diagram of a first network-side device according to an embodiment of the present disclosure.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

LTE, as a mainstream communications technology, develops fast globally. In addition, LTE introduces a more advanced technology, for example, LTE introduces key transmission technologies such as Orthogonal Frequency Division Multiplexing (OFDM) and Multi-input Multi-output (MIMO), and can improve spectrum efficiency and a data transmission rate significantly. LTE not only supports allocation of multiple bandwidths but also supports global mainstream 2G/3G frequency bands and some new frequency bands such that spectrum allocation is more flexible and that a system capacity and coverage are enhanced significantly. LTE is an all-IP network, and can effectively prevent a handover problem of a conventional 3G technology. A network architecture of an LTE system is more flattened and simplified. LTE reduces complexity of network nodes and the system such that a system delay is reduced and that network deployment and maintenance costs are reduced. With the foregoing features of LTE, LTE has better user experience than a conventional 2G/3G network.

In an actual communication process, UE obtains an LTE service in advance, and needs to be attached to a Encapsulated PostScript (EPS) network deployed by an operator. In an EPS attach process, a default EPS bearer, namely, a user bearer with default security performance, may be set up from a terminal, an access network, and a core network to an external PDN. Certainly, other dedicated bearers, namely, user bearers with special security performance and transmission performance, may also be set up according to user service requirements. Uplink or downlink transmission of data packets of all data services of an LTE user takes place on the EPS bearer channel that is set up.

In an LTE network, currently, there are multiple UEs in different modes, for example, a dual-standby mode, a Circuit Switched Fallback (CSFB) mode, and a Voice over LTE VoLTE) mode. UEs in different modes have different voice service bearers (for example, UEs in the dual-standby mode and the CSFB mode have voice service bearers in a circuit switched (CS) domain of the conventional 2G/3G network. UEs in the VoLTE mode have voice service bearers in an EPS domain of the LTE network), but have a same data service bearer, that is, an EPS bearer in the LTE network. Therefore, current UEs in different modes can all enjoy an advanced high-speed data service provided by the LTE network.

To avoid an unnecessary data usage loss caused by factors such as a user misoperation or malicious software, a data service switch is set in most UEs, and used to enable or disable data service functions of the UEs. When a user does not need to perform a data service, this switch may be turned off. When the user needs to perform a data service, this switch may be turned on. After UE turns off a data service switch, an existing EPS bearer is not removed, that is, after the UE turns off the data service switch, the existing EPS bearer still exists. If a data packet needs to be transmitted, the data packet can still be transmitted on the EPS bearer channel.

Embodiment 1

Embodiment 1 of the present disclosure provides a first network-side device 10. The first network-side device 10 may be an evolved NodeB (eNB) or a Serving Gateway (SGW). Referring to FIG. 1, the first network-side device 10 may include a determining unit 101 configured to determine a status of a data service switch of UE, where the UE is already registered with a network, and the status of the data service switch includes that the data service switch is turned on or that the data service switch is turned off, and a first sending unit 102 configured to send a first notification message to a second network-side device if the determining unit 101 determines that the data service switch of the UE is turned off, where the first notification message includes first instruction information and an identity of the UE, the first instruction information instructs the second network-side device to skip charging for data packets of the UE flowing through the second network-side device, and the data packets of the UE include downlink data packets, or uplink data packets and downlink data packets.

It should be noted that, the second network-side device may be a PDN Gateway (PGW) serving the UE.

Figure 2:
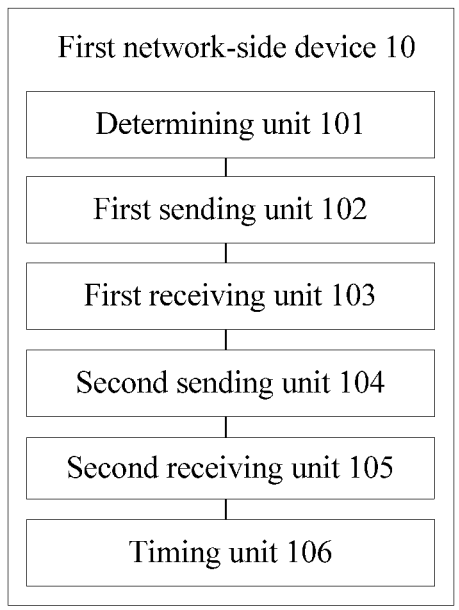
FIG. 2 is a schematic structural diagram of another first network-side device according to an embodiment of the present disclosure.

Referring to FIG. 2, the first network-side device 10 may further include a first receiving unit 103 configured to receive downlink data packets sent by the second network-side device to the UE, and a second sending unit 104 configured to send the downlink data packet used for IP management to the UE, and discard the downlink data packets except the downlink data packet used for IP management if the determining unit 101 determines that the data service switch of the UE is turned off, when the first receiving unit 103 receives the downlink data packets sent by the second network-side device to the UE.

The first sending unit 102 may be further configured to send a second notification message to the second network-side device if the determining unit 101 determines that the data service switch of the UE is turned off, where the second notification message includes second instruction information and the identity of the UE, and the second instruction information instructs the second network-side device to notify, using a PCRF, a server providing a data service to stop sending the downlink data packets to the UE.

Further, the first sending unit 102 may be further configured to send a third notification message to the second network-side device after sending the first notification message to the second network-side device, if the determining unit 101 determines that the data service switch of the UE is turned on, where the third notification message includes third instruction information and the identity of the UE, and the third instruction information instructs the second network-side device to charge for the data packets of the UE flowing through the second network-side device.

The second sending unit 104 may be further configured to send the downlink data packets to the UE after sending the downlink data packet used for IP management to the UE, and discarding the downlink data packets except the downlink data packet used for IP management, if the determining unit 101 determines that the data service switch of the UE is turned on, when the first receiving unit 103 receives the downlink data packets sent by the second network-side device to the UE.

Further, the first sending unit 102 may be further configured to send a fourth notification message to the second network-side device after sending the second notification message to the second network-side device, if the determining unit 101 determines that the data service switch of the UE is turned on, where the fourth notification message includes fourth instruction information and the identity of the UE, and the fourth instruction information instructs the second network-side device to notify, using the PCRF, the server providing the data service to resume sending the downlink data packets to the UE.

The first network-side device 10 may further include a second receiving unit 105 configured to receive an uplink data packet sent by the UE, and the determining unit 101 may be further configured to determine whether the second receiving unit 105 receives, within a preset duration, the uplink data packet sent by the UE, where the preset duration is longer than or equal to a duration of a heartbeat packet interval of the UE, determine that the data service switch of the UE is turned off if the second receiving unit 105 does not receive, within the preset duration, the uplink data packet sent by the UE, and determine that the data service switch of the UE is turned on after determining that the data service switch of the UE is turned off, and if the second receiving unit 105 receives the uplink data packet sent by the UE.

Further, referring to FIG. 2, the first network-side device 10 may further include a timing unit 106 configured to restart timing of the preset duration after timing of the preset duration ends if the second receiving unit 105 receives, within the preset duration, the uplink data packet sent by the UE, or restart timing of the preset duration at a time of receiving the uplink data packet sent by the UE if the second receiving unit 105 receives, within the preset duration, the uplink data packet sent by the UE.

It should be noted that, the timing unit 106 may be a timer. A type of the timing unit 106 is not limited in the present disclosure, and may be determined according to an actual requirement.

This embodiment of the present disclosure provides a first network-side device 10. The first network-side device 10 determines a status of a data service switch of UE, and if the data service switch of the UE is turned off, sends a first notification message to a second network-side device, where the first notification message includes first instruction information and an identity of the UE, and the first instruction information instructs the second network-side device to skip charging for data packets of the UE flowing through the second network-side device. The first network-side device 10 determines that the data service switch of the UE is turned off, and sends the first notification message to the second network-side device to instruct the second network-side device to skip charging for the data packets of the UE flowing through the second network-side device. Therefore, after the data service switch of the UE is turned off, the UE is not charged. This avoids generating an unnecessary data usage fee for the UE and further avoids data usage waste, and resolves a problem that after a data service switch of UE is turned off, there is data usage waste because an unnecessary data usage fee may be generated for the UE.

Embodiment 2

Figure 3:
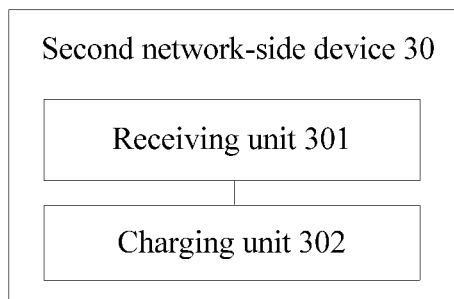
FIG. 3 is a schematic structural diagram of a second network-side device according to an embodiment of the present disclosure.

Embodiment 2 of the present disclosure provides a second network-side device 30. The second network-side device may be a PGW serving UE. Referring to FIG. 3, the second network-side device 30 may include a receiving unit 301 configured to receive a first notification message sent by a first network-side device, where the first notification message is sent to the second network-side device 30 when the first network-side device determines that a data service switch of UE is turned off, the first notification message includes first instruction information and an identity of the UE, the first instruction information instructs the second network-side device 30 to skip charging for data packets of the UE flowing through the second network-side device 30, and the data packets of the UE include downlink data packets, or uplink data packets and downlink data packets, and a charging unit 302 configured to skip charging, according to the first notification message received by the receiving unit 301, for the data packets of the UE flowing through the second network-side device 30.

Figure 4:
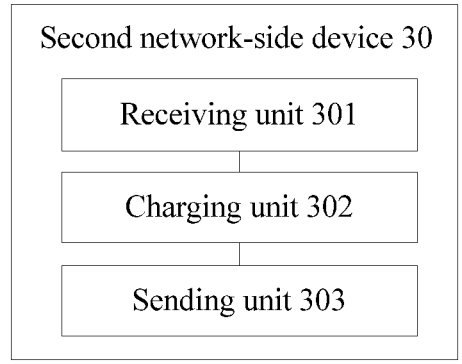
FIG. 4 is a schematic structural diagram of another second network-side device according to an embodiment of the present disclosure.

The charging unit 302 may be further configured to ignore a PCC policy according to the first notification message received by the receiving unit 301, and directly skip charging for the data packets of the UE flowing through the second network-side device 30, or referring to FIG. 4, the second network-side device 30 may further include a sending unit 303 configured to send a second notification message to a PCRF according to the first notification message received by the receiving unit 301, where the second notification message includes second instruction information and the identity of the UE, and the second instruction information instructs the PCRF to use a preset non-charging PCC policy for the UE.

The receiving unit 301 may be further configured to receive a third notification message sent by the first network-side device, where the third notification message is sent to the second network-side device 30 when the first network-side device determines that the data service switch of the UE is turned off, the third notification message includes third instruction information and the identity of the UE, and the third instruction information instructs the second network-side device to notify, using the PCRF, a server providing a data service to stop sending the downlink data packets to the UE, and correspondingly, the sending unit 303 may be further configured to send a fourth notification message to the PCRF according to the third notification message received by the receiving unit 301, where the fourth notification message includes fourth instruction information and the identity of the UE, and the fourth instruction information instructs the PCRF to notify the server providing the data service to stop sending the downlink data packets to the UE.

The receiving unit 301 may be further configured to receive a fifth notification message sent by the first network-side device, where the fifth notification message is sent to the second network-side device 30 if the first network-side device determines that the data service switch of the UE is turned on after the first network-side device sends the first notification message, the fifth notification message includes fifth instruction information and the identity of the UE, and the fifth instruction information instructs the second network-side device 30 to charge for the data packets of the UE flowing through the second network-side device 30, and the charging unit 302 may be further configured to charge, according to the fifth notification message received by the receiving unit 301, for the data packets of the UE flowing through the second network-side device 30.

The charging unit 302 is further configured to charge, using the ignored PCC policy and according to the fifth notification message received by the receiving unit 301, for the data packets of the UE flowing through the second network-side device 30, or the sending unit 303 may be further configured to send a sixth notification message to the PCRF according to the fifth notification message received by the receiving unit 301, where the sixth notification message includes sixth instruction information and the identity of the UE, and the sixth instruction information instructs the PCRF to use a preset charging PCC policy for the UE.

Further, the receiving unit 301 may be further configured to receive a seventh notification message sent by the first network-side device, where the seventh notification message is sent to the second network-side device 30 if the first network-side device determines that the data service switch of the UE is turned on after the first network-side device sends the third notification message, the seventh notification message includes seventh instruction information and the identity of the UE, and the seventh instruction information instructs the second network-side device 30 to notify, using the PCRF, the server providing the data service to resume sending the downlink data packets to the UE, and correspondingly, the sending unit 303 may be further configured to send an eighth notification message to the PCRF according to the seventh notification message received by the receiving unit 301, where the eighth notification message includes eighth instruction information and the identity of the UE, and the eighth instruction information instructs the PCRF to notify the server providing the data service to resume sending the downlink data packets to the UE.

This embodiment of the present disclosure provides a second network-side device 30. The second network-side device 30 receives a first notification message sent by a first network-side device, where the first notification message includes first instruction information and an identity of UE, and the first instruction information instructs the second network-side device to skip charging for data packets of the UE flowing through the second network-side device, and the second network-side device 30 skips charging, according to an instruction of the first notification message, for the data packets of the UE flowing through the second network-side device. Because the first notification message is sent when the first network-side device determines that a data service switch of the UE is turned off, the UE is not charged after the data service switch of the UE is turned off. This avoids generating an unnecessary data usage fee for the UE and further avoids data usage waste, and resolves a problem that after a data service switch of UE is turned off, there is data usage waste because an unnecessary data usage fee may be generated for the UE.

Embodiment 3

Figure 5:
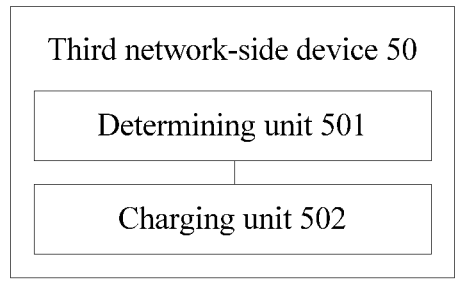
FIG. 5 is a schematic structural diagram of a third network-side device according to an embodiment of the present disclosure.

Embodiment 3 of the present disclosure provides a third network-side device 50. The third network-side device may be a PGW serving UE. Referring to FIG. 5, the third network-side device 50 may include a determining unit 501 configured to determine a status of a data service switch of UE, where the UE is already registered with a network, and the status of the data service switch includes that the data service switch is turned on or that the data service switch is turned off, and a charging unit 502 configured to skip charging, if the determining unit 501 determines that the data service of the UE is turned off, for data packets of the UE flowing through the third network-side device 50.

Figure 6:
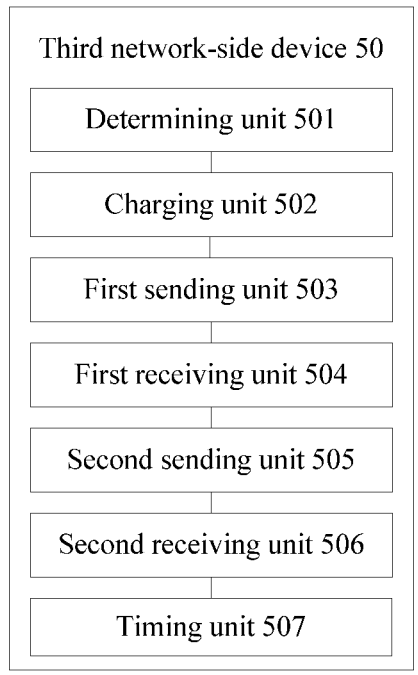
FIG. 6 is a schematic structural diagram of another third network-side device according to an embodiment of the present disclosure.

Optionally, the charging unit 502 may be further configured to ignore a PCC policy, and directly skip charging for the data packets of the UE flowing through the third network-side device 50, or as shown in FIG. 6, the third network-side device 50 may further include a first sending unit 503 configured to send a first notification message to a PCRF if the determining unit 501 determines that the data service of the UE is turned off, where the first notification message includes first instruction information and an identity of the UE, and the first instruction information instructs the PCRF to use a preset non-charging PCC policy for the UE.

Referring to FIG. 6, the third network-side device 50 may further include a first receiving unit 504 configured to receive downlink data packets sent by a server providing a data service to the UE, and a second sending unit 505 configured to send the downlink data packet used for IP management to the UE, and discard the downlink data packets except the downlink data packet used for IP management if the determining unit 501 determines that the data service switch of the UE is turned off, when the first receiving unit 504 receives the downlink data packets sent by the server providing the data service to the UE.

The first sending unit 503 may be further configured to send a second notification message to the PCRF if the determining unit 501 determines that the data service of the UE is turned off, where the second notification message includes second instruction information and the identity of the UE, and the second instruction information instructs the PCRF to notify the server providing the data service to stop sending the downlink data packets to the UE.

The charging unit 502 may be further configured to charge for the data packets of the UE flowing through the third network-side device 50 after skipping charging for the data packets of the UE flowing through the third network-side device 50, if the determining unit 501 determines that the data service switch of the UE is turned on.

Optionally, the charging unit 502 may be further configured to charge, using the ignored PCC policy, for the data packets of the UE flowing through the third network-side device 50, or the first sending unit 503 may be further configured to send a third notification message to the PCRF, where the third notification message includes third instruction information and the identity of the UE, and the third instruction information instructs the PCRF to use a preset charging PCC policy for the UE.

Further, the second sending unit 505 may be further configured to send the downlink data packets to the UE after sending the downlink data packet used for IP management to the UE, and discarding the downlink data packets except the downlink data packet used for IP management, if the determining unit 501 determines that the data service switch of the UE is turned on, when the first receiving unit 504 receives the downlink data packets sent by the server providing the data service to the UE.

Further, the first sending unit 503 may be further configured to send a fourth notification message to the PCRF after sending the second notification message to the PCRF, if the determining unit 501 determines that the data service switch of the UE is turned on, where the fourth notification message includes fourth instruction information and the identity of the UE, and the fourth instruction information instructs the PCRF to notify the server providing the data service to resume sending the downlink data packets to the UE.

Further, the third network-side device 50 further includes a second receiving unit 506 configured to receive an uplink data packet sent by the UE, and correspondingly, the determining unit 501 is further configured to determine whether the second receiving unit 506 receives, within a preset duration, the uplink data packet sent by the UE, where the preset duration is longer than or equal to a duration of a heartbeat packet interval of the UE, determine that the data service switch of the UE is turned off if the second receiving unit 506 does not receive, within the preset duration, the uplink data packet sent by the UE, and after determining that the data service switch of the UE is turned off, if the second receiving unit 506 receives the uplink data packet sent by the UE, determine that the data service switch of the UE is turned on.

Referring to FIG. 6, the third network-side device 50 may further include a timing unit 507 configured to restart timing of the preset duration after timing of the preset duration ends if the second receiving unit 506 receives, within the preset duration, the uplink data packet sent by the UE, or restart timing of the preset duration at a time of receiving the uplink data packet sent by the UE if the second receiving unit 506 receives, within the preset duration, the uplink data packet sent by the UE.

It should be noted that, the timing unit 507 may be a timer. A type of the timing unit 507 is not limited in the present disclosure, and may be determined according to an actual requirement.

This embodiment of the present disclosure provides a third network-side device 50. The third network-side device 50 determines a status of a data service switch of UE, and if the data service switch of the UE is turned off, skips charging for data packets of the UE flowing through the third network-side device. Therefore, after the data service switch of the UE is turned off, the UE is not charged. This avoids generating an unnecessary data usage fee for the UE and further avoids data usage waste, and resolves a problem in the prior art that after a data service switch of UE is turned off, there is data usage waste because an unnecessary data usage fee may be generated for the UE.

Embodiment 4

Figure 7:
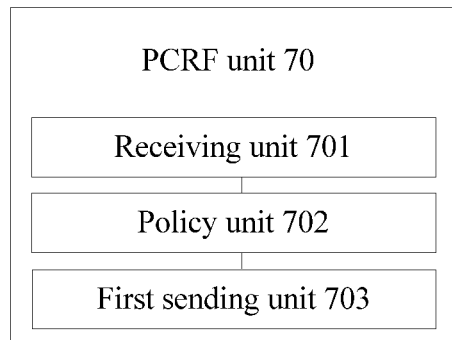
FIG. 7 is a schematic structural diagram of a PCRF unit according to an embodiment of the present disclosure.

Embodiment 4 of the present disclosure provides a PCRF unit 70. Referring to FIG. 7, the PCRF unit 70 may include a receiving unit 701 configured to receive a first notification message sent by a second network-side device or a third network-side device, where the first notification message is sent to the PCRF by the second network-side device instructed by a first network-side device when the first network-side device determines that a data service switch of UE is turned off, or the first notification message is sent to the PCRF when the third network-side device determines that a data service switch of UE is turned off, the first notification message includes first instruction information and an identity of the UE, the first instruction information instructs the PCRF to use a preset non-charging PCC policy for the UE, the preset non-charging PCC policy is a policy for skipping charging for data packets of the UE flowing through the second network-side device or the third network-side device, and the data packets of the UE include downlink data packets, or uplink data packets and downlink data packets, a policy unit 702 configured to use the preset non-charging PCC policy for the UE according to the first notification message received by the receiving unit 701, and a first sending unit 703 configured to send the preset non-charging PCC policy to the second network-side device or the third network-side device.

Figure 8:
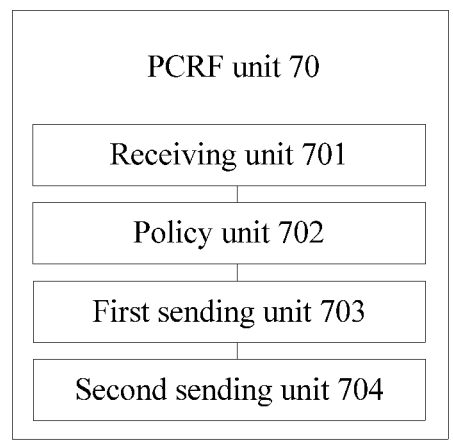
FIG. 8 is a schematic structural diagram of another PCRF unit according to an embodiment of the present disclosure.

The receiving unit 701 may be further configured to receive a second notification message sent by the second network-side device or the third network-side device, where the second notification message is sent to the PCRF by the second network-side device instructed by the first network-side device when the first network-side device determines that the data service switch of the UE is turned off, or the second notification message is sent to the PCRF when the third network-side device determines that the data service switch of the UE is turned off, the second notification message includes second instruction information and the identity of the UE, and the second instruction information instructs the PCRF to notify a server providing a data service to stop sending the downlink data packets to the UE, and further, as shown in FIG. 8, the PCRF unit 70 may further include a second sending unit 704 configured to send, according to the second notification message received by the receiving unit 701, a third notification message to the server providing the data service, where the third notification message includes third instruction information and the identity of the UE, and the third instruction information instructs the server providing the data service to stop sending the downlink data packets to the UE.

The receiving unit 701 may be further configured to receive a fourth notification message sent by the second network-side device or the third network-side device, where the fourth notification message is sent by the second network-side device instructed by the first network-side device if the first network-side device determines that the data service switch of the UE is turned on after the first network-side device determines that the data service switch of the UE is turned off, or the fourth notification message is sent if the third network-side device determines that the data service switch of the UE is turned on after the third network-side device determines that the data service switch of the UE is turned off, the fourth notification message includes fourth instruction information and the identity of the UE, and the fourth instruction information instructs the PCRF to use a preset charging PCC policy for the UE, where the preset charging PCC policy is a policy for charging for the data packets of the UE flowing through the second network-side device or the third network-side device. The policy unit 702 may be further configured to use the preset charging PCC policy for the UE according to the fourth notification message received by the receiving unit 701, and the first sending unit 703 may be further configured to send the preset charging PCC policy to the second network-side device or the third network-side device.

The receiving unit 701 may be further configured to receive a fifth notification message sent by the second network-side device or the third network-side device, where the fifth notification message is sent by the second network-side device instructed by the first network-side device if the first network-side device determines that the data service switch of the UE is turned on after the first network-side device determines that the data service switch of the UE is turned off, or the fifth notification message is sent if the third network-side device determines that the data service switch of the UE is turned on after the third network-side device determines that the data service switch of the UE is turned off, the fifth notification message includes fifth instruction information and the identity of the UE, and the fifth instruction information instructs the PCRF to notify the server providing the data service to resume sending the downlink data packets to the UE, and the second sending unit 704 may be further configured to send, according to the fifth notification message received by the receiving unit 701, a sixth notification message to the server providing the data service, where the sixth notification message includes sixth instruction information and the identity of the UE, and the sixth instruction information instructs the server providing the data service to stop sending the downlink data packets to the UE.

This embodiment of the present disclosure provides a PCRF unit 70. The PCRF unit 70 receives a first notification message sent by a second network-side device or a third network-side device, where the first notification message is sent to the PCRF by the second network-side device instructed by a first network-side device when the first network-side device determines that a data service switch of UE is turned off, or the first notification message is sent to the PCRF when the third network-side device determines that a data service switch of UE is turned off, the first notification message includes first instruction information and an identity of the UE, the first instruction information instructs the PCRF to use a preset non-charging PCC policy for the UE, and the preset non-charging PCC policy is a policy for skipping charging for data packets of the UE flowing through the second network-side device or the third network-side device. The PCRF unit 70 uses the preset non-charging PCC policy for the UE according to the first notification message, and the PCRF unit 70 sends the preset non-charging PCC policy to the second network-side device or the third network-side device. Because the first notification message is sent to the PCRF by the second network-side device instructed by the first network-side device when the first network-side device determines that the data service switch of the UE is turned off, or the first notification message is sent to the PCRF when the third network-side device determines that the data service switch of the UE is turned off, the UE is not charged after the data service switch of the UE is turned off. This avoids generating an unnecessary data usage fee for the UE and further avoids data usage waste, and resolves a problem in the prior art that after a data service switch of UE is turned off, there is data usage waste because an unnecessary data usage fee may be generated for the UE.

Embodiment 5

Figure 9:
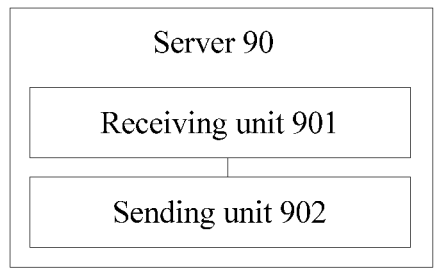
FIG. 9 is a schematic structural diagram of a server according to an embodiment of the present disclosure.

Embodiment 5 of the present disclosure provides a server 90. The server 90 is configured to provide a data service for UE. Referring to FIG. 9, the server 90 may include a receiving unit 901 configured to receive a first notification message sent by a PCRF, where the first notification message is sent using the PCRF by a second network-side device instructed by a first network-side device when the first network-side device determines that a data service switch of the UE is turned off, or the first notification message is sent using the PCRF when a third network-side device determines that a data service switch of the UE is turned off, the first notification message includes first instruction information and an identity of the UE, and the first instruction information instructs the server 90 to stop sending downlink data packets to the UE, and a sending unit 902 configured to stop sending the downlink data packets to the UE according to the first notification message received by the receiving unit 901.

The receiving unit 901 may be further configured to receive a second notification message sent by the PCRF, where the second notification message is sent using the PCRF by the second network-side device instructed by the first network-side device if the first network-side device determines that the data service switch of the UE is turned on after the first network-side device determines that the data service switch of the UE is turned off, or the second notification message is sent using the PCRF if the third network-side device determines that the data service switch of the UE is turned on after the third network-side device determines that the data service switch of the UE is turned off, the second notification message includes second instruction information and the identity of the UE, and the second instruction information instructs the server to resume sending the downlink data packets to the UE, and the sending unit 902 may be further configured to resume sending the downlink data packets to the UE according to the second notification message received by the receiving unit 901.

This embodiment of the present disclosure provides a server 90. The server 90 receives a first notification message sent by a PCRF, where the first notification message is sent using the PCRF by a second network-side device instructed by a first network-side device when the first network-side device determines that a data service switch of UE is turned off, or the first notification message is sent using the PCRF when a third network-side device determines that a data service switch of UE is turned off, the first notification message includes first instruction information and an identity of the UE, and the first instruction information instructs the server to stop sending downlink data packets to the UE, and the server 90 stops sending the downlink data packets to the UE according to the first notification message. Because the first notification message is sent using the PCRF by the second network-side device instructed by the first network-side device when the first network-side device determines that the data service switch of the UE is turned off, or the first notification message is sent using the PCRF when the third network-side device determines that the data service switch of the UE is turned off, the server 90 stops sending the downlink data packets to the UE after the data service switch of the UE is turned off. Because the server 90 stops sending the downlink data packets to the UE after the data service switch of the UE is turned off, this avoids generating an unnecessary data usage fee for the UE and further avoids data usage waste, and resolves a problem that after a data service switch of UE is turned off, there is data usage waste because an unnecessary data usage fee may be generated for the UE.

Embodiment 6

Figure 10:
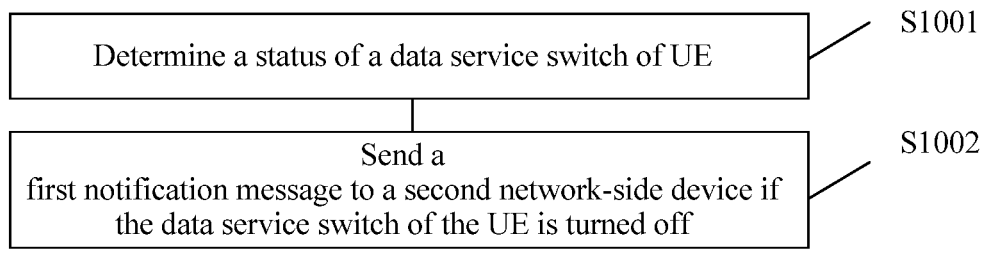
FIG. 10 is a schematic flowchart of a method for implementing a data service according to an embodiment of the present disclosure.

Embodiment 6 of the present disclosure provides a method for implementing a data service, where the method is applied to a first network-side device, and the first network-side device may be an eNB or an SGW. As shown in FIG. 10, the method may include the following steps.

Step S1001: Determine a status of a data service switch of UE.

The UE is already registered with a network, and the status of the data service switch may include that the data service switch is turned on or that the data service switch is turned off.

Preferably, the determining a status of a data service switch of UE may further include the following steps A, B and C.

Step A: Determine whether an uplink data packet sent by the UE is received within a preset duration.

The uplink data packet is a data packet sent from the UE to a network side, and may include but is not limited to an uplink service data packet, a heartbeat packet, or an IP Multimedia Subsystem (IMS) registration signaling. A form of the uplink data packet is not further limited in the present disclosure.

The uplink service data packet is a data packet sent by the UE to the network side when the UE initiates a data service (for example, requesting to open a browser, or requesting to download a file).

The heartbeat packet is a type of data packet used by either of two communication parties to periodically notify its status to the other party and sent to the other party at an interval. The heartbeat packet in the present disclosure is a data packet that is periodically sent by the UE to the network side to notify the status of the UE to the network side in a process of communication with the network side. The UE sends a heartbeat packet to the network side at a preset heartbeat packet interval when the status is that the data service switch of the UE is turned on. The UE does not send an uplink data packet when the status is that the data service switch of the UE is turned off, and therefore, sending of the heartbeat packet to the network side is stopped.

The IMS registration signaling is signaling that is used for registration and sent by the UE to an IMS before the UE initiates a service request to the IMS. The signaling is exchanged in a form of an IP data packet between the UE and the IMS.

Preferably, the preset duration is longer than or equal to a duration of the heartbeat packet interval of the UE. The duration of the heartbeat packet interval may be set by a system by default, or may be set according to different requirements, and is not further limited in the present disclosure.

It should be noted that, the preset duration is a specified fixed duration, and the preset duration is longer than or equal to the duration of the heartbeat packet interval of the UE. The preset duration is not further limited in the present disclosure. In an actual application, the preset duration may be set according to a specific service requirement. Further, if a shorter preset duration is set, the status of the data service switch of the UE is determined more appropriately in time.

It should also be noted that, the preset duration may be implemented by timing. Further, the preset duration may be implemented by a timer. An implementation manner of the preset duration is not limited in the present disclosure.

Further, a start time of the preset duration may be any time, which is not limited in the present disclosure. For example, timing of the preset duration may be started from completion of UE registration, or may be started from a preset time point.

Optionally, the preset duration may be periodic or aperiodic, and may further include either of the following two manners In a first manner, the preset duration is periodic.

If the uplink data packet sent by the UE is received within the preset duration, timing of the preset duration is restarted after timing of the preset duration ends.

It should be noted that, when the preset duration is periodic, as described in the first manner, if the uplink data packet sent by the UE is received within the preset duration, timing of the preset duration may be restarted after timing of the preset duration ends, or if the uplink data packet sent by the UE is received within the preset duration, timing of a next preset duration may be started after timing of the preset duration ends. Time lengths of all preset durations (preset duration and/or next preset duration) are the same. A manner of implementing a periodic preset duration is not limited in the present disclosure.

In a second manner, the preset duration is aperiodic.

If the uplink data packet sent by the UE is received within the preset duration, timing of the preset duration is restarted at a time of receiving the uplink data packet sent by the UE.

That is, if the uplink data packet sent by the UE is received within the preset duration, the preset duration ends in advance, and timing of the preset duration is restarted at the time of receiving the uplink data packet sent by the UE.

For example, a preset duration is 10 seconds, and timing of the preset duration is started from 00:00:00.

If an uplink data packet sent by the UE is received at 00:00:02, the preset duration ends in advance, and timing of the preset duration is restarted from 00:00:02.

Step B: Determine that the data service switch of the UE is turned off if the uplink data packet sent by the UE is not received within the preset duration.

Further, when the status is that the data service switch of the UE is turned on, regardless of whether the UE is using the data service, the UE sends a heartbeat packet to the network-side device periodically. Therefore, when the preset duration is longer than or equal to the duration of the heartbeat packet interval of the UE, if no uplink data packet (including the foregoing heartbeat packet) sent by the UE is received within the preset duration, it may be determined that the data service switch of the UE is already turned off. It may be determined that the data service switch of the UE is not turned off if the uplink data packet sent by the UE is received within the preset duration.

For example, a default setting of the system includes that the UE sends a heartbeat packet to the network side at an interval of 10 seconds. In this case, the preset duration may be 10 seconds or longer than 10 seconds. For example, the preset duration is 12 seconds. If the uplink data packet sent by the UE is not received within 12 seconds, it is determined that the data service switch of the UE is already turned off. It is determined that the data service switch of the UE is not turned off if the uplink data packet sent by the UE is received within 12 seconds.

Step C: After determining that the data service switch of the UE is turned off, if the uplink data packet sent by the UE is received, determine that the data service switch of the UE is turned on.

It should be noted that, for determining the status of the data service switch of the UE, in addition to the method described in the foregoing steps A, B and C, other manners may also be used. For example, the UE sends notification signaling used for notifying that the UE has turned on or turned off the data service switch, and the signaling is forwarded to the first network-side device by a device (for example, a Mobility Management Entity (MME)) in the network. The first network-side device determines the status of the data service switch of the UE according to the signaling. A specific method used for determining the status of the data service switch of the UE is not limited in the present disclosure.

Step S1002: Send a first notification message to a second network-side device if the data service switch of the UE is turned off.

The first notification message includes first instruction information and an identity of the UE, and the first instruction information instructs the second network-side device to skip charging for data packets of the UE flowing through the second network-side device.

Optionally, the second network-side device may be a PGW serving the UE.

Optionally, the data packets of the UE may include downlink data packets, or uplink data packets and downlink data packets.

It should be noted that, the notification message in all embodiments of the present disclosure may be in a form of signaling in an actual application, or certainly may be in other forms. This is not limited in this embodiment of the present disclosure.

Further, when the notification message is in the form of signaling, the notification message may be a part or all of the signaling.

Further, when the notification message is in the form of signaling, existing signaling may be used for implementation, or new signaling may be defined. This is also not further limited in the present disclosure.

Further, when the notification message is in the form of signaling, a specific location of the notification message in the signaling may also be determined according to an actual requirement. This is also not limited in the present disclosure.

Further, the first instruction information instructs the second network-side device to skip charging for the data packets of the UE flowing through the second network-side device. A form of the first instruction information and a meaning corresponding to the first instruction information may be already agreed upon by communication parties (namely, the first network-side device and the second network-side device).

For example, the first instruction information may be in a form of code, for example, "0" or "1." The first instruction information may also be in a form of a character string, for example, "YES" or "NO." Certainly, the first instruction information may also be indicated in other forms. This is not limited in the present disclosure.

It should be noted that, the first instruction information may be stored in a form of a computer language in a device.

Optionally, the first instruction information and the meaning corresponding to the first instruction information may be stored in devices of the communication parties, for example, stored in the first network-side device and the second network-side device.

For example, referring to Table 1, Table 1 shows a correspondence between the first instruction information and the meaning corresponding to the first instruction information. The correspondence may be stored in a form of a table in the devices of the first network-side device and the second network-side device. Certainly, the correspondence between the first instruction information and the meaning corresponding to the first instruction information may also be stored in other forms in the devices of the first network-side device and the second network-side device. This is not limited in the present disclosure.

TABLE 1

| Instruction information | Meaning of the instruction information |
|---|---|
| 0 | The second network-side device skips charging for data packets flowing through the second network-side device |

It should be noted that, Table 1 uses only an example to describe the correspondence between the first instruction information and the meaning corresponding to the first instruction information for description, but does not limit the form and content of the first instruction information.

Further, the identity of the UE is a unique identity of the UE. The UE may be determined uniquely and accurately according to the identity of the UE.

For example, the identity of the UE may be an IP address of the UE, or certainly may be a number of the UE or another identity that may uniquely determine the UE. This is not limited in the present disclosure.

For example, assuming that an identity of UE1 is an IP address 1, the first network-side device and the second network-side device agree that "0" is used as the first instruction information to instruct the second network-side device to skip charging for data packets of the UE flowing through the second network-side device. The first network-side device sends a notification message A: <IP address 1, 0> to the second network-side device if the first network-side device determines that a data service switch of the UE1 is turned off, where the notification message A instructs the second network-side device to skip charging for data packets of the UE1 flowing through the second network-side device such that the second network-side device skips charging for the data packets of the UE1 flowing through the second network-side device.

It should be noted that, a sequence of the instruction information and the identity of the UE in the notification message is not limited in all embodiments of the present disclosure, and may be determined according to an actual requirement, as long as it is ensured that the notification message is agreed upon and specified by the receiving and transmitting parties.

Optionally, a manner in which the first instruction information instructs the second network-side device to skip charging for data packets of the UE flowing through the second network-side device may include but is not limited to the following two cases.

In a first case, the first instruction information only notifies the second network-side device to skip charging for the data packets of the UE flowing through the second network-side device, but does not indicate a specific method for skipping charging by the second network-side device.

In a second case, the first instruction information further instructs the second network-side device how to skip charging for the data packets of the UE flowing through the second network-side device. The following two manners may be included.

In a first manner, the first instruction information instructs the second network-side device to ignore a PCC policy and directly skip charging for the data packets of the UE flowing through the second network-side device.

The PCC policy is a charging method customized for a PCRF for the data packets of the UE flowing through the second network-side device.

When the first instruction information instructs the second network-side device to ignore the PCC policy and directly skip charging for the data packets of the UE flowing through the second network-side device, the second network-side device receiving the first notification message does not refer to the PCC policy, but directly skips charging for the data packets of the UE flowing through the second network-side device, where the UE is the UE corresponding to the identity of the UE included in the first notification message.

Preferably, because when the data service switch of the UE is turned off, the UE does not send an uplink data packet, when the first instruction information may be used to instruct the second network-side device to ignore the PCC policy and directly skip charging for the downlink data packets of the UE flowing through the second network-side device, the second network-side device receiving the first notification message does not refer to the PCC policy any longer, but directly skips charging for the downlink data packets of the UE flowing through the second network-side device, where the UE is the UE corresponding to the identity of the UE included in the first notification message.

In a second manner, the first instruction information instructs the second network-side device to notify the PCRF to use a preset non-charging PCC policy for the UE, where the preset non-charging PCC policy is a policy for skipping charging for the data packets of the UE flowing through the second network-side device.

The PCRF is a policy and charging control policy decision point for a service data flow and an IP bearer resource. The PCRF selects and provides an available policy and charging control decision for a Policy and Charging Enforcement Function (PCEF).

It should be noted that, the preset non-charging PCC policy in all embodiments of the present disclosure may be preset in the PCRF beforehand, or may be customized according to the first notification message. A time of generating the preset non-charging PCC policy and specific content are not limited in the present disclosure.

When the first instruction information instructs the second network-side device to notify the PCRF to use the preset non-charging PCC policy for the UE, the second network-side device receiving the first notification message may notify, in a form of a notification message, the PCRF to use the preset non-charging PCC policy for the UE, where the UE is the UE corresponding to the identity of the UE included in the notification message. The second network-side device receiving the first notification message still charges the UE according to the PCC policy, that is, charges the UE according to the preset non-charging PCC policy. Therefore, no fee is generated for the UE.

Because the preset non-charging PCC policy is a policy that skips charging for the data packets of the UE flowing through the second network-side device, no fee is generated for the UE when the second network-side device receiving the first notification message charges the UE according to the preset non-charging PCC policy. The second network-side device skips charging for the data packets of the UE flowing through the second network-side device.

Optionally, the second network-side device may notify, in a form of a notification message, the PCRF to use the preset non-charging PCC policy for the UE. For the used form of the notification message, reference may be made to the first notification message. Certainly, other forms of notifications may also be used. This is not further limited in the present disclosure.

This embodiment of the present disclosure provides a method for implementing a data service, where the method is applied to a first network-side device. The first network-side device determines a status of a data service switch of UE, and sends a first notification message to a second network-side device if the data service switch of the UE is turned off, where the first notification message includes first instruction information and an identity of the UE, and the first instruction information instructs the second network-side device to skip charging for data packets of the UE flowing through the second network-side device. The first network-side device determines the status of the data service switch of the UE, and sends the first notification message to the second network-side device to instruct the second network-side device to skip charging for the data packets of the UE flowing through the second network-side device when the data service switch of the UE is turned off. Therefore, after the data service switch of the UE is turned off, charging is not performed for the data packets of the UE. This avoids generating an unnecessary data usage fee for the UE and further avoids data usage waste, and resolves a problem in the prior art that after a data service switch of UE is turned off, there is data usage waste because an unnecessary data usage fee may be generated for the UE.

Embodiment 7

Figure 11:
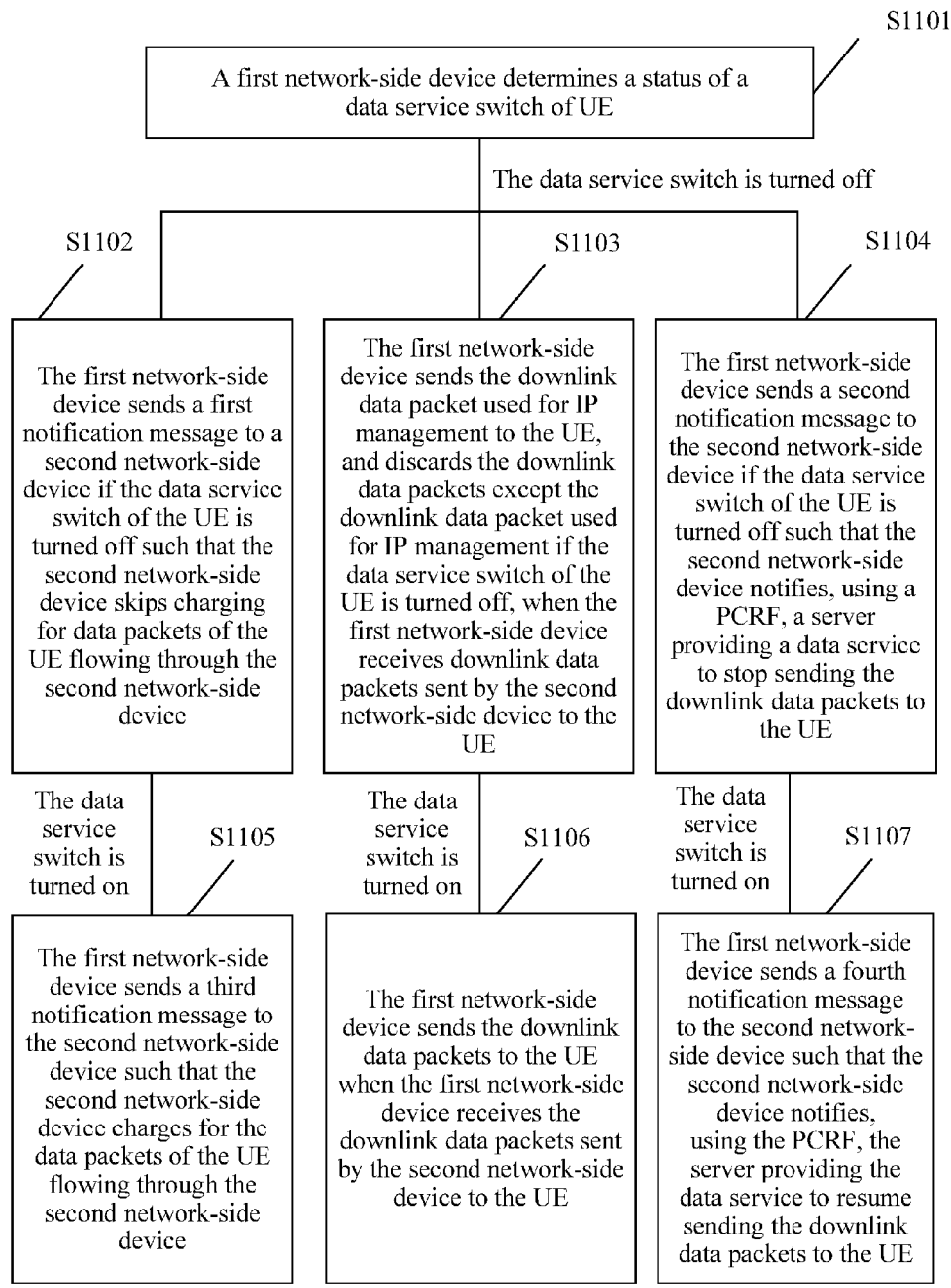
FIG. 11 is a schematic flowchart of another method for implementing a data service according to an embodiment of the present disclosure.

Embodiment 7 of the present disclosure provides another method for implementing a data service, where the method is applied to a first network-side device, and the first network-side device may be an eNB or an SGW. As shown in FIG. 11, the method may include the following steps.

Step S1101: A first network-side device determines a status of a data service switch of UE.

The UE is already registered with a network, and the status of the data service switch may include that the data service switch is turned on or that the data service switch is turned off.

It should be noted that, determining the status of the data service switch of the UE is already described in detail in step S1001, and is not described again herein.

The first network-side device performs step S1102 if the first network-side device determines that the status of the data service switch of the UE is that the data service switch is turned off.

It should be noted that, if the first network-side device determines, in step S1101, that the status of the data service switch of the UE is that the data service switch is turned on, a second network-side device continues to charge for data packets of the UE flowing through the second network-side device. This is the same as other approaches, and is not described again herein.

Step S1102: The first network-side device sends a first notification message to a second network-side device if the data service switch of the UE is turned off such that the second network-side device skips charging for data packets of the UE flowing through the second network-side device.

The first notification message includes first instruction information and an identity of the UE, and the first instruction information instructs the second network-side device to skip charging for the data packets of the UE flowing through the second network-side device.

Content of this step is the same as that of step S1002, and is not described again herein.

It should be noted that, when the first network-side device determines that the data service switch of the UE is turned off, in addition to performing step S1102 to skip charging the UE, the first network-side device may further perform step S1103 and/or S1104 to further avoid generating a usage fee for the UE.

Step S1103: The first network-side device sends the downlink data packet used for IP management to the UE, and discards the downlink data packets except the downlink data packet used for IP management if the data service switch of the UE is turned off, when the first network-side device receives downlink data packets sent by the second network-side device to the UE.

The downlink data packets are data packets sent by a network side to the UE, and may generally include a downlink service data packet and the downlink data packet used for IP management. Types of the downlink data packets are not further limited in the present disclosure.

The downlink service data packet is a data packet sent by the network side to the UE in response to a request of the UE, for example, in response to a web page request or in response to a download request, after the UE initiates a data service (for example, requesting to open a browser or requesting to download a file).

The downlink data packet used for IP management is a data packet used for IP address management, IP address allocation, or the like, for example, may be a Dynamic Host Configuration Protocol (DHCP) data packet used for automatically allocating an IP address.

Further, whether a data packet is a data packet used for IP management may be determined according to information such as a port number and some special fields by parsing the data packet. Certainly, determining may also be performed according to other manners, and is not further limited in the present disclosure.

For example, if the first network-side device receives a data packet 1 sent by the second network-side device to the UE, and obtains, by parsing the data packet 1, a port number UDP67/68 corresponding to the data packet 1, it may be determined that the data packet 1 is a DHCP data packet.

Step S1104: The first network-side device sends a second notification message to the second network-side device if the data service switch of the UE is turned off such that the second network-side device notifies, using a PCRF, a server providing a data service to stop sending the downlink data packets to the UE.

The second notification message includes second instruction information and the identity of the UE, and the second instruction information instructs the second network-side device to notify, using the PCRF, the server providing the data service to stop sending the downlink data packets to the UE.

Further, a form of the second instruction information and a meaning corresponding to the second instruction information may be agreed upon by communication parties (namely, the first network-side device and the second network-side device).

For example, the second instruction information may be in a form of code, for example, "0" or "1." The second instruction information may also be in a form of a character string, for example, "YES" or "NO." Certainly, the second instruction information may also be indicated in other forms. This is not limited in the present disclosure.

It should be noted that, the second instruction information may be stored in a form of a computer language in a device.

Optionally, the second instruction information and the meaning corresponding to the second instruction information may be stored in devices of the communication parties, for example, stored in the first network-side device and the second network-side device.

For example, referring to Table 2, Table 2 shows a correspondence between the second instruction information and the meaning corresponding to the second instruction information. The correspondence may be stored in a form of a table in the devices of the first network-side device and the second network-side device. Certainly, the correspondence between the second instruction information and the meaning corresponding to the second instruction information may also be stored in other forms in the devices of the first network-side device and the second network-side device. This is not limited in the present disclosure.

TABLE 2

| Instruction information | Meaning of the instruction information |
| --- | --- |
| STOP | The second network-side device notifies, using the PCRF, the server providing the data service to stop sending the downlink data packets to the UE |

It should be noted that, Table 2 uses only an example to describe the correspondence between the second instruction information and the meaning corresponding to the second instruction information for description, but does not further limit the form and content of the second instruction information.

Further, the identity of the UE is a unique identity of the UE. The UE may be determined uniquely and accurately according to the identity of the UE.

For example, the identity of the UE may be an IP address of the UE, or certainly may be a number of the UE or another identity that may uniquely determine the UE. This is not further limited in the present disclosure.

For example, assuming that an identity of UE2 is an IP address 2, the first network-side device and the second network-side device agree that "STOP" is used as the second instruction information to instruct the second network-side device to notify, using the PCRF, the server providing the data service to stop sending downlink data packets to the UE. The first network-side device sends a notification message B: <IP address 2, STOP> to the second network-side device if the first network-side device determines that a data service switch of the UE2 is turned off, where the notification message B instructs the second network-side device to notify, using the PCRF, the server providing the data service to stop sending the downlink data packets to the UE2 such that the second network-side device notifies, using the PCRF, the server providing the data service to stop sending the downlink data packets to the UE2.

When the second network-side device notifies, using the PCRF, the server providing the data service to stop sending the downlink data packets to the UE, a form of a notification message may be used to notify the server providing the data service. For the form of the notification message, reference may be made to the second notification message in step S1104. Certainly, other forms of notification messages may also be used to notify the server providing the data service. This is not limited in the present disclosure.

It should be noted that, in an actual application, the first notification message sent by the first network-side device to the second network-side device in step S1102 and the second notification message sent by the first network-side device to the second network-side device in step S1104 may be implemented using one notification message. The notification message includes instruction information used to instruct the second network-side device to skip charging for the data packets of the UE flowing through the second network-side device, instruction information used to instruct the second network-side device to notify, using the PCRF, the server providing the data service to stop sending the downlink data packets to the UE, and the identity of the UE. Certainly, the instruction information used to instruct the second network-side device to skip charging for the data packets of the UE flowing through the second network-side device and the instruction information used to instruct the second network-side device to notify, using the PCRF, the server providing the data service to stop sending the downlink data packets to the UE may also be implemented using one piece of instruction information. This is not limited in the present disclosure.

For example, assuming that an identity of UE3 is an IP address 3, the first network-side device and the second network-side device agree that "0" instructs the second network-side device to skip charging for data packets of the UE flowing through the second network-side device and that "1" instructs the second network-side device to notify, using the PCRF, the server providing the data service to stop sending downlink data packets to the UE. If the first network-side device determines that a data service switch of the UE3 is turned off, the first network-side device sends a notification message C: <IP address 3, 0, 1> to the second network-side device such that the second network-side device skips charging for the data packets of the UE flowing through the second network-side device and notifies, using the PCRF, the server providing the data service to stop sending the downlink data packets to the UE. Alternatively, if the first network-side device determines that a data service switch of the UE3 is turned off, the first network-side device sends a notification message C: <IP address 3, 01> to the second network-side device such that the second network-side device skips charging for the data packets of the UE flowing through the second network-side device and notifies, using the PCRF, the server providing the data service to stop sending the downlink data packets to the UE.

It should be noted that, only an example for describing a manner of implementing the first notification message and the second notification message using one notification message is illustrated above, and the manner of implementing the first notification message and the second notification message using one notification message is not limited thereto.

It should be noted that, a sequence of multiple pieces of instruction information and the identity of the UE included in one notification message is not limited in all embodiments of the present disclosure, and may be determined according to an actual requirement, as long as it is ensured that the notification message is agreed upon and determined by the receiving and transmitting parties.

It should also be noted that, steps S1102, S1103, and S1104 may be performed simultaneously or sequentially in an actual application process. This is not limited in the present disclosure. FIG. 11 shows only a case in which steps S1102, S1103, and S1104 are performed simultaneously, but does not limit a sequence of performing steps S1102, S1103, and S1104.

After step S1102, if the UE turns on the data service switch, the first network-side device determines that the status of the data service switch of the UE is that the data service switch is turned on, which indicates that a user using the UE requires the data service. In this case, the first network-side device needs to perform step S1105.

Step S1105: The first network-side device sends a third notification message to the second network-side device such that the second network-side device charges for the data packets of the UE flowing through the second network-side device.

The third notification message includes third instruction information and the identity of the UE.

Further, the third instruction information instructs the second network-side device to charge for the data packets of the UE flowing through the second network-side device. A form of the third instruction information and a meaning corresponding to the third instruction information may be already agreed upon by the communication parties (namely, the first network-side device and the second network-side device).

For example, the third instruction information may be in a form of code, for example, "0" or "1." The third instruction information may also be in a form of a character string, for example, "YES" or "NO." Certainly, the third instruction information may also be indicated in other forms. This is not limited in the present disclosure.

It should be noted that, the third instruction information may be stored in a form of a computer language in a device.

Optionally, the third instruction information and the meaning corresponding to the third instruction information may be stored in the devices of the communication parties, for example, stored in the first network-side device and the second network-side device.

For example, referring to Table 3, Table 3 shows a correspondence between the third instruction information and the meaning corresponding to the third instruction information. The correspondence may be stored in a form of a table in the devices of the first network-side device and the second network-side device. Certainly, the correspondence between the third instruction information and the meaning corresponding to the third instruction information may also be stored in other forms in the devices of the first network-side device and the second network-side device. This is not further limited in the present disclosure.

TABLE 3

| Instruction information | Meaning of the instruction information |
|---|---|
| 1 | The second network-side device charges for the data packets of the UE flowing through the second network-side device |

It should be noted that, Table 3 uses only an example to describe the correspondence between the third instruction information and the meaning corresponding to the third instruction information for description, but does not limit the form and content of the third instruction information.

Further, the identity of the UE is a unique identity of the UE. The UE may be determined uniquely and accurately according to the identity of the UE.

For example, the identity of the UE may be an IP address of the UE, or certainly may be a number of the UE or another identity that may uniquely determine the UE. This is not limited in the present disclosure.

For example, assuming that an identity of UE4 is an IP address 4, the first network-side device and the second network-side device agree that "1" is used as the first instruction information to instruct the second network-side device to charge for data packets of the UE flowing through the second network-side device. If the first network-side device determines that a data service switch of the UE4 is turned off, the first network-side device sends a notification message D: <IP address 4, 1> to the second network-side device, where the notification message D instructs the second network-side device to charge for data packets of the UE4 flowing through the second network-side device such that the second network-side device charges for the data packets of the UE4 flowing through the second network-side device.

Optionally, that the third instruction message instructs the second network-side device to charge for the data packets of the UE flowing through the second network-side device may include either of the following two cases.

In a first case, the third instruction information only instructs the second network-side device to charge for the data packets of the UE flowing through the second network-side device, but does not indicate a specific manner of charging.

In the first case, the third instruction information only instructs the second network-side device to charge for the data packets of the UE flowing through the second network-side device. The specific manner of charging corresponds to a manner of instructing the second network-side device to skip charging for the data packets of the UE flowing through the second network-side device in step S1102.

For example, in step S1102, if the first instruction information instructs the second network-side device to ignore the PCC policy and directly skip charging for the data packets of the UE flowing through the second network-side device, when the second network-side device receives the third notification message, charging is performed, by referring to the ignored PCC policy, for the data packets of the UE flowing through the second network-side device.

In a second case, there are at least two manners in which the first instruction information instructs the second network-side device to skip charging for the data packets of the UE flowing through the second network-side device. That the third instruction information instructs the second network-side device to charge for the data packets of the UE flowing through the second network-side device may also correspondingly include either of the following two manners.

In a first manner, if the first notification message sent to the second network-side device instructs the second network-side device to ignore the PCC policy and directly skip charging for the data packets of the UE flowing through the second network-side device, after the first notification message is sent, when the first network-side device determines that the data service switch of the UE is turned on, the third notification message sent to the second network-side device instructs the second network-side device to charge again for the data packets of the UE flowing through the second network-side device, that is, perform charging, by referring to the ignored PCC policy, for the data packets of the UE flowing through the second network-side device.

In a second manner, if the first notification message sent to the second network-side device instructs the second network-side device to notify the PCRF to use a preset non-charging PCC policy for the UE, where the preset non-charging PCC policy is a policy for skipping charging for the data packets of the UE flowing through the second network-side device, after the first notification message is sent, when the first network-side device determines that the data service switch of the UE is turned on, the third notification message sent to the second network-side device instructs the second network-side device to notify the PCRF to use a preset charging PCC policy for the UE, where the preset charging PCC policy is a policy for charging for the data packets of the UE flowing through the second network-side device.

It should be noted that, the preset charging PCC policy in all embodiments of the present disclosure may be preset in the PCRF beforehand, or may be customized according to the third notification message. A time of generating the preset charging PCC policy and specific content are not limited in the present disclosure.

After step S1103, if the UE turns on the data service switch, the first network-side device determines that the data service switch of the UE is turned on, which indicates that the user using the UE requires the data service. In this case, the first network-side device needs to perform step S1106.

Step S1106: The first network-side device sends the downlink data packets to the UE when the first network-side device receives the downlink data packets sent by the second network-side device to the UE.

After step S1104, if the UE turns on the data service switch, the first network-side device determines that the data service switch of the UE is turned on, which indicates that the user using the UE requires the data service. In this case, the first network-side device further needs to perform step S1107.

Step S1107: The first network-side device sends a fourth notification message to the second network-side device such that the second network-side device notifies, using the PCRF, the server providing the data service to resume sending the downlink data packets to the UE.

The fourth notification message includes fourth instruction information and the identity of the UE.

Further, the fourth instruction information instructs the second network-side device to notify, using the PCRF, the server providing the data service to resume sending the downlink data packets to the UE. A form of the fourth instruction information and a meaning corresponding to the fourth instruction information may be already agreed upon by the communication parties (namely, the first network-side device and the second network-side device).

For example, the fourth instruction information may be in a form of code, for example, "0" or "1." The fourth instruction information may also be in a form of a character string, for example, "YES" or "NO." Certainly, the fourth instruction information may also be indicated in other forms. This is not limited in the present disclosure.

It should be noted that, the fourth instruction information may be stored in a form of a computer language in a device.

Optionally, the fourth instruction information and the meaning corresponding to the fourth instruction information may be stored in the devices of the communication parties, for example, stored in the first network-side device and the second network-side device.

For example, referring to Table 4, Table 4 shows a correspondence between the fourth instruction information and the meaning corresponding to the fourth instruction information. The correspondence may be stored in a form of a table in the devices of the first network-side device and the second network-side device. Certainly, the correspondence between the fourth instruction information and the meaning corresponding to the fourth instruction information may also be stored in other forms in the devices of the first network-side device and the second network-side device. This is not further limited in the present disclosure.

TABLE 4

| Instruction information | Meaning of the instruction information |
| --- | --- |
| BEGIN | The second network-side device notifies, using the PCRF, the server providing the data service to resume sending the downlink data packets to the UE |

It should be noted that, Table 4 uses only an example to describe the correspondence between the fourth instruction information and the meaning corresponding to the fourth instruction information for description, but does not further limit the form and content of the fourth instruction information.

Further, the identity of the UE is a unique identity of the UE. The UE may be determined uniquely and accurately according to the identity of the UE.

For example, the identity of the UE may be an IP address of the UE, or certainly may be a number of the UE or another identity that may uniquely determine the UE. This is not further limited in the present disclosure.

For example, assuming that an identity of UE5 is an IP address 5, the first network-side device and the second network-side device agree that "BEGIN" is used as the first instruction information to instruct the second network-side device to notify, using the PCRF, the server providing the data service to resume sending the downlink data packets to the UE. If the first network-side device determines that a data service switch of the UE5 is turned on, the first network-side device sends a notification message E: <IP address 5, BEGIN> to the second network-side device, where the notification message E instructs the second network-side device to notify, using the PCRF, the server providing the data service to resume sending the downlink data packets to the UE5 such that the second network-side device notifies, using the PCRF, the server providing the data service to resume sending the downlink data packets to the UE5.

It should be noted that, in an actual application, the third notification message sent by the first network-side device to the second network-side device in step S1105 and the fourth notification message sent by the first network-side device to the second network-side device in step S1107 may be implemented using one notification message. The notification message includes instruction information used to instruct the second network-side device to charge for the data packets of the UE flowing through the second network-side device, instruction information used to instruct the second network-side device to notify, using the PCRF, the server providing the data service to resume sending the downlink data packets to the UE, and the identity of the UE. Certainly, the instruction information used to instruct the second network-side device to charge for the data packets of the UE flowing through the second network-side device and the instruction information used to instruct the second network-side device to notify, using the PCRF, the server providing the data service to resume sending the downlink data packets to the UE may also be implemented using one piece of instruction information. This is not further limited in the present disclosure.

It should be noted that, steps S1105, S1106, and S1107 may be performed simultaneously or sequentially in an actual application process. This is not further limited in the present disclosure. FIG. 11 shows only a case in which steps S1105, S1106, and S1107 are performed simultaneously, but does not further limit a sequence of performing steps S1105, S1106, and S1107.

This embodiment of the present disclosure provides a method for implementing a data service. A first network-side device determines a status of a data service switch of UE, and if the data service switch of the UE is turned off, sends a first notification message to a second network-side device. The first network-side device sends the downlink data packet used for IP management to the UE, and discards the downlink data packets except the downlink data packet used for IP management when the first network-side device receives downlink data packets sent by the second network-side device to the UE. The first network-side device sends a second notification message to a second network-device. The UE is already registered with a network, the first notification message includes first instruction information and an identity of the UE, and the first instruction information instructs the second network-side device to skip charging for data packets of the UE flowing through the second network-side device. The second notification message includes second instruction information and the identity of the UE, and the second instruction information instructs the second network-side device to notify, using a PCRF, a server providing the data service to stop sending the downlink data packets to the UE. The first network-side device determines the status of the data service switch of the UE, and if the data service switch of the UE is turned off, instructs the second network-side device to skip charging for the data packets of the UE flowing through the second network-side device. The first network-side device sends the downlink data packet used for IP management to the UE, and discards the downlink data packets except the downlink data packet used for IP management when the first network-side device receives the downlink data packets sent by the second network-side device to the UE. The first network-side device also instructs the second network-side device to notify, using the PCRF, the server providing the data service to stop sending the downlink data packets to the UE. By instructing to skip charging, discarding the downlink data packets except the downlink data packet used for IP management, and instructing the server providing the data service not to send the downlink data packets to the UE, this embodiment avoids generating an unnecessary data usage fee for the UE after the data service switch of the UE is turned off and further avoids data usage waste, and resolves a problem in the prior art that after a data service switch of UE is turned off, there is data usage waste because an unnecessary data usage fee may be generated for the UE.

Embodiment 8

Figure 12:
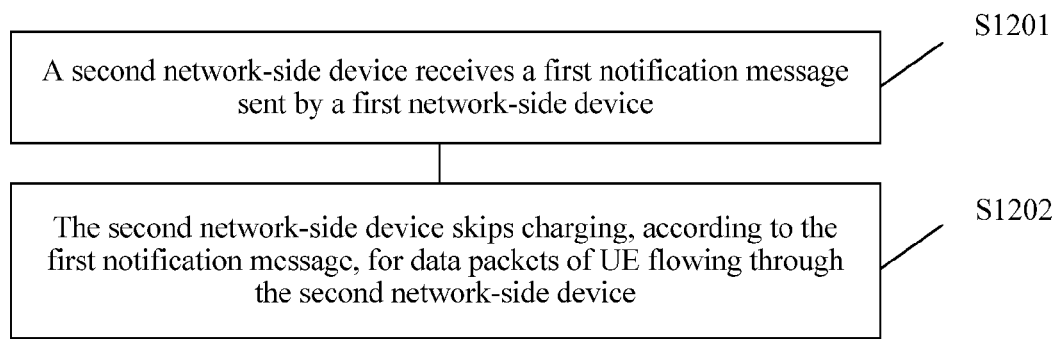
FIG. 12 is a schematic flowchart of a yet another method for implementing a data service according to an embodiment of the present disclosure.

Embodiment 8 of the present disclosure provides yet another method for implementing a data service, where the method is applied to a second network-side device. As shown in FIG. 12, the method may include the following steps.

Step S1201: A second network-side device receives a first notification message sent by a first network-side device.

The first notification message includes first instruction information and an identity of UE. The first notification message is sent to the second network-side device when the first network-side device determines that a data service switch of the UE is turned off. The first instruction information instructs the second network-side device to skip charging for data packets of the UE flowing through the second network-side device.

Optionally, the second network-side device may be a PGW serving the UE.

Further, a form and content of the first notification message are the same as those of the first notification message in step S1001, and are not described again herein.

Step S1202: The second network-side device skips charging, according to the first notification message, for data packets of UE flowing through the second network-side device.

The data packets of the UE may include downlink data packets, or uplink data packets and downlink data packets.

Optionally, a manner in which the second network-side device skips charging, according to the first notification message, for the data packets of the UE flowing through the second network-side device, is related to instruction content of the first notification message, and may further include the following two cases.

In a first case, the first notification message only notifies the second network-side device to skip charging for the data packets of the UE flowing through the second network-side device, but does not indicate a specific manner of skipping charging. The second network-side device receiving the first notification message decides, by itself, the specific manner of skipping charging for the data packets of the UE flowing through the second network-side device.

In a second case, the first notification message notifies the second network-side device to skip charging for the data packets of the UE flowing through the second network-side device, and indicates a specific manner of skipping charging. The second network-side device receiving the first notification message skips charging, according to the manner indicated in the first notification message, for the data packets of the UE flowing through the second network-side device.

In either of the foregoing two cases, the second network-side device may use the following two manners to skip charging for the data packets of the UE flowing through the second network-side device.

In a first manner, the second network-side device ignores a PCC policy according to the first notification message, and directly skips charging for the data packets of the UE flowing through the second network-side device, where the UE is the UE corresponding to the identity of the UE included in the first notification message.

Preferably, because the UE does not send an uplink data packet when the data service switch of the UE is turned off, the first instruction information may be used to instruct the second network-side device to ignore the PCC policy and directly skip charging for the downlink data packets of the UE flowing through the second network-side device, and the second network-side device receiving the first notification message does not refer to the PCC policy any longer, but directly skips charging for the downlink data packets of the UE flowing through the second network-side device.

In a second manner, the second network-side device sends a second notification message to a PCRF according to the first notification message.

The second notification message includes second instruction information and the identity of the UE.

Further, the second instruction information instructs the PCRF to use a preset non-charging PCC policy for the UE. A form of the second instruction information and a meaning corresponding to the second instruction information may be already agreed upon by communication parties (namely, the second network-side device and the PCRF).

For example, the second instruction information may be in a form of code, for example, "0" or "1." The second instruction information may also be in a form of a character string, for example, "YES" or "NO." Certainly, the second instruction information may also be indicated in other forms. This is not further limited in the present disclosure.

It should be noted that, the second instruction information may be stored in a form of a computer language in a device.

Optionally, the second instruction information and the meaning corresponding to the second instruction information may be stored in devices of the communication parties, for example, stored in the second network-side device and the PCRF.

For example, referring to Table 5, Table 5 shows a correspondence between the second instruction information and the meaning corresponding to the second instruction information. The correspondence may be stored in a form of a table in the devices of the second network-side device and the PCRF. Certainly, the correspondence between the second instruction information and the meaning corresponding to the second instruction information may also be stored in other forms in the devices of the second network-side device and the PCRF. This is not further limited in the present disclosure.

TABLE 5

| Instruction information | Meaning of the instruction information |
|---|---|
| 0 | The PCRF uses the preset non-charging PCC policy for the UE |

It should be noted that, Table 5 uses only an example to describe the correspondence between the second instruction information and the meaning corresponding to the second instruction information for description, but does not further limit the form and content of the second instruction information.

Further, the identity of the UE is a unique identity of the UE. The UE may be determined uniquely and accurately according to the identity of the UE.

For example, the identity of the UE may be an IP address of the UE, or certainly may be a number of the UE or another identity that may uniquely determine the UE. This is not further limited in the present disclosure.

For example, assuming that an identity of UE6 is an IP address 6, the second network-side device and the PCRF agree that "0" is used as the second instruction information to instruct the PCRF to use the preset non-charging PCC policy for the UE, where the preset non-charging PCC policy is a policy for skipping charging for data packets of the UE flowing through the second network-side device. If the first network-side device determines that a data service switch of the UE6 is turned off, the second network-side device receives a notification message that is sent by the first network-side device and used to instruct the second network-side device to notify the PCRF to use the preset non-charging PCC policy for the UE6. The second network-side device sends, according to the notification message, a notification message F: <IP address 6, 0> to the PCRF, where the notification message F instructs the PCRF to use the preset non-charging PCC policy for the UE6, and the preset non-charging PCC policy is a policy for skipping charging for data packets of the UE6 flowing through the second network-side device such that the second network-side device skips charging for the data packets of the UE6 flowing through the second network-side device.

This embodiment of the present disclosure provides a method for implementing a data service, where the method is applied to a second network-side device. The second network-side device receives a first notification message sent by a first network-side device, where the first notification message includes first instruction information and an identity of UE, and the first instruction information instructs the second network-side device to skip charging for data packets of the UE flowing through the second network-side device, and the second network-side device skips charging, according to an instruction of the first notification message, for the data packets of the UE flowing through the second network-side device. Because the first notification message is sent when the first network-side device determines that a data service switch of the UE is turned off, this avoids generating an unnecessary data usage fee for the UE after the data service switch of the UE is turned off and further avoids data usage waste, and resolves a problem in the prior art that after a data service switch of UE is turned off, there is data usage waste because an unnecessary data usage fee may be generated for the UE.

Embodiment 9

Figure 13:
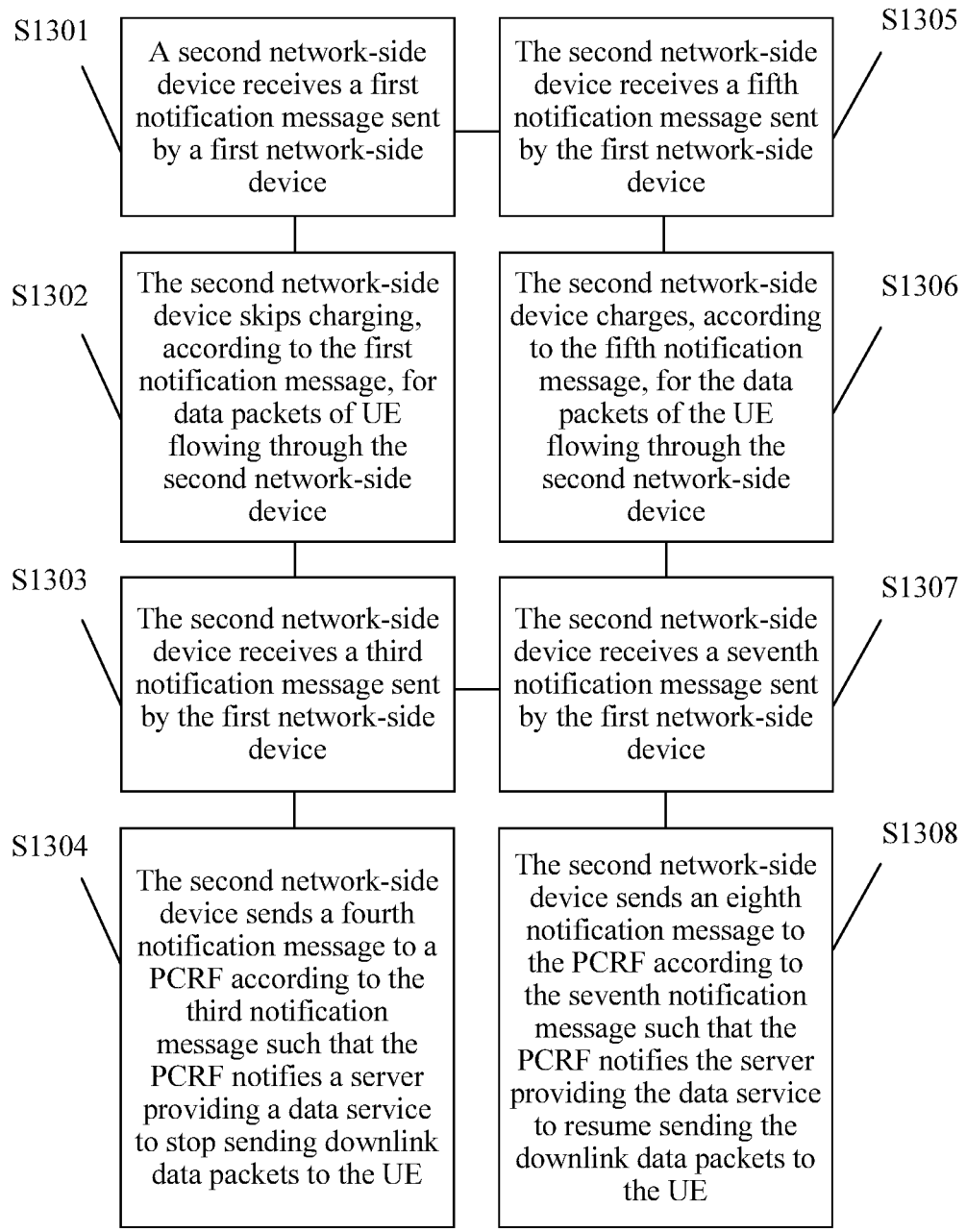
FIG. 13 is a schematic flowchart of a still another method for implementing a data service according to an embodiment of the present disclosure.

Embodiment 9 of the present disclosure provides still another method for implementing a data service, where the method is applied to a second network-side device, and the second network-side device may be a PGW serving UE. As shown in FIG. 13, the method may include the following steps.

Step S1301: A second network-side device receives a first notification message sent by a first network-side device.

The first notification message includes first instruction information and an identity of UE, and the first instruction information instructs the second network-side device to skip charging for data packets of the UE flowing through the second network-side device.

Content of this step is the same as that of step S1201, and is not described again herein.

Step S1302: The second network-side device skips charging, according to the first notification message, for data packets of UE flowing through the second network-side device.

Optionally, a manner in which the second network-side device skips charging, according to the first notification message, for the data packets of the UE flowing through the second network-side device, is related to instruction content of the first notification message, and may include the following two cases.

In a first case, the first notification message only notifies the second network-side device to skip charging for the data packets of the UE flowing through the second network-side device, but does not indicate a specific manner of skipping charging. The second network-side device receiving the first notification message decides, by itself, the specific manner of skipping charging for the data packets of the UE flowing through the second network-side device.

In a second case, the first notification message notifies the second network-side device to skip charging for the data packets of the UE flowing through the second network-side device, and indicates a specific manner of skipping charging. The second network-side device receiving the first notification message skips charging, according to the manner indicated in the first notification message, for the data packets of the UE flowing through the second network-side device.

In either of the foregoing two cases, the second network-side device may use the following two manners to skip charging for the data packets of the UE flowing through the second network-side device.

In a first manner, the second network-side device ignores a PCC policy according to the first notification message, and directly skips charging for the data packets of the UE flowing through the second network-side device, where the UE corresponds to the identity of the UE included in the first notification message.

Preferably, because the UE does not send an uplink data packet when a data service switch of the UE is turned off, the first instruction information may be used to instruct the second network-side device to ignore the PCC policy and directly skip charging for downlink data packets of the UE flowing through the second network-side device, and the second network-side device receiving the first notification message does not refer to the PCC policy any longer, but directly skips charging for the downlink data packets of the UE flowing through the second network-side device.

In a second manner, the second network-side device sends a second notification message to a PCRF according to the first notification message.

The second notification message includes second instruction information and the identity of the UE. The second instruction information instructs the PCRF to use a preset non-charging PCC policy for the UE.

Step S1303: The second network-side device receives a third notification message sent by the first network-side device.

The third notification message includes third instruction information and the identity of the UE. The third notification message is sent to the second network-side device when the first network-side device determines that the data service switch of the UE is turned off. The third instruction information instructs the second network-side device to notify, using the PCRF, a server providing a data service to stop sending the downlink data packets to the UE.

Further, a form and content of the third notification message are the same as those of the second notification message in step S1104, and are not described again herein.

It should be noted that, steps S1301 and S1303 may be performed simultaneously, or may be performed sequentially. This depends on a manner of sending the first notification message and the third notification message by the first network-side device. FIG. 13 shows only a case in which steps S1301 and S1303 are performed sequentially, but does not limit a sequence of receiving the first notification message and the third notification message by the second network-side device.

It should also be noted that, in an actual application, the first notification message sent by the first network-side device to the second network-side device in step S1301 and the third notification message sent by the first network-side device to the second network-side device in step S1303 may be implemented using one notification message. The notification message includes instruction information used to instruct the second network-side device to skip charging for the data packets of the UE flowing through the second network-side device, instruction information used to instruct the second network-side device to notify, using the PCRF, the server providing the data service to stop sending the downlink data packets to the UE, and the identity of the UE. Certainly, the instruction information used to instruct the second network-side device to skip charging for the data packets of the UE flowing through the second network-side device and the instruction information used to instruct the second network-side device to notify, using the PCRF, the server providing the data service to stop sending the downlink data packets to the UE may also be implemented using one piece of instruction information. This is not further limited in the present disclosure.

Step S1304: The second network-side device sends a fourth notification message to a PCRF according to the third notification message such that the PCRF notifies a server providing a data service to stop sending downlink data packets to the UE.

The fourth notification message includes fourth instruction information and the identity of the UE.

Further, the fourth instruction information instructs the PCRF to notify the server providing the data service to stop sending the downlink data packets to the UE. A form of the fourth instruction information and a meaning corresponding to the fourth instruction information may be already agreed upon by communication parties (namely, the second network-side device and the PCRF).

For example, the fourth instruction information may be in a form of code, for example, "0" or "1." The fourth instruction information may also be in a form of a character string, for example, "YES" or "NO." Certainly, the fourth instruction information may also be indicated in other forms. This is not further limited in the present disclosure.

It should be noted that, the fourth instruction information may be stored in a form of a computer language in a device.

Optionally, the fourth instruction information and the meaning corresponding to the fourth instruction information may be stored in devices of the communication parties, for example, stored in the second network-side device and the PCRF.

For example, referring to Table 6, Table 6 shows a correspondence between the fourth instruction information and the meaning corresponding to the fourth instruction information. The correspondence may be stored in a form of a table in the devices of the second network-side device and the PCRF. Certainly, the correspondence between the fourth instruction information and the meaning corresponding to the fourth instruction information may also be stored in other forms in the devices of the second network-side device and the PCRF. This is not further limited in the present disclosure.

TABLE 6

| Instruction information | Meaning of the instruction information |
|---|---|
| STOP | The PCRF notifies the server providing the data service to stop sending the downlink data packets to the UE |

It should be noted that, Table 6 uses only an example to describe the correspondence between the fourth instruction information and the meaning corresponding to the fourth instruction information for description, but does not limit the form and content of the fourth instruction information.

Further, the identity of the UE is a unique identity of the UE. The UE may be determined uniquely and accurately according to the identity of the UE.

For example, the identity of the UE may be an IP address of the UE, or certainly may be a number of the UE or another identity that may uniquely determine the UE. This is not further limited in the present disclosure.

For example, assuming that an identity of UE7 is an IP address 7, the second network-side device and the PCRF agree that "STOP" is used as the fourth instruction information to instruct the PCRF to notify the server providing the data service to stop sending downlink data packets to the UE. If the first network-side device determines that a data service switch of the UE7 is turned off, the second network-side device receives a notification message that is sent by the first network-side device and used to instruct the second network-side device to notify, using the PCRF, the server providing the data service to stop sending the downlink data packets to the UE7. The second network-side device sends, according to the notification message, a notification message G: <IP address 7, STOP> to the PCRF, where the notification message G instructs the PCRF to notify the server providing the data service to stop sending the downlink data packets to the UE7 such that the second network-side device notifies, using the PCRF, the server providing the data service to stop sending the downlink data packets to the UE7.

It should be noted that, steps S1302 and S1304 may be performed simultaneously, or may be performed sequentially. This is not further limited in the present disclosure. FIG. 13 shows only a case in which steps S1302 and S1304 are performed sequentially, but does not limit a specific implementation manner.

It should be noted that, in an actual application, the second notification message sent by the second network-side device to the PCRF in the second manner of step S1302 and the fourth notification message sent by the second network-side device to the PCRF in step S1304 may be implemented using one notification message. The notification message includes instruction information used to instruct the PCRF to use the preset non-charging PCC policy for the UE, instruction information used to instruct the PCRF to notify the server providing the data service to stop sending the downlink data packets to the UE, and the identity of the UE. Certainly, the instruction information used to instruct the PCRF to use the preset non-charging PCC policy for the UE and the instruction information used to instruct the PCRF to notify the server providing the data service to stop sending the downlink data packets to the UE may also be implemented using one piece of instruction information. This is not further limited in the present disclosure.

After step S1301, if the UE turns on the data service switch, the first network-side device determines that the data service switch of the UE is turned on, which indicates that a user using the UE requires the data service. In this case, the first network-side device may notify the second network-side device to charge for the data packets of the UE flowing through the second network-side device. In this case, the second network-side device needs to perform step S1305.

Step S1305: The second network-side device receives a fifth notification message sent by the first network-side device.

The fifth notification message includes fifth instruction information and the identity of the UE. The fifth notification message is sent to the second network-side device if the first network-side device determines that the data service switch of the UE is turned on after the first network-side device sends the first notification message. The fifth instruction information instructs the second network-side device to charge for the data packets of the UE flowing through the second network-side device.

Further, a form and content of the fifth notification message are the same as those of the third notification message in step S1105, and are not described again herein.

Optionally, that the fifth instruction information instructs the second network-side device to charge for the data packets of the UE flowing through the second network-side device may include but is not limited to the following two cases.

In a first case, the fifth instruction information only notifies the second network-side device to charge for the data packets of the UE flowing through the second network-side device, but does not indicate a specific method for charging by the second network-side device.

In a second case, the fifth instruction information further instructs the second network-side device how to charge for the data packets of the UE flowing through the second network-side device. The following two manners may be included.

In a first manner, the fifth instruction information instructs the second network-side device to use the ignored PCC policy to charge for the data packets of the UE flowing through the second network-side device.

In a second manner, the fifth instruction information instructs the second network-side device to notify the PCRF to use a preset charging PCC policy for the UE, where the preset charging PCC policy is a policy for charging for the data packets of the UE flowing through the second network-side device.

Step S1306: The second network-side device charges, according to the fifth notification message, for the data packets of the UE flowing through the second network-side device.

Optionally, a manner in which the second network-side device charges, according to the fifth notification message, for the data packets of the UE flowing through the second network-side device, is related to instruction content of the fifth notification message, and may include the following two cases.

In a first case, the fifth notification message only notifies the second network-side device to charge for the data packets of the UE flowing through the second network-side device, but does not indicate a specific manner of charging. The second network-side device receiving the fifth notification message decides, by itself, the specific manner of charging for the data packets of the UE flowing through the second network-side device.

In a second case, the fifth notification message notifies the second network-side device to charge for the data packets of the UE flowing through the second network-side device, and indicates a specific manner of charging. The second network-side device receiving the fifth notification message charges, according to the manner indicated in the fifth notification message, for the data packets of the UE flowing through the second network-side device.

In either of the foregoing two cases, the second network-side device may use the following two manners to charge for the data packets of the UE flowing through the second network-side device.

In a first manner, the second network-side device charges, using the ignored PCC policy and according to the fifth notification message, for the data packets of the UE flowing through the second network-side device, where the UE is the UE corresponding to the identity of the UE included in the first notification message.

In a second manner, the second network-side device sends a sixth notification message to the PCRF according to the fifth notification message.

The sixth notification message includes sixth instruction information and the identity of the UE.

Further, the sixth instruction information instructs the PCRF to use the preset charging PCC policy for the UE. A form of the sixth instruction information and a meaning corresponding to the sixth instruction information may be already agreed upon by the communication parties (namely, the second network-side device and the PCRF).

For example, the sixth instruction information may be in a form of code, for example, "0" or "1." The sixth instruction information may also be in a form of a character string, for example, "YES" or "NO." Certainly, the sixth instruction information may also be indicated in other forms. This is not further limited in the present disclosure.

It should be noted that, the sixth instruction information may be stored in a form of a computer language in a device.

Optionally, the sixth instruction information and the meaning corresponding to the sixth instruction information may be stored in the devices of the communication parties, for example, stored in the second network-side device and the PCRF.

For example, referring to Table 7, Table 7 shows a correspondence between the sixth instruction information and the meaning corresponding to the sixth instruction information. The correspondence may be stored in a form of a table in the devices of the second network-side device and the PCRF. Certainly, the correspondence between the sixth instruction information and the meaning corresponding to the sixth instruction information may also be stored in other forms in the devices of the second network-side device and the PCRF. This is not further limited in the present disclosure.

TABLE 7

| Instruction information | Meaning of the instruction information |
| --- | --- |
| 1 | The PCRF uses the preset charging PCC policy for the UE |

It should be noted that, Table 7 uses only an example to describe the correspondence between the sixth instruction information and the meaning corresponding to the sixth instruction information for description, but does not further limit the form and content of the sixth instruction information.

Further, the identity of the UE is a unique identity of the UE. The UE may be determined uniquely and accurately according to the identity of the UE.

For example, the identity of the UE may be an IP address of the UE, or certainly may be a number of the UE or another identity that may uniquely determine the UE. This is not further limited in the present disclosure.

For example, assuming that an identity of UE8 is an IP address 8, the second network-side device and the PCRF agree that "1" is used as the sixth instruction information to instruct the PCRF to use the preset charging PCC policy for the UE. After the first network-side device determines that a data service switch of the UE8 is turned off, if the first network-side device determines that the data service switch of the UE8 is turned on, the second network-side device receives a notification message that is sent by the first network-side device and used to instruct the second network-side device to notify the PCRF to use the preset charging PCC policy for the UE8. The second network-side device sends, according to the notification message, a notification message H: <IP address 8, 1> to the PCRF, where the notification message H instructs the PCRF to use the preset charging PCC policy for the UE8 such that the second network-side device charges for data packets of the UE8 flowing through the second network-side device.

After step S1303, if the UE turns on the data service switch, the first network-side device determines that the data service switch of the UE is turned on, which indicates that the user using the UE requires the data service. In this case, the first network-side device may notify the second network-side device to notify, using the PCRF, the server providing the data service to resume sending the downlink data packets to the UE. In this case, the second network-side device needs to perform step S1307.

Step S1307: The second network-side device receives a seventh notification message sent by the first network-side device.

The seventh notification message includes seventh instruction information and the identity of the UE. The seventh notification message is sent to the second network-side device if the first network-side device determines that the data service switch of the UE is turned on after the first network-side device sends the third notification message. The seventh instruction information instructs the second network-side device to notify, using the PCRF, the server providing the data service to resume sending the downlink data packets to the UE.

Further, a form and content of the seventh notification message are the same as those of the fourth notification message in step S1107, and are not described again herein.

It should be noted that, steps S1305 and S1307 may be performed simultaneously, or may be performed sequentially. This depends on a manner of sending the fifth notification message and the seventh notification message by the first network-side device. FIG. 13 shows only a case in which steps S1305 and S1307 are performed sequentially, but does not further limit a sequence of receiving the fifth notification message and the seventh notification message by the second network-side device.

It should be noted that, in an actual application, the fifth notification message sent by the first network-side device to the second network-side device in step S1305 and the seventh notification message sent by the first network-side device to the second network-side device in step S1307 may be implemented using one notification message. The notification message includes instruction information used to instruct the second network-side device to charge for the data packets of the UE flowing through the second network-side device, instruction information used to instruct the second network-side device to notify, using the PCRF, the server providing the data service to resume sending the downlink data packets to the UE, and the identity of the UE. Certainly, the instruction information used to instruct the second network-side device to charge for the data packets of the UE flowing through the second network-side device and the instruction information used to instruct the second network-side device to notify, using the PCRF, the server providing the data service to resume sending the downlink data packets to the UE may also be implemented using one piece of instruction information. This is not further limited in the present disclosure.

Step S1308: The second network-side device sends an eighth notification message to the PCRF according to the seventh notification message such that the PCRF notifies the server providing the data service to resume sending the downlink data packets to the UE.

The eighth notification message includes eighth instruction information and the identity of the UE.

Further, the eighth instruction information instructs the PCRF to notify the server providing the data service to resume sending the downlink data packets to the UE. A form of the eighth instruction information and a meaning corresponding to the eighth instruction information may be already agreed upon by the communication parties (namely, the second network-side device and the PCRF).

For example, the eighth instruction information may be in a form of code, for example, "0" or "1." The eighth instruction information may also be in a form of a character string, for example, "YES" or "NO." Certainly, the eighth instruction information may also be indicated in other forms. This is not further limited in the present disclosure.

It should be noted that, the eighth instruction information may be stored in a form of a computer language in a device.

Optionally, the eighth instruction information and the meaning corresponding to the eighth instruction information may be stored in the devices of the communication parties, for example, stored in the second network-side device and the PCRF.

For example, referring to Table 8, Table 8 shows a correspondence between the eighth instruction information and the meaning corresponding to the eighth instruction information. The correspondence may be stored in a form of a table in the devices of the second network-side device and the PCRF. Certainly, the correspondence between the eighth instruction information and the meaning corresponding to the eighth instruction information may also be stored in other forms in the devices of the second network-side device and the PCRF. This is not limited in the present disclosure.

TABLE 8

| Instruction information | Meaning of the instruction information |
| --- | --- |
| BEGIN | The PCRF notifies the server providing the data service to resume sending the downlink data packets to the UE |

It should be noted that, Table 8 uses only an example to describe the correspondence between the eighth instruction information and the meaning corresponding to the eighth instruction information for description, but does not limit the form and content of the eighth instruction information.

Further, the identity of the UE is a unique identity of the UE. The UE may be determined uniquely and accurately according to the identity of the UE.

For example, the identity of the UE may be an IP address of the UE, or certainly may be a number of the UE or another identity that may uniquely determine the UE. This is not further limited in the present disclosure.

For example, assuming that an identity of UE9 is an IP address 9, the second network-side device and the PCRF agree that "BEGIN" is used as the eighth instruction information to instruct the PCRF to notify the server providing the data service to resume sending the downlink data packets to the UE. After the first network-side device determines that a data service switch of the UE9 is turned off, if the first network-side device determines that the data service switch of the UE9 is turned on, the second network-side device receives a notification message that is sent by the first network-side device and used to instruct the second network-side device to notify, using the PCRF, the server providing the data service to resume sending the downlink data packets to the UE9. The second network-side device sends, according to the notification message, a notification message I: <IP address 9, BEGIN> to the PCRF, where the notification message I instructs the PCRF to notify the server providing the data service to resume sending the downlink data packets to the UE9 such that the second network-side device notifies, using the PCRF, the server providing the data service to resume sending the downlink data packets to the UE9.

It should be noted that, in an actual application, the sixth notification message sent by the second network-side device to the PCRF in step S1306 and the eighth notification message sent by the second network-side device to the PCRF in step S1308 may be implemented using one notification message. The notification message includes instruction information used to instruct the PCRF to use the preset charging PCC policy for the UE, instruction information used to instruct the PCRF to notify the server providing the data service to resume sending the downlink data packets to the UE, and the identity of the UE. Certainly, the instruction information used to instruct the PCRF to use the preset charging PCC policy for the UE and the instruction information used to instruct the PCRF to notify the server providing the data service to resume sending the downlink data packets to the UE may also be implemented using one piece of instruction information. This is not limited in the present disclosure.

This embodiment of the present disclosure provides a method for implementing a data service, where the method is applied to a second network-side device. The second network-side device receives a first notification message and a third notification message sent by a first network-side device, where the first notification message is sent to the second network-side device when the first network-side device determines that a data service switch of UE is turned off, the first notification message includes first instruction information and an identity of the UE, and the first instruction information instructs the second network-side device to skip charging for data packets of the UE flowing through the second network-side device. The third notification message is sent to the second network-side device when the first network-side device determines that the data service switch of the UE is turned off, the third notification message includes third instruction information and the identity of the UE, and the third instruction information instructs, when it is determined that the data service switch of the UE is turned off, to notify, using a PCRF, a server providing a data service to stop sending downlink data packets to the UE. The second network-side device skips charging, according to an instruction of the first notification message, for the data packets of the UE flowing through the second network-side device, and notifies, according to an instruction of the third notification message, using the PCRF, the server providing the data service to stop sending the downlink data packets to the UE. Because the first notification message and the third notification message are sent to the second network-side device when the first network-side device determines that the data service switch of the UE is turned off, after the data service switch of the UE is turned off, the UE is not charged, and the server providing the data service is notified to stop sending the downlink data packets to the UE. This avoids generating an unnecessary data usage fee for the UE and further avoids data usage waste, and resolves a problem in the prior art that after a data service switch of UE is turned off, there is data usage waste because an unnecessary data usage fee may be generated for the UE.

Embodiment 10

Figure 14:
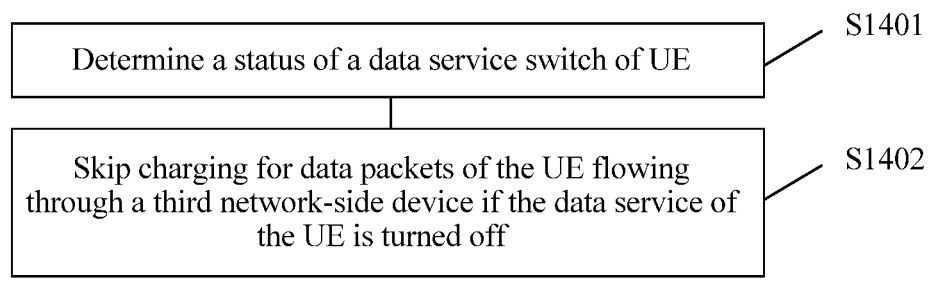
FIG. 14 is a schematic flowchart of a still another method for implementing a data service according to an embodiment of the present disclosure.

Embodiment 10 of the present disclosure provides still another method for implementing a data service, where the method is applied to a third network-side device, and the third network-side device may be a PGW serving UE. Referring to FIG. 14, the method may include the following steps.

Step S1401: Determine a status of a data service switch of UE.

The UE is UE already registered with a network, and the status of the data service switch includes that the data service switch is turned on or that the data service switch is turned off.

It should be noted that, a specific manner of determining the status of the data service switch of the UE is already described in detail in Embodiment 6, and is the same as the method for determining the status of the data service switch of the UE that is described in step S1001 in Embodiment 6. Therefore, details are not described again herein.

Step S1402: Skip charging for data packets of the UE flowing through a third network-side device if the data service of the UE is turned off.

Further, the skipping charging for data packets of the UE flowing through a third network-side device may include either of the following two manners.

A first manner is to ignore a PCC policy, and directly skip charging for the data packets of the UE flowing through the third network-side device.

A second manner is to send a first notification message to a PCRF, where the first notification message includes first instruction information and an identity of the UE, and the first instruction information instructs the PCRF to use a preset non-charging PCC policy for the UE.

It should be noted that, a form and content of the first notification message in step S1402 are the same as those of the second notification message in step S1202, and are not described again herein.

This embodiment of the present disclosure provides a method for implementing a data service, where the method is applied to a third network-side device. The third network-side device determines a status of a data service switch of UE, and skips charging for data packets of the UE flowing through the third network-side device if the data service switch of the UE is turned off Therefore, after the data service switch of the UE is turned off, charging is not performed for the data packets of the UE. This avoids generating an unnecessary data usage fee for the UE and further avoids data usage waste, and resolves a problem in the prior art that after a data service switch of UE is turned off, there is data usage waste because an unnecessary data usage fee may be generated for the UE.

Embodiment 11

Figure 15:
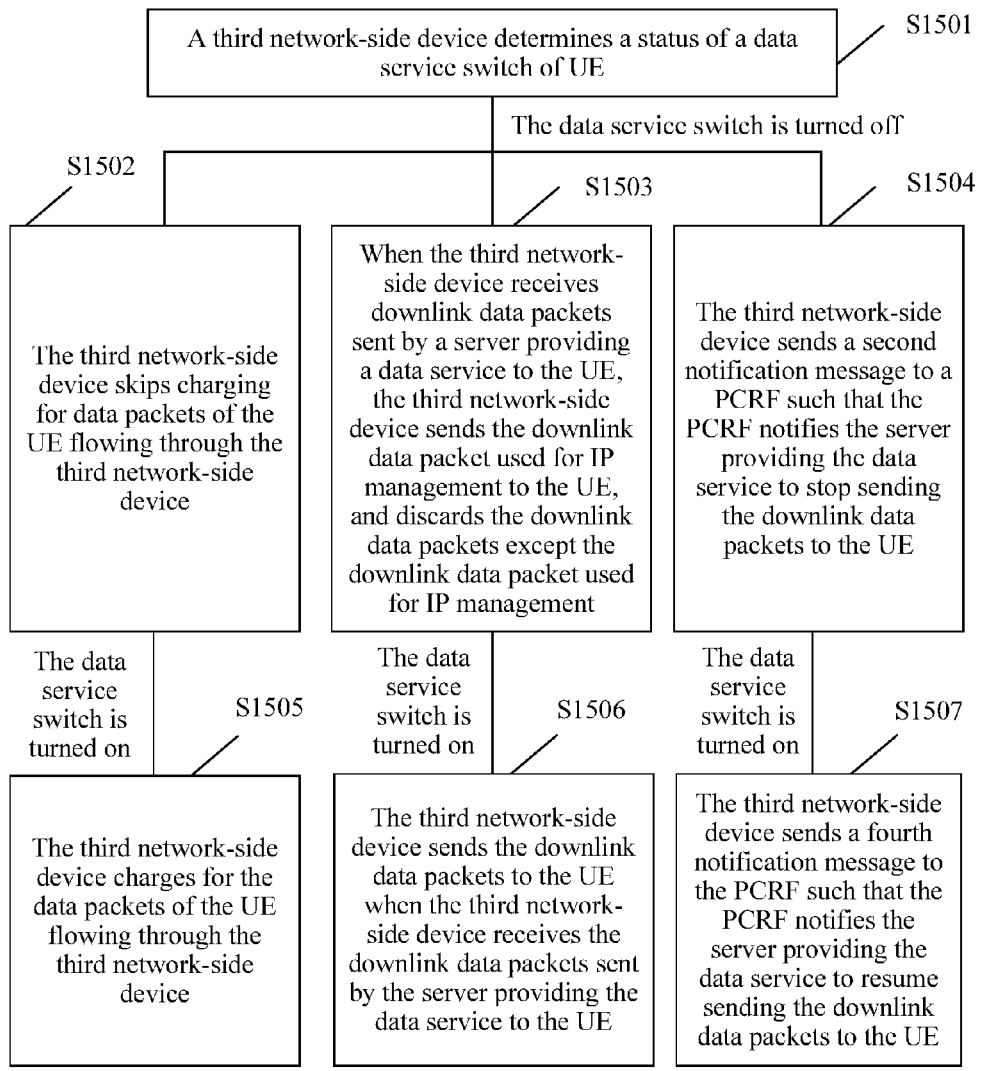
FIG. 15 is a schematic flowchart of a still another method for implementing a data service according to an embodiment of the present disclosure.

Embodiment 11 of the present disclosure provides still another method for implementing a data service, where the method is applied to a third network-side device, and the third network-side device may be a PGW serving UE. Referring to FIG. 15, the method may include the following steps.

Step S1501: A third network-side device determines a status of a data service switch of UE.

The UE is already registered with a network, and the status of the data service switch includes that the data service switch is turned on or that the data service switch is turned off.

It should be noted that, step S1501 is the same as step S1401, and is not described again herein.

Step S1502: If the data service switch of the UE is turned off, the third network-side device skips charging for data packets of the UE flowing through the third network-side device.

Optionally, the skipping charging for data packets of the UE flowing through the third network-side device may include either of the following two manners.

A first manner is to ignore a PCC policy, and directly skip charging for the data packets of the UE flowing through the third network-side device.

A second manner is to send a first notification message to a PCRF.

The first notification message includes first instruction information and an identity of the UE, and the first instruction information instructs the PCRF to use a preset non-charging PCC policy for the UE.

It should be noted that, when the third network-side device determines that the data service switch of the UE is turned off, in addition to performing step S1502 to skip charging the UE, the third network-side device may further perform step S1503 and/or S1504 to further avoid generating a usage fee for the UE.

Step S1503: If the data service switch of the UE is turned off, when the third network-side device receives downlink data packets sent by a server providing a data service to the UE, the third network-side device sends the downlink data packet used for IP management to the UE, and discards the downlink data packets except the downlink data packet used for IP management.

It should be noted that, the downlink data packets are already described in detail in step S1103 in Embodiment 7, and are not described again herein.

Step S1504: If the data service switch of the UE is turned off, the third network-side device sends a second notification message to a PCRF such that the PCRF notifies the server providing the data service to stop sending the downlink data packets to the UE.

The second notification message includes second instruction information and the identity of the UE, and the second instruction information instructs the PCRF to notify the server providing the data service to stop sending the downlink data packets to the UE.

It should be noted that, a form and content of the second notification message in step S1504 are the same as those of the fourth notification message described in step S1304 in Embodiment 9, and are not described again herein.

It should also be noted that, steps S1502, S1503, and S1504 may be performed simultaneously or sequentially in an actual application process. This is not further limited in the present disclosure. FIG. 15 shows only a case in which steps S1502, S1503, and S1504 are performed simultaneously, but does not further limit a sequence of performing steps S1502, S1503, and S1504.

After step S1502, if the UE turns on the data service switch, the third network-side device determines that the status of the data service switch of the UE is that the data service switch is turned on, which indicates that a user using the UE requires the data service. In this case, the third network-side device needs to perform step S1505.

Step S1505: The third network-side device charges for the data packets of the UE flowing through the third network-side device.

Optionally, that the third network-side device charges for the data packets of the UE flowing through the third network-side device may include either of the following two manners.

In a first manner, the third network-side device charges, using the ignored PCC policy, for the data packets of the UE flowing through the third network-side device.

In a second manner, the third network-side device sends a third notification message to the PCRF.

The third notification message includes third instruction information and the identity of the UE, and the third instruction information instructs the PCRF to use a preset charging PCC policy for the UE.

It should be noted that, a form and content of the third notification message in step S1505 are the same as those of the sixth notification message described in step S1306 in Embodiment 9, and are not described again herein.

After step S1503, if the UE turns on the data service switch, the third network-side device determines that the data service switch of the UE is turned on, which indicates that the user using the UE requires the data service. In this case, the third network-side device needs to perform step S1506.

Step S1506: The third network-side device sends the downlink data packets to the UE when the third network-side device receives the downlink data packets sent by the server providing the data service to the UE.

After step S1504, if the UE turns on the data service switch, the third network-side device determines that the data service switch of the UE is turned on, which indicates that the user using the UE requires the data service. In this case, the third network-side device further needs to perform step S1507.

Step S1507: The third network-side device sends a fourth notification message to the PCRF such that the PCRF notifies the server providing the data service to resume sending the downlink data packets to the UE.

The fourth notification message includes fourth instruction information and the identity of the UE, and the fourth instruction information instructs the PCRF to notify the server providing the data service to resume sending the downlink data packets to the UE.

It should be noted that, a form and content of the fourth notification message in step S1507 are the same as those of the eighth notification message described in step S1308 in Embodiment 9, and are not described again herein.

This embodiment of the present disclosure provides a method for implementing a data service, where the method is applied to a third network-side device. The third network-side device determines a status of a data service switch of UE. The third network-side device skips charging for data packets of the UE flowing through the third network-side device if the data service switch of the UE is turned off, and when the third network-side device receives downlink data packets sent by a server providing the data service to the UE, the third network-side device sends the downlink data packet used for IP management to the UE, discards the downlink data packets except the downlink data packet used for IP management, and sends a first notification message to a PCRF, where the UE is UE already registered with a network, the first notification message includes first instruction information and an identity of the UE, and the first instruction information instructs the PCRF to notify the server providing the data service to stop sending the downlink data packets to the UE. If the data service switch of the UE is turned off, the third network-side device skips charging for the data packets of the UE flowing through the third network-side device, and when the third network-side device receives the downlink data packets sent to the UE, the third network-side device sends the downlink data packet used for IP management to the UE, discards the downlink data packets except the downlink data packet used for IP management, and instructs the PCRF to notify the server providing the data service to stop sending the downlink data packets to the UE. By skipping charging, discarding the downlink data packets except the downlink data packet used for IP management, and instructing the server providing the data service not to send the downlink data packets to the UE, this embodiment avoids generating an unnecessary data usage fee for the UE after the data service switch of the UE is turned off and further avoids data usage waste, and resolves a problem in the prior art that after a data service switch of UE is turned off, there is data usage waste because an unnecessary data usage fee may be generated for the UE.

Embodiment 12

Figure 16:
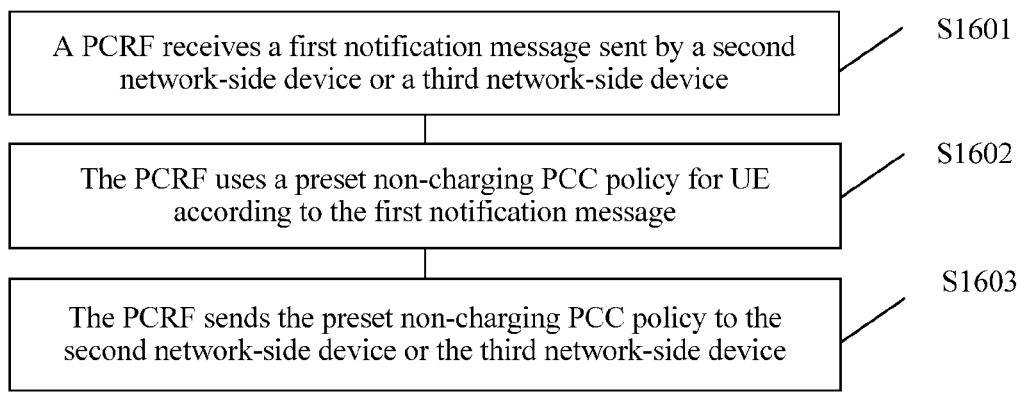
FIG. 16 is a schematic flowchart of a still another method for implementing a data service according to an embodiment of the present disclosure.

Embodiment 12 of the present disclosure provides still another method for implementing a data service, where the method is applied to a PCRF. As shown in FIG. 16, the method may include the following steps.

Step S1601: A PCRF receives a first notification message sent by a second network-side device or a third network-side device.

The first notification message includes first instruction information and an identity of UE. The first notification message is sent to the PCRF by the second network-side device instructed by a first network-side device when the first network-side device determines that a data service switch of the UE is turned off, or the first notification message is sent to the PCRF when the third network-side device determines that a data service switch of the UE is turned off.

The first notification message includes the first instruction information and the identity of the UE. The first instruction information instructs the PCRF to use a preset non-charging PCC policy for the UE. The preset non-charging PCC policy is a policy for skipping charging for data packets of the UE flowing through the second network-side device or the third network-side device. The data packets of the UE include downlink data packets, or uplink data packets and downlink data packets.

Further, a form and content of the first notification message are the same as those of the second notification message in step S1202, and are not described again herein.

Optionally, the second network-side device may be a PGW serving the UE, and the third network-side device may also be a PGW serving the UE.

Step S1602: The PCRF uses a preset non-charging PCC policy for UE according to the first notification message.

It should be noted that, content of the preset non-charging PCC policy may be determined according to an actual requirement. The content of the policy is not further limited in the present disclosure.

Step S1603: The PCRF sends the preset non-charging PCC policy to the second network-side device or the third network-side device.

This embodiment of the present disclosure provides a method for implementing a data service, where the method is applied to a PCRF. The PCRF receives a first notification message sent by a second network-side device or a third network-side device, where the first notification message is sent to the PCRF by the second network-side device instructed by a first network-side device when the first network-side device determines that a data service switch of UE is turned off, or the first notification message is sent to the PCRF when the third network-side device determines that a data service switch of UE is turned off, the first notification message includes first instruction information and an identity of the UE, the first instruction information instructs the PCRF to use a preset non-charging PCC policy for the UE, and the preset non-charging PCC policy is a policy for skipping charging for data packets of the UE flowing through the second network-side device or the third network-side device, the PCRF uses the preset non-charging PCC policy for the UE according to the first notification message, and the PCRF sends the preset non-charging PCC policy to the second network-side device or the third network-side device. Because the first notification message is sent by the second network-side device instructed by the first network-side device when the first network-side device determines that the data service switch of the UE is turned off, or the first notification message is sent when the third network-side device determines that the data service switch of the UE is turned off, the UE is not charged after the data service switch of the UE is turned off, This avoids generating an unnecessary data usage fee for the UE and further avoids data usage waste, and resolves a problem in the prior art that after a data service switch of UE is turned off, there is data usage waste because an unnecessary data usage fee may be generated for the UE.

Embodiment 13

Figure 17:
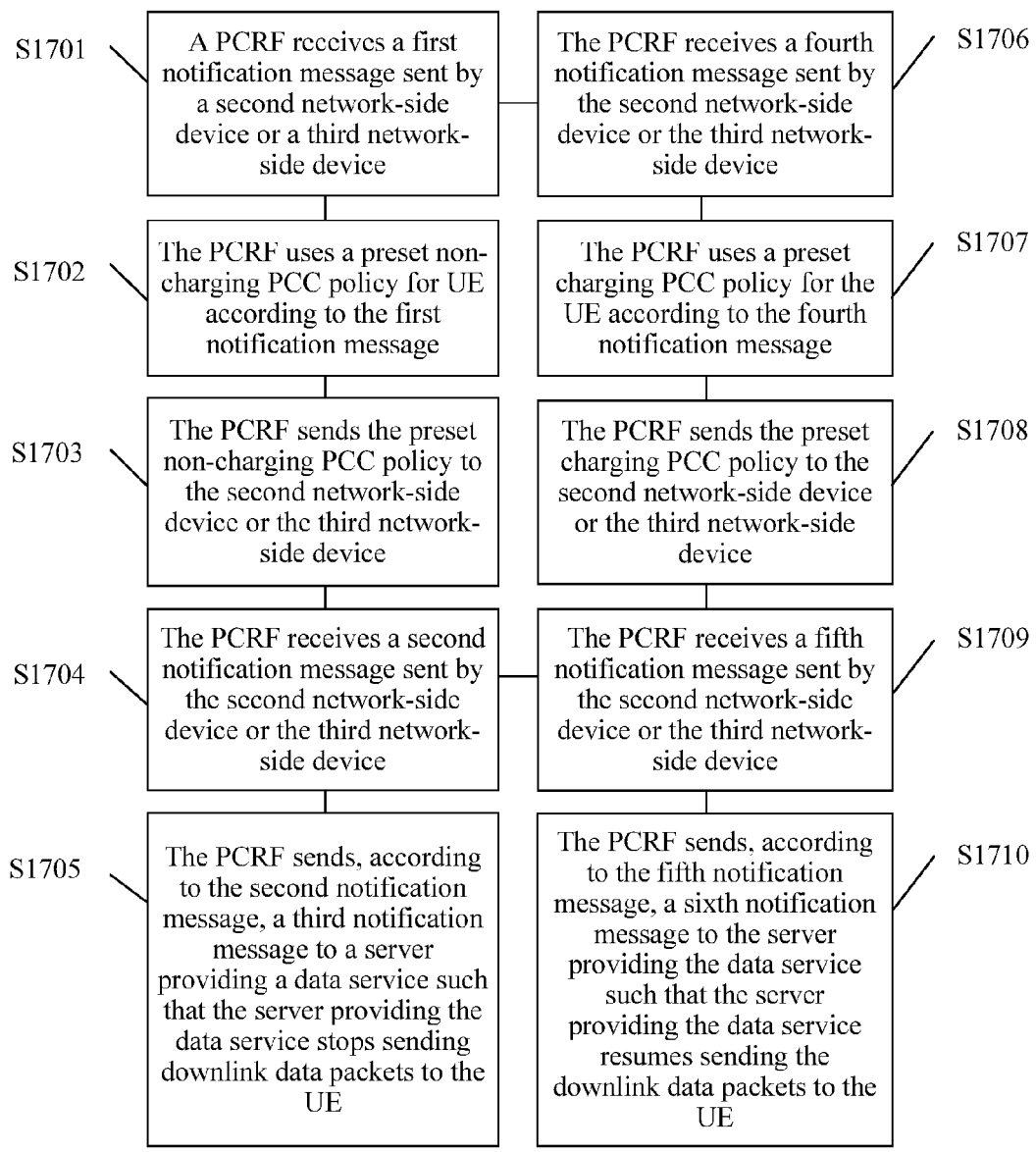
FIG. 17 is a schematic flowchart of a still another method for implementing a data service according to an embodiment of the present disclosure.

Embodiment 13 of the present disclosure provides still another method for implementing a data service, where the method is applied to a PCRF. As shown in FIG. 17, the method may include the following steps.

Step S1701: A PCRF receives a first notification message sent by a second network-side device or a third network-side device.

It should be noted that, step S1701 is the same as step S1601, and is not described again herein.

Step S1702: The PCRF uses a preset non-charging PCC policy for UE according to the first notification message.

It should be noted that, step S1702 is the same as step S1602, and is not described again herein.

Step S1703: The PCRF sends the preset non-charging PCC policy to the second network-side device or the third network-side device.

Step S1704: The PCRF receives a second notification message sent by the second network-side device or the third network-side device.

The second notification message includes second instruction information and an identity of the UE. The second notification message is sent to the PCRF by the second network-side device instructed by a first network-side device when the first network-side device determines that a data service switch of the UE is turned off, or the second notification message is sent to the PCRF when the third network-side device determines that a data service switch of the UE is turned off. The second instruction information instructs the PCRF to notify a server providing a data service to stop sending downlink data packets to the UE.

Further, a form and content of the second notification message are the same as those of the fourth notification message in step S1304, and are not described again herein.

It should be noted that, steps S1701 and S1704 may be performed simultaneously, or may be performed sequentially. This depends on a manner of sending the first notification message and the second notification message by the second network-side device or the third network-side device. FIG. 17 shows only a case in which steps S1701 and S1704 are performed sequentially, but does not further limit a sequence of receiving the first notification message and the second notification message by the PCRF.

It should be noted that, in an actual application, the first notification message sent by the second network-side device or the third network-side device and received by the PCRF in step S1701 and the second notification message sent by the second network-side device or the third network-side device and received by the PCRF in step S1704 may be implemented using one notification message. The notification message includes instruction information used to instruct the PCRF to use the preset non-charging PCC policy for the UE, instruction information used to instruct the PCRF to notify the server providing the data service to stop sending the downlink data packets to the UE, and the identity of the UE. Certainly, the instruction information used to instruct the PCRF to use the preset non-charging PCC policy for the UE and the instruction information used to instruct the PCRF to notify the server providing the data service to stop sending the downlink data packets to the UE may also be implemented using one piece of instruction information. This is not limited in the present disclosure.

Step S1705: The PCRF sends, according to the second notification message, a third notification message to a server providing a data service such that the server providing the data service stops sending downlink data packets to the UE.

The third notification message includes third instruction information and the identity of the UE.

Further, the third instruction information instructs the server providing the data service to stop sending the downlink data packets to the UE. A form of the third instruction information and a meaning corresponding to the third instruction information may be already agreed upon by communication parties (namely, the PCRF and the server providing the data service).

For example, the third instruction information may be in a form of code, for example, "0" or "1." The third instruction information may also be in a form of a character string, for example, "YES" or "NO." Certainly, the third instruction information may also be indicated in other forms. This is not further limited in the present disclosure.

It should be noted that, the third instruction information may be stored in a form of a computer language in a device.

Optionally, the third instruction information and the meaning corresponding to the third instruction information may be stored in devices of the communication parties, for example, stored in the PCRF and the server providing the data service.

For example, referring to Table 9, Table 9 shows a correspondence between the third instruction information and the meaning corresponding to the third instruction information. The correspondence may be stored in a form of a table in the PCRF and the server providing the data service. Certainly, the correspondence between the third instruction information and the meaning corresponding to the third instruction information may also be stored in other forms in the PCRF and the server providing the data service. This is not further limited in the present disclosure.

TABLE 9

| Instruction information | Meaning of the instruction information |
| --- | --- |
| STOP | The server providing the data service stops sending the downlink data packets to the UE |

It should be noted that, Table 9 uses only an example to describe the correspondence between the third instruction information and the meaning corresponding to the third instruction information for description, but does not limit the form and content of the third instruction information.

Further, the identity of the UE is a unique identity of the UE. The UE may be determined uniquely and accurately according to the identity of the UE.

For example, the identity of the UE may be an IP address of the UE, or certainly may be a number of the UE or another identity that may uniquely determine the UE. This is not limited in the present disclosure.

For example, assuming that an identity of UE10 is an IP address 10, the second network-side device and the PCRF agree that "STOP" is used as the third instruction information to instruct the server providing the data service to stop sending downlink data packets to the UE. If the first network-side device determines that a data service switch of the UE10 is turned off, the first network-side device notifies the second network-side device to notify, using the PCRF, the server providing the data service to stop sending the downlink data packets to the UE10. The PCRF receives a notification message that is sent by the second network-side device and used to instruct the PCRF to notify the server providing the data service to stop sending the downlink data packets to the UE10. The PCRF sends, according to the notification message, a notification message J: <IP address 10, STOP> to the server providing the data service, where the notification message J instructs the server providing the data service to stop sending the downlink data packets to the UE10.

After step S1701, if the UE turns on the data service switch, the first network-side device or the third network-side device determines that the data service switch of the UE is turned on, which indicates that a user using the UE requires the data service. The first network-side device may instruct the second network-side device to notify the PCRF to use a preset charging PCC policy for the UE, or the third network-side device notifies the PCRF to use a preset charging PCC policy for the UE. In this case, the PCRF further needs to perform step S1706.

Step S1706: The PCRF receives a fourth notification message sent by the second network-side device or the third network-side device.

The fourth notification message includes fourth instruction information and the identity of the UE. The fourth notification message is sent by the second network-side device instructed by the first network-side device if the first network-side device determines that the data service switch of the UE is turned on after the first network-side device determines that the data service switch of the UE is turned off, or the fourth notification message is sent if the third network-side device determines that the data service switch of the UE is turned on after the third network-side device determines that the data service switch of the UE is turned off. The fourth instruction information instructs the PCRF to use the preset charging PCC policy for the UE. The preset charging PCC policy is a policy for charging for the data packets of the UE flowing through the second network-side device or the third network-side device.

Further, a form and content of the fourth notification message are the same as those of the sixth notification message in step S1306.

Step S1707: The PCRF uses a preset charging PCC policy for the UE according to the fourth notification message.

It should be noted that, a time of generating the preset charging PCC policy and content thereof may be determined according to an actual requirement. The time of generating the policy and the content thereof are not limited in the present disclosure.

Step S1708: The PCRF sends the preset charging PCC policy to the second network-side device or the third network-side device.

After step S1704, if the UE turns on the data service switch, the first network-side device or the third network-side device determines that the data service switch of the UE is turned on, which indicates that the user using the UE requires the data service. The first network-side device may instruct the second network-side device to notify, using the PCRF, the server providing the data service to resume sending the downlink data packets to the UE, or the third network-side device may notify, using the PCRF, the server providing the data service to resume sending the downlink data packets to the UE. In this case, the PCRF further needs to perform step S1709.

Step S1709: The PCRF receives a fifth notification message sent by the second network-side device or the third network-side device.

The fifth notification message includes fifth instruction information and the identity of the UE. The fifth notification message is sent by the second network-side device instructed by the first network-side device if the first network-side device determines that the data service switch of the UE is turned on after the first network-side device determines that the data service switch of the UE is turned off, or the fifth notification message is sent if the third network-side device determines that the data service switch of the UE is turned on after the third network-side device determines that the data service switch of the UE is turned off. The fifth instruction information instructs the PCRF to notify the server providing the data service to resume sending the downlink data packets to the UE.

Further, a form and content of the fifth notification message are the same as those of the eighth notification message in step S1308, and are not described again herein.

It should be noted that, steps S1706 and S1709 may be performed simultaneously, or may be performed sequentially. This depends on a manner of sending the fourth notification message and the fifth notification message by the second network-side device or the third network-side device. FIG. 17 shows only a case in which steps S1706 and S1709 are performed sequentially, but does not further limit a sequence of receiving the fourth notification message and the fifth notification message by the PCRF.

It should be noted that, in an actual application, the fourth notification message sent by the second network-side device or the third network-side device and received by the PCRF in step S1706 and the fifth notification message sent by the second network-side device or the third network-side device and received by the PCRF in step S1709 may be implemented using one notification message. The notification message includes instruction information used to instruct the PCRF to use the preset charging PCC policy for the UE, instruction information used to instruct the PCRF to notify the server providing the data service to resume sending the downlink data packets to the UE, and the identity of the UE. Certainly, the instruction information used to instruct the PCRF to use the preset charging PCC policy for the UE and the instruction information used to instruct the PCRF to notify the server providing the data service to resume sending the downlink data packets to the UE may also be implemented using one piece of instruction information. This is not further limited in the present disclosure.

Step S1710: The PCRF sends, according to the fifth notification message, a sixth notification message to the server providing the data service such that the server providing the data service resumes sending the downlink data packets to the UE.

The sixth notification message includes sixth instruction information and the identity of the UE.

Further, the sixth instruction information instructs the server providing the data service to resume sending the downlink data packets to the UE. A form of the sixth instruction information and a meaning corresponding to the sixth instruction information may be already agreed upon by the communication parties (namely, the PCRF and the server).

For example, the sixth instruction information may be in a form of code, for example, "0" or "1." The sixth instruction information may also be in a form of a character string, for example, "YES" or "NO." Certainly, the sixth instruction information may also be indicated in other forms. This is not further limited in the present disclosure.

It should be noted that, the sixth instruction information may be stored in a form of a computer language in a device.

Optionally, the sixth instruction information and the meaning corresponding to the sixth instruction information may be stored in the devices of the communication parties, for example, stored in the PCRF and the server providing the data service.

For example, referring to Table 10, Table 10 shows a correspondence between the sixth instruction information and the meaning corresponding to the sixth instruction information. The correspondence may be stored in a form of a table in the PCRF and the server providing the data service. Certainly, the correspondence between the sixth instruction information and the meaning corresponding to the sixth instruction information may also be stored in other forms in the PCRF and the server providing the data service. This is not limited in the present disclosure.

TABLE 10

| Instruction information | Meaning of the instruction information |
|---|---|
| BEGIN | The server providing the data service resumes sending the downlink data packets to the UE |

It should be noted that, Table 10 uses only an example to describe the correspondence between the sixth instruction information and the meaning corresponding to the sixth instruction information for description, but does not further limit the form and content of the sixth instruction information.

Further, the identity of the UE is a unique identity of the UE. The UE may be determined uniquely and accurately according to the identity of the UE.

For example, the identity of the UE may be an IP address of the UE, or certainly may be a number of the UE or another identity that may uniquely determine the UE. This is not limited in the present disclosure.

For example, assuming that an identity of UE11 is an IP address 11, the PCRF and the server providing the data service agree that "BEGIN" is used as the sixth instruction information to instruct the server providing the data service to resume sending downlink data packets to the UE. If the first network-side device determines that a data service switch of the UE11 is turned on after the first network-side device determines that the data service switch of the UE11 is turned off, the first network-side device notifies the second network-side device to notify, using the PCRF, the server providing the data service to resume sending the downlink data packets to the UE11. The PCRF receives a notification message that is sent by the second network-side device and used to instruct the PCRF to notify the server providing the data service to resume sending the downlink data packets to the UE11. The PCRF sends, according to the notification message, a notification message K: <IP address 11, BEGIN> to the server providing the data service, where the notification message K instructs the server providing the data service to resume sending the downlink data packets to the UE11.

This embodiment of the present disclosure provides a method for implementing a data service, where the method is applied to a PCRF. The PCRF receives a first notification message and a second notification message sent by a second network-side device or a third network-side device, where the first notification message includes first instruction information and an identity of UE, the first instruction information instructs the PCRF to use a preset non-charging PCC policy for the UE, the preset non-charging PCC policy is a policy for skipping charging for data packets of the UE flowing through the second network-side device or the third network-side device, the second notification message includes second instruction information and the identity of the UE, and the second instruction information instructs the PCRF to notify a server providing the data service to stop sending downlink data packets to the UE. The PCRF uses the preset non-charging PCC policy for the UE according to the first notification message. The PCRF sends the preset non-charging PCC policy to the second network-side device or the third network-side device, and the PCRF sends, according to the second notification message, a third notification message to the server providing the data service such that the server providing the data service stops sending the downlink data packets to the UE. The first notification message and the second notification message are sent by the second network-side device instructed by a first network-side device when the first network-side device determines that a data service switch of the UE is turned off, or are sent when the third network-side device determines that a data service switch of the UE is turned off. Therefore, after the data service switch of the UE is turned off, the UE is not charged, and the server providing the data service is instructed to stop sending the downlink data packets to the UE. This avoids generating an unnecessary data usage fee for the UE and further avoids data usage waste, and resolves a problem in the prior art that after a data service switch of UE is turned off, there is data usage waste because an unnecessary data usage fee may be generated for the UE.

Embodiment 14

Figure 18:
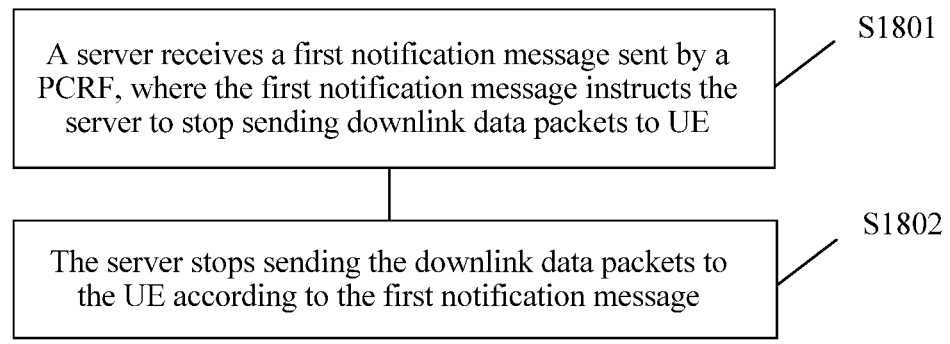
FIG. 18 is a schematic flowchart of a still another method for implementing a data service according to an embodiment of the present disclosure.

Embodiment 14 of the present disclosure provides still another method for implementing a data service, where the method is applied to a server, and the server is configured to provide a data service for UE. As shown in FIG. 18, the method may include the following steps.

Step S1801: A server receives a first notification message sent by a PCRF, where the first instruction information instructs the server to stop sending downlink data packets to the UE.

The first notification message includes first instruction information and an identity of UE. The first notification message is sent using the PCRF by a second network-side device instructed by a first network-side device when the first network-side device determines that a data service switch of the UE is turned off, or the first notification message is sent using the PCRF when a third network-side device determines that a data service switch of the UE is turned off.

Further, a form and content of the first notification message are the same as those of the third notification message in step S1705, and are not described again herein.

Step S1802: The server stops sending downlink data packets to UE according to the first notification message.

Stopping sending the downlink data packets to the UE means that after the first notification message is received, the downlink data packets are no longer sent to the UE corresponding to the identity of the UE included in the first notification message.

For example, UE12 requests to download a data packet with a size of 100 megabytes (MB). A first notification message is received when a part (40 MB) of the data packet is sent to the UE12, instructing the server to no longer send the downlink data packet to the UE4. In this case, the remaining 60 MB data packet is no longer sent to the UE12.

Further, after stopping sending the downlink data packets to the UE in step S1802, the method may further include receiving a second notification message sent by the PCRF, where the second notification message includes second instruction information and the identity of the UE, the second notification message is sent using the PCRF by the second network-side device instructed by the first network-side device if the first network-side device determines that the data service switch of the UE is turned on after the first network-side device determines that the data service switch of the UE is turned off, or the second notification message is sent using the PCRF if the third network-side device determines that the data service switch of the UE is turned on after the third network-side device determines that the data service switch of the UE is turned off, and the second instruction information instructs the server to resume sending the downlink data packets to the UE, and resuming sending the downlink data packets to the UE according to the second notification message.

Further, resuming sending the downlink data packets to the UE means normally delivering the downlink data packets to the UE according to a request of the UE.

Further, a form and content of the second notification message are the same as those of the sixth notification message in step S1710, and are not described again herein.

This embodiment of the present disclosure provides a method for implementing a data service, where the method is applied to a server. The server receives a first notification message sent by a PCRF, where the first notification message is sent using the PCRF by a second network-side device instructed by a first network-side device when the first network-side device determines that a data service switch of UE is turned off, or the first notification message is sent using the PCRF when a third network-side device determines that a data service switch of UE is turned off, the first notification message includes first instruction information and an identity of the UE, and the first instruction information instructs the server to stop sending downlink data packets to the UE, and the server stops sending the downlink data packets to the UE according to the first notification message. Because the first notification message is sent using the PCRF by the second network-side device instructed by the first network-side device when the first network-side device determines that the data service switch of the UE is turned off, or the first notification message is sent using the PCRF when the third network-side device determines that the data service switch of the UE is turned off, the server stops sending the downlink data packets to the UE after the data service switch of the UE is turned off. Because the server stops sending the downlink data packets to the UE after the data service switch of the UE is turned off, this avoids generating an unnecessary data usage fee for the UE and further avoids data usage waste, and resolves a problem in the prior art that after a data service switch of UE is turned off, there is data usage waste because an unnecessary data usage fee may be generated for the UE.

Embodiment 15

Figure 19A:
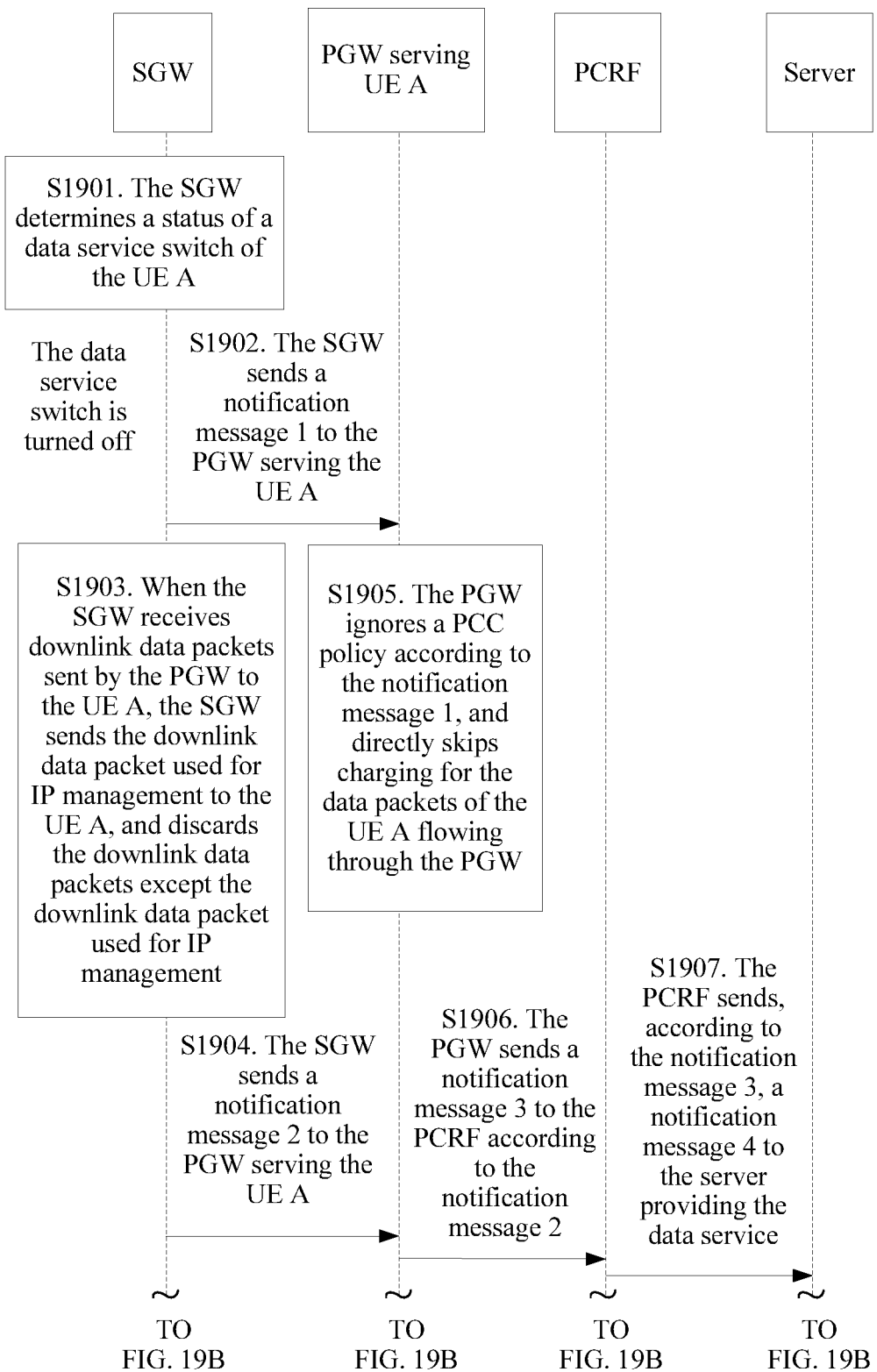
FIG. 19A, FIG. 19B, and FIG. 19C are a schematic flowchart of a still another method for implementing a data service according to an embodiment of the present disclosure.
Figure 19B:
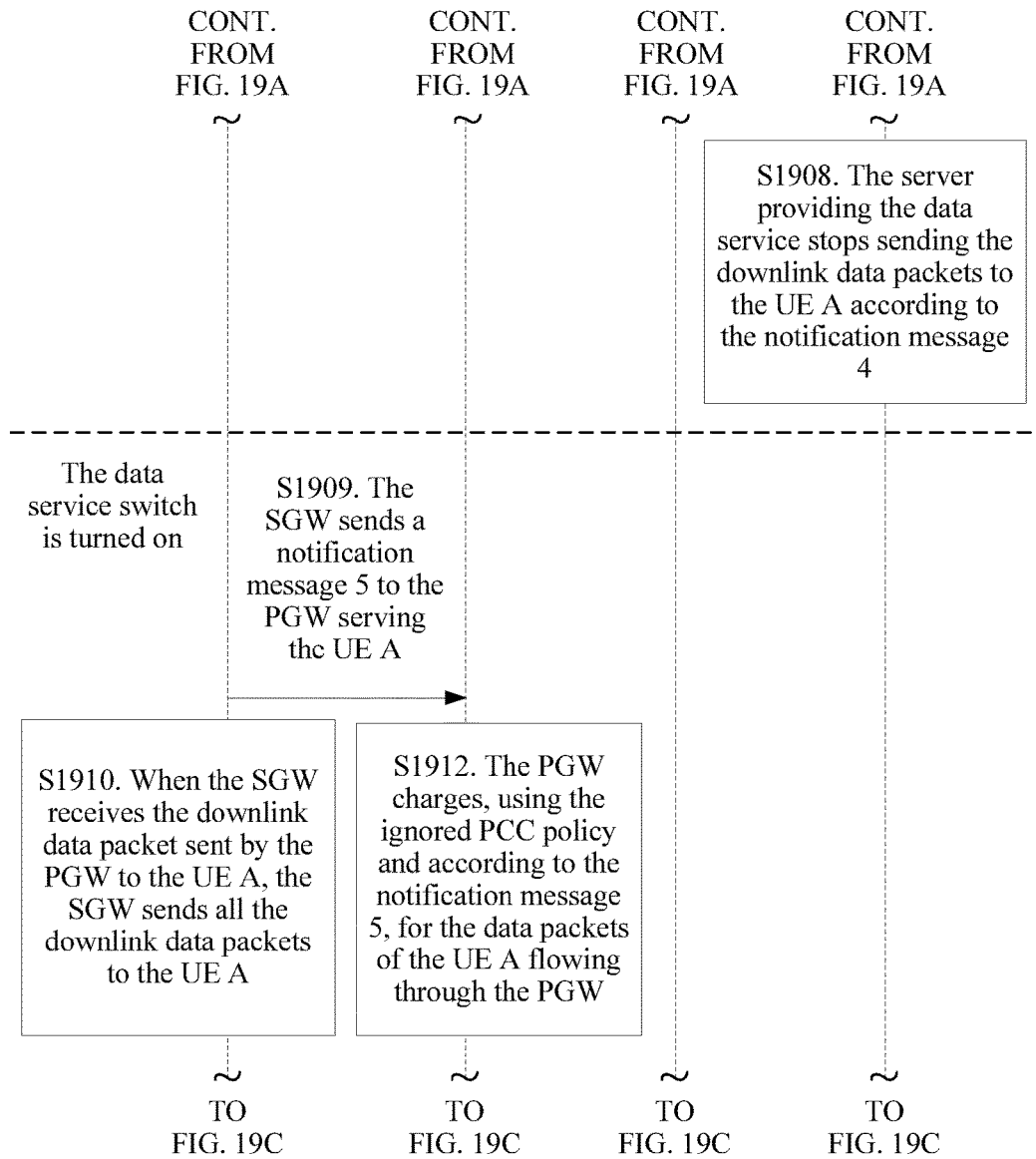
Figure 19C:
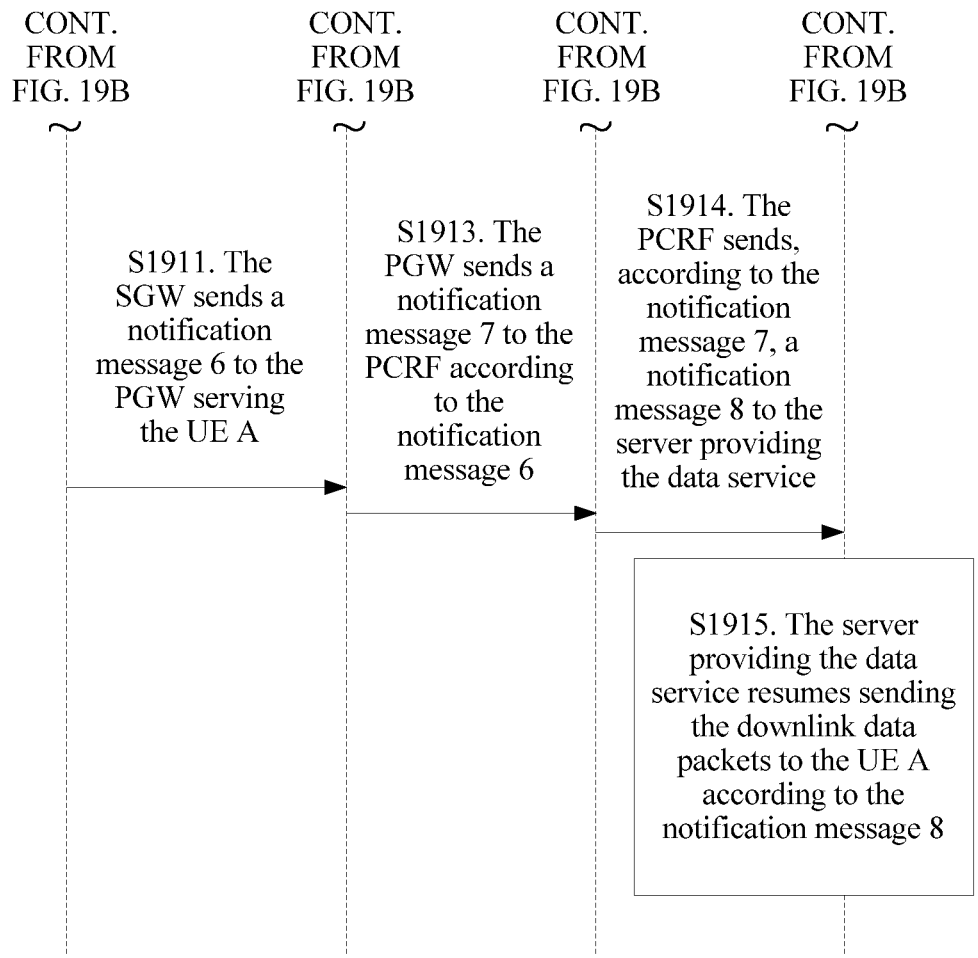

Embodiment 15 of the present disclosure provides still another method for implementing a data service. It is assumed that in an EPS network, a first network-side device is an SGW, and UE is UE A, and a second network-side device is a PGW serving the UE A. Using a process of interaction between the SGW, the PGW, a PCRF, and a server providing a data service as an example, the method for implementing a data service is described in detail. As shown in FIG. 19A, FIG. 19B, and FIG. 19C, the method may include the following steps.

Step S1901: The SGW determines a status of a data service switch of the UE A.

For example, the SGW determines the status of the data service switch of the UE A by determining whether an uplink data packet sent by the UE A is received within a preset duration.

If the SGW does not receive, within the preset duration, the uplink data packet sent by the UE A, the SGW determines that the data service switch of the UE A is turned off, and performs steps S1902, S1903, and S1904.

Step S1902: The SGW sends a notification message 1 to the PGW serving the UE A.

The notification message 1 is <IP of the UE A, 0>, where "0" in the notification message 1 is instruction information.

For example, Table 11 is a correspondence between instruction information and a meaning corresponding to the instruction information, agreed upon by the SGW and the PGW.

TABLE 11

| Instruction information | Meaning of the instruction information |
|---|---|
| 0 | Skipping charging for data packets of UE flowing through the PGW |

TABLE 11-continued

| Instruction information | Meaning of the instruction information |
|---|---|
| 1 | Charging for data packets of UE flowing through the PGW |

As can be known from Table 11, the notification message 1 instructs the PGW to skip charging for data packets of the UE A flowing through the PGW.

Step S1903: When the SGW receives downlink data packets sent by the PGW to the UE A, the SGW sends the downlink data packet used for IP management to the UE A, and discards the downlink data packets except the downlink data packet used for IP management.

Step S1904: The SGW sends a notification message 2 to the PGW serving the UE A.

The notification message 2 is <IP of the UE A, STOP-1>, where "STOP-1" in the notification message 2 is instruction information.

For example, Table 12 is a correspondence between instruction information and a meaning corresponding to the instruction information, agreed upon by the SGW and the PGW.

TABLE 12

| Instruction information | Meaning of the instruction information |
|---|---|
| STOP-1 | The PGW notifies, using the PCRF, the server providing the data service to stop sending the downlink data packets to the UE |
| BEGIN-1 | The PGW notifies, using the PCRF, the server providing the data service to resume sending the downlink data packets to the UE |

As can be known from Table 12, the notification message 2 instructs the PGW to notify, using the PCRF, the server providing the data service to stop sending the downlink data packets to the UE A.

It should be noted that, a sequence of performing steps S1902, S1903, and S1904 is not limited.

Step S1905: The PGW ignores a PCC policy according to the notification message 1, and directly skips charging for the data packets of the UE A flowing through the PGW.

Step S1906: The PGW sends a notification message 3 to the PCRF according to the notification message 2.

The notification message 3 is <IP of the UE A, STOP-2>, where "STOP-2" in the notification message 3 is instruction information.

For example, Table 13 is a correspondence between instruction information and a meaning corresponding to the instruction information, agreed upon by the PGW and the PCRF.

TABLE 13

| Instruction information | Meaning of the instruction information |
|---|---|
| STOP-2 | The PCRF notifies the server providing the data service to stop sending the downlink data packets to the UE |
| BEGIN-2 | The PCRF notifies the server providing the data service to resume sending the downlink data packets to the UE |

As can be known from Table 13, the notification message 3 instructs the PCRF to notify the server providing the data service to stop sending the downlink data packets to the UE A.

Step S1907: The PCRF sends, according to the notification message 3, a notification message 4 to the server providing the data service.

The notification message 4 is <IP of the UE A, STOP-3>, where "STOP-3" in the notification message 4 is instruction information.

For example, Table 14 is a correspondence between instruction information and a meaning corresponding to the instruction information, agreed upon by the RCRF and the server providing the data service.

TABLE 14

| Instruction information | Meaning of the instruction information |
| --- | --- |
| STOP-3 | The server providing the data service stops sending the downlink data packets to the UE |
| BEGIN-3 | The server providing the data service resumes sending the downlink data packets to the UE |

As can be known from Table 14, the notification message 4 instructs the server providing the data service to stop sending the downlink data packets to the UE A.

Step S1908: The server providing the data service stops sending the downlink data packets to the UE A according to the notification message 4.

Further, after steps S1902, S1903, and S1904, if the SGW receives an uplink data packet sent by the UE A, the SGW determines that the data service switch of the UE A is turned on. In this case, the method may further include steps S1909-S1914.

Step S1909: The SGW sends a notification message 5 to the PGW serving the UE A.

The notification message 5 is <IP of the UE A, 1>, where "1" in the notification message 5 is instruction information.

As can be known from Table 11, the notification message 5 instructs the PGW to charge for the data packets of the UE A flowing through the PGW.

Step S1910: When the SGW receives the downlink data packet sent by the PGW to the UE A, the SGW sends all the downlink data packets to the UE A.

Step S1911: The SGW sends a notification message 6 to the PGW serving the UE A.

The notification message 6 is <IP of the UE A, BEGIN-1>, where "BEGIN-1" in the notification message 6 is instruction information.

As can be known from Table 12, the notification message 6 instructs the PGW to notify, using the PCRF, the server providing the data service to resume sending the downlink data packets to the UE A.

It should be noted that, a sequence of performing steps S1909, S1910, and S1911 is not limited.

Step S1912: The PGW charges, using the ignored PCC policy and according to the notification message 5, for the data packets of the UE A flowing through the PGW.

Step S1913: The PGW sends a notification message 7 to the PCRF according to the notification message 6.

The notification message 7 is <IP of the UE A, BEGIN-2>, where "BEGIN-2" in the notification message 7 is instruction information.

As can be known from Table 13, the notification message 7 instructs the PCRF to notify the server providing the data service to resume sending the downlink data packets to the UE A.

Step S1914: The PCRF sends, according to the notification message 7, a notification message 8 to the server providing the data service.

The notification message 8 is <IP of the UE A, BEGIN-3>, where "BEGIN-3" in the notification message 8 is instruction information.

As can be known from Table 14, the notification message 8 instructs the server providing the data service to resume sending the downlink data packets to the UE A.

Step S1915: The server providing the data service resumes sending the downlink data packets to the UE A according to the notification message 8.

It should be noted that, steps S1901-S1915 are performed to complete a process of the method for implementing a data service. The foregoing steps S1901-S1915 are merely examples of manners of implementing a data service that are described in this embodiment, and a sequence of performing the steps is not limited thereto.

This embodiment of the present disclosure provides a method for implementing a data service. An SGW determines a status of a data service switch of UE by determining whether an uplink data packet sent by the UE is received within a preset duration, if the SGW determines that the data service switch of the UE is turned off, the SGW sends a first notification message to a PGW serving the UE, and when the SGW receives downlink data packets sent by the PGW to the UE, the SGW sends the downlink data packet used for IP management to the UE, discards the downlink data packets except the downlink data packet used for IP management, and sends a second notification message to the PGW, where the UE is already registered with a network, the first notification message includes first instruction information and an identity of the UE, the first instruction information instructs the PGW to skip charging for data packets of the UE flowing through the PGW, the second notification message includes second instruction information and the identity of the UE, and the second instruction information instructs the PGW to notify, using a PCRF, a server providing the data service to stop sending the downlink data packets to the UE. The SGW determines, by determining whether the uplink data packet sent by the UE is received within the preset duration, whether the data service switch of the UE is turned off, and if the uplink data packet sent by the UE is not received within the preset duration, determines that the data service switch of the UE is already turned off. In this case, the SGW instructs the PGW serving the UE to skip charging for the data packets of the UE flowing through the PGW. When receiving the downlink data packets sent by the PGW to the UE, the SGW sends the downlink data packet used for IP management to the UE, discards the downlink data packets except the downlink data packet used for IP management, and instructs the PGW to notify, using the PCRF, the server providing the data service to stop sending the downlink data packets to the UE. By instructing to skip charging, discarding the downlink data packets except the downlink data packet used for IP management, and instructing the server providing the data service not to send the downlink data packets to the UE, this embodiment avoids generating an unnecessary data usage fee for the UE after the data service switch of the UE is turned off and further avoids data usage waste, and resolves a problem in the prior art that after a data service switch of UE is turned off, there is data usage waste because an unnecessary data usage fee may be generated for the UE.

Embodiment 16

Figure 20:
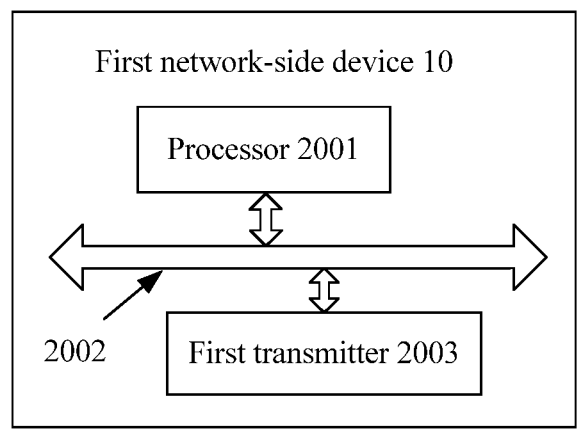
FIG. 20 is a schematic structural diagram of another first network-side device according to an embodiment of the present disclosure.

Embodiment 16 of the present disclosure provides a first network-side device 10. The first network-side device 10 may be an eNB or an SGW. Referring to FIG. 20, the first network-side device 10 may include at least one processor 2001, at least one communications bus 2002 configured to implement connections and mutual communication between apparatuses, and a first transmitter 2003.

The communications bus 2002 may be an industry standard architecture (ISA) bus, a peripheral component interconnect (PCI) bus, an extended industry standard architecture (EISA) bus, or the like. The bus 2002 may be categorized as an address bus, a data bus, a control bus, or the like. For ease of expression, the bus is indicated by only a bold line in FIG. 20, which does not mean that only one bus or one type of bus exists.

The processor 2001 may be a central processing unit (CPU) or an application-specific integrated circuit (ASIC), or is configured as one or more integrated circuits for implementing this embodiment of the present disclosure.

The processor 2001 is configured to determine a status of a data service switch of UE, where the UE is already registered with a network, and the status of the data service switch includes that the data service switch is turned on or that the data service switch is turned off.

The first transmitter 2003 is configured to send a first notification message to a second network-side device if the processor 2001 determines that the data service switch of the UE is turned off, where the first notification message includes first instruction information and an identity of the UE, the first instruction information instructs the second network-side device to skip charging for data packets of the UE flowing through the second network-side device, and the data packets of the UE include downlink data packets, or uplink data packets and downlink data packets.

Figure 21:
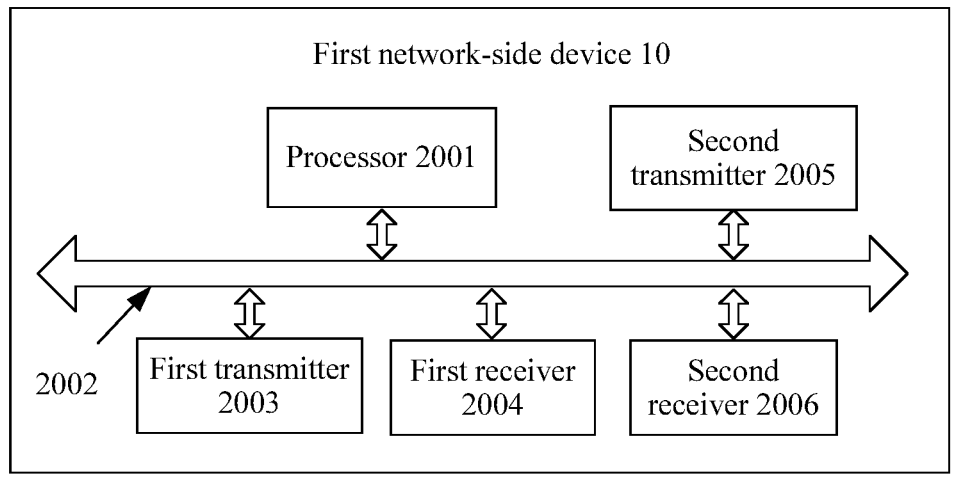
FIG. 21 is a schematic structural diagram of another first network-side device according to an embodiment of the present disclosure.

Further, referring to FIG. 21, the first network-side device 10 may further include a first receiver 2004 configured to receive downlink data packets sent by the second network-side device to the UE, and a second transmitter 2005 configured to send the downlink data packet used for IP management to the UE, and discard the downlink data packets except the downlink data packet used for IP management if the processor 2001 determines that the data service switch of the UE is turned off, when the first receiver 2004 receives the downlink data packets sent by the second network-side device to the UE.

The first transmitter 2003 may be further configured to send a second notification message to the second network-side device if the processor 2001 determines that the data service switch of the UE is turned off, where the second notification message includes second instruction information and the identity of the UE, and the second instruction information instructs the second network-side device to notify, using a PCRF, a server providing a data service to stop sending the downlink data packets to the UE.

The first transmitter 2003 may be further configured to send a third notification message to the second network-side device after sending the first notification message to the second network-side device, if the processor 2001 determines that the data service switch of the UE is turned on, where the third notification message includes third instruction information and the identity of the UE, and the third instruction information instructs the second network-side device to charge for the data packets of the UE flowing through the second network-side device.

The second transmitter 2005 may be further configured to send the downlink data packets to the UE after sending the downlink data packet used for IP management to the UE, and discarding the downlink data packets except the downlink data packet used for IP management, if the processor 2001 determines that the data service switch of the UE is turned on, when the first receiver 2004 receives the downlink data packets sent by the second network-side device to the UE.

The first transmitter 2003 may be further configured to send a fourth notification message to the second network-side device after sending the second notification message to the second network-side device, if the processor 2001 determines that the data service switch of the UE is turned on, where the fourth notification message includes fourth instruction information and the identity of the UE, and the fourth instruction information instructs the second network-side device to notify, using the PCRF, the server providing the data service to resume sending the downlink data packets to the UE.

Further, referring to FIG. 21, the first network-side device 10 may further include a second receiver 2006 configured to receive an uplink data packet sent by the UE, and the processor 2001 may be further configured to determine whether the second receiver 2006 receives, within a preset duration, the uplink data packet sent by the UE, where the preset duration is longer than or equal to a duration of a heartbeat packet interval of the UE, if the second receiver 2006 does not receive, within the preset duration, the uplink data packet sent by the UE, determine that the data service switch of the UE is turned off, and after determining that the data service switch of the UE is turned off, if the second receiver 2006 receives the uplink data packet sent by the UE, determine that the data service switch of the UE is turned on.

Optionally, the processor 2001 may be further configured to restart timing of the preset duration after timing of the preset duration ends if the second receiver 2006 receives, within the preset duration, the uplink data packet sent by the UE, or restart timing of the preset duration at a time of receiving the uplink data packet sent by the UE if the second receiver 2006 receives, within the preset duration, the uplink data packet sent by the UE.

This embodiment of the present disclosure provides a first network-side device 10. The first network-side device 10 determines a status of a data service switch of UE, and if the data service switch of the UE is turned off, sends a first notification message to a second network-side device, where the first notification message includes first instruction information and an identity of the UE, and the first instruction information instructs the second network-side device to skip charging for data packets of the UE flowing through the second network-side device. The first network-side device 10 determines that the data service switch of the UE is turned off, and sends the first notification message to the second network-side device to instruct the second network-side device to skip charging for the data packets of the UE flowing through the second network-side device. Therefore, after the data service switch of the UE is turned off, the UE is not charged. This avoids generating an unnecessary data usage fee for the UE and further avoids data usage waste, and resolves a problem in the prior art that after a data service switch of UE is turned off, there is data usage waste because an unnecessary data usage fee may be generated for the UE.

Embodiment 17

Figure 22:
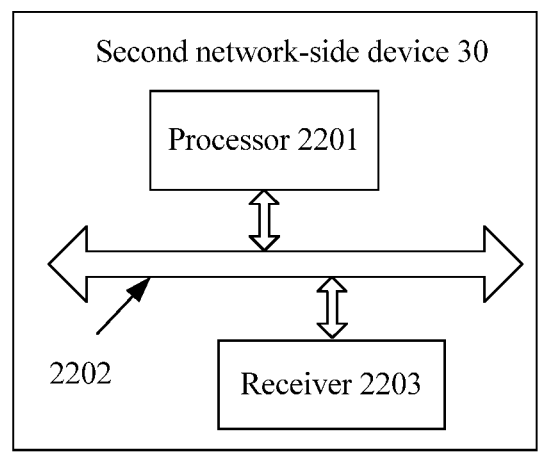
FIG. 22 is a schematic structural diagram of another second network-side device according to an embodiment of the present disclosure.

Embodiment 17 of the present disclosure provides a second network-side device 30. The second network-side device may be a PGW serving UE. Referring to FIG. 22, the second network-side device 30 may include at least one processor 2201, at least one communications bus 2202 configured to implement connections and mutual communication between apparatuses, and a receiver 2203.

The communications bus 2202 may be an ISA bus, a PCI bus, an EISA bus, or the like. The bus 2202 may be categorized as an address bus, a data bus, a control bus, or the like, which does not mean that only one bus or one type of bus exists.

The processor 2201 may be a CPU or an ASIC, or is configured as one or more integrated circuits for implementing this embodiment of the present disclosure.

The receiver 2203 is configured to receive a first notification message sent by a first network-side device, where the first notification message is sent to the second network-side device 30 when the first network-side device determines that a data service switch of UE is turned off, the first notification message includes first instruction information and an identity of the UE, the first instruction information instructs the second network-side device 30 to skip charging for data packets of the UE flowing through the second network-side device 30, and the data packets of the UE include downlink data packets, or uplink data packets and downlink data packets.

The processor 2201 is configured to skip charging, according to the first notification message received by the receiver 2203, for the data packets of the UE flowing through the second network-side device 30.

Figure 23:
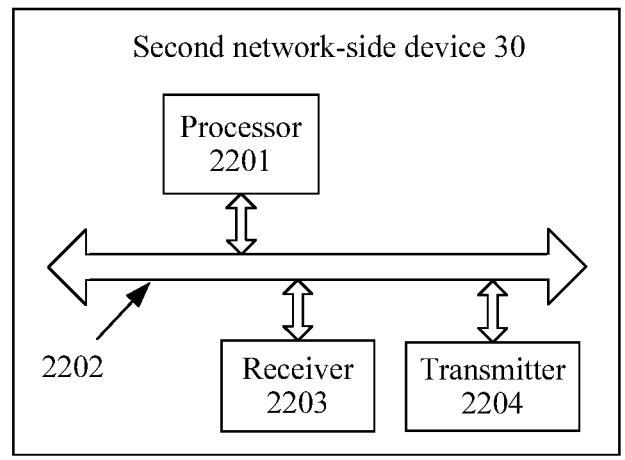
FIG. 23 is a schematic structural diagram of another second network-side device according to an embodiment of the present disclosure.

Optionally, the processor 2201 is further configured to ignore a PCC policy according to the first notification message received by the receiver 2203, and directly skip charging for the data packets of the UE flowing through the second network-side device 30, or referring to FIG. 23, the second network-side device 30 may further include a transmitter 2204 configured to send a second notification message to a PCRF according to the first notification message received by the receiver 2203, where the second notification message includes second instruction information and the identity of the UE, and the second instruction information instructs the PCRF to use a preset non-charging PCC policy for the UE.

Further, the receiver 2203 may be further configured to receive a third notification message sent by the first network-side device, where the third notification message is sent to the second network-side device when the first network-side device determines that the data service switch of the UE is turned off, the third notification message includes third instruction information and the identity of the UE, and the third instruction information instructs the second network-side device to notify, using the PCRF, a server providing a data service to stop sending the downlink data packets to the UE, and correspondingly, the transmitter 2204 may be further configured to send a fourth notification message to the PCRF according to the third notification message received by the receiver 2203, where the fourth notification message includes fourth instruction information and the identity of the UE, and the fourth instruction information instructs the PCRF to notify the server providing the data service to stop sending the downlink data packets to the UE.

Further, the receiver 2203 may be further configured to receive a fifth notification message sent by the first network-side device, where the fifth notification message is sent to the second network-side device 30 if the first network-side device determines that the data service switch of the UE is turned on after the first network-side device sends the first notification message, the fifth notification message includes fifth instruction information and the identity of the UE, and the fifth instruction information instructs the second network-side device 30 to charge for the data packets of the UE flowing through the second network-side device 30, and the processor 2201 may be further configured to charge, according to the fifth notification message received by the receiver 2203, for the data packets of the UE flowing through the second network-side device 30.

The processor 2201 is further configured to charge, using the ignored PCC policy and according to the fifth notification message received by the receiver 2203, for the data packets of the UE flowing through the second network-side device 30, or the transmitter 2204 may be further configured to send a sixth notification message to the PCRF according to the fifth notification message received by the receiver 2203, where the sixth notification message includes sixth instruction information and the identity of the UE, and the sixth instruction information instructs the PCRF to use a preset charging PCC policy for the UE.

The receiver 2203 may be further configured to receive a seventh notification message sent by the first network-side device, where the seventh notification message is sent to the second network-side device 30 if the first network-side device determines that the data service switch of the UE is turned on after the first network-side device sends the third notification message, the seventh notification message includes seventh instruction information and the identity of the UE, and the seventh instruction information instructs the second network-side device 30 to notify, using the PCRF, the server providing the data service to resume sending the downlink data packets to the UE, and correspondingly, the transmitter 2204 may be further configured to send an eighth notification message to the PCRF according to the seventh notification message received by the receiver 2203, where the eighth notification message includes eighth instruction information and the identity of the UE, and the eighth instruction information instructs the PCRF to notify the server providing the data service to resume sending the downlink data packets to the UE.

This embodiment of the present disclosure provides a second network-side device 30. The second network-side device 30 receives a first notification message sent by a first network-side device, where the first notification message includes first instruction information and an identity of UE, and the first instruction information instructs the second network-side device to skip charging for data packets of the UE flowing through the second network-side device, and the second network-side device 30 skips charging, according to an instruction of the first notification message, for the data packets of the UE flowing through the second network-side device. Because the first notification message is sent when the first network-side device determines that a data service switch of the UE is turned off, the UE is not charged after the data service switch of the UE is turned off. This avoids generating an unnecessary data usage fee for the UE and further avoids data usage waste, and resolves a problem that after a data service switch of UE is turned off, there is data usage waste because an unnecessary data usage fee may be generated for the UE.

Embodiment 18

Figure 24:
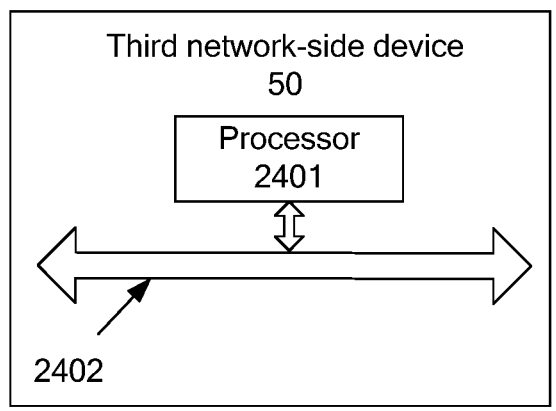
FIG. 24 is a schematic structural diagram of another third network-side device according to an embodiment of the present disclosure.

Embodiment 18 of the present disclosure provides a third network-side device 50. The third network-side device 50 may be a PGW serving UE. Referring to FIG. 24, the third network-side device 50 may include at least one processor 2401, and at least one communications bus 2402 configured to implement connections and mutual communication between apparatuses.

The communications bus 2402 may be an ISA bus, a PCI bus, an EISA bus, or the like. The bus 2402 may be categorized as an address bus, a data bus, a control bus, or the like. For ease of expression, the bus is indicated by only a bold line in FIG. 24, which does not mean that only one bus or one type of bus exists.

The processor 2401 may be a CPU or an ASIC, or is configured as one or more integrated circuits for implementing this embodiment of the present disclosure.

The processor 2401 is configured to determine a status of a data service switch of UE, where the UE is already registered with a network, and the status of the data service switch includes that the data service switch is turned on or that the data service switch is turned off.

The processor 2401 may be further configured to skip charging, if the data service of the UE is turned off, for data packets of the UE flowing through the third network-side device 50.

Figure 25:
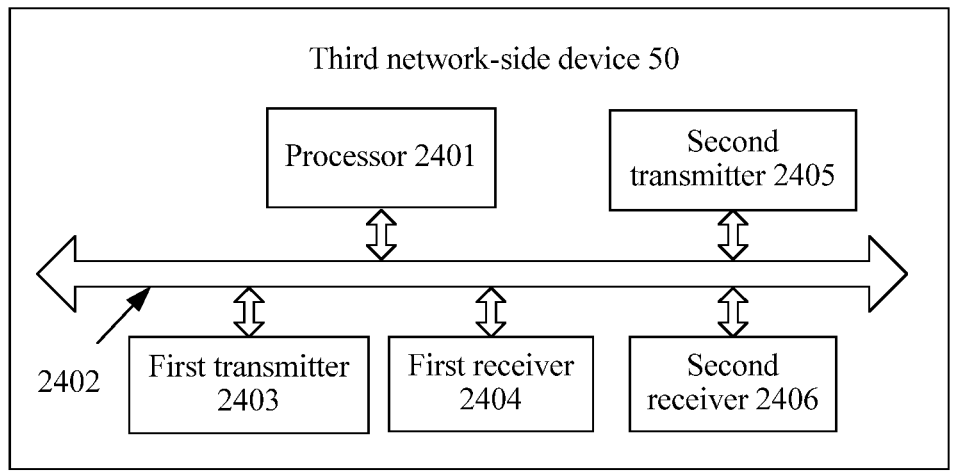
FIG. 25 is a schematic structural diagram of another third network-side device according to an embodiment of the present disclosure.

Optionally, the processor 2401 is further configured to ignore a PCC policy, and directly skip charging for the data packets of the UE flowing through the third network-side device 50, or as shown in FIG. 25, the third network-side device 50 may further include a first transmitter 2403 configured to send a first notification message to a PCRF if the processor 2401 determines that the data service of the UE is turned off, where the first notification message includes first instruction information and an identity of the UE, and the first instruction information instructs the PCRF to use a preset non-charging PCC policy for the UE.

As shown in FIG. 25, the third network-side device 50 may further include a first receiver 2404 configured to receive downlink data packets sent by a server providing a data service to the UE, and a second transmitter 2405 configured to send the downlink data packet used for IP management to the UE, and discard the downlink data packets except the downlink data packet used for IP management if the processor 2401 determines that the data service switch of the UE is turned off, when the first receiver 2404 receives the downlink data packets sent by the server providing the data service to the UE.

Further, the first transmitter 2403 may be further configured to send a second notification message to the PCRF if the processor 2401 determines that the data service of the UE is turned off, where the second notification message includes second instruction information and the identity of the UE, and the second instruction information instructs the PCRF to notify the server providing the data service to stop sending the downlink data packets to the UE.

Further, the processor 2401 may be further configured to charge for the data packets of the UE flowing through the third network-side device 50 after skipping charging for the data packets of the UE flowing through the third network-side device 50, if the processor 2401 determines that the data service switch of the UE is turned on.

Optionally, the processor 2401 may be further configured to charge, using the ignored PCC policy, for the data packets of the UE flowing through the third network-side device 50, or the first transmitter 2403 may be further configured to send a third notification message to the PCRF, where the third notification message includes third instruction information and the identity of the UE, and the third instruction information instructs the PCRF to use a preset charging PCC policy for the UE.

The second transmitter 2405 may be further configured to send the downlink data packets to the UE after sending the downlink data packet used for IP management to the UE, and discarding the downlink data packets except the downlink data packet used for IP management, if the processor 2401 determines that the data service switch of the UE is turned on, when the first receiver 2404 receives the downlink data packets sent by the server providing the data service to the UE.

The first transmitter 2403 may be further configured to send a fourth notification message to the PCRF after sending the second notification message to the PCRF, if the processor 2401 determines that the data service switch of the UE is turned on, where the fourth notification message includes fourth instruction information and the identity of the UE, and the fourth instruction information instructs the PCRF to notify the server providing the data service to resume sending the downlink data packets to the UE.

The third network-side device 50 further includes a second receiver 2406 configured to receive an uplink data packet sent by the UE, and correspondingly, the processor 2401 is further configured to determine whether the second receiver 2406 receives, within a preset duration, the uplink data packet sent by the UE, where the preset duration is longer than or equal to a duration of a heartbeat packet interval of the UE, if the second receiver 2406 does not receive, within the preset duration, the uplink data packet sent by the UE, determine that the data service switch of the UE is turned off, and after determining that the data service switch of the UE is turned off, if the second receiver 2406 receives the uplink data packet sent by the UE, determine that the data service switch of the UE is turned on.

The processor 2401 may be further configured to restart timing of the preset duration after timing of the preset duration ends if the second receiver 2406 receives, within the preset duration, the uplink data packet sent by the UE, or restart timing of the preset duration at a time of receiving the uplink data packet sent by the UE if the second receiver 2406 receives, within the preset duration, the uplink data packet sent by the UE.

This embodiment of the present disclosure provides a third network-side device 50. The third network-side device 50 determines a status of a data service switch of UE, and if the data service switch of the UE is turned off, skips charging for data packets of the UE flowing through the third network-side device. Therefore, after the data service switch of the UE is turned off, the UE is not charged. This avoids generating an unnecessary data usage fee for the UE and further avoids data usage waste, and resolves a problem in the prior art that after a data service switch of UE is turned off, there is data usage waste because an unnecessary data usage fee may be generated for the UE.

Embodiment 19

Figure 26:
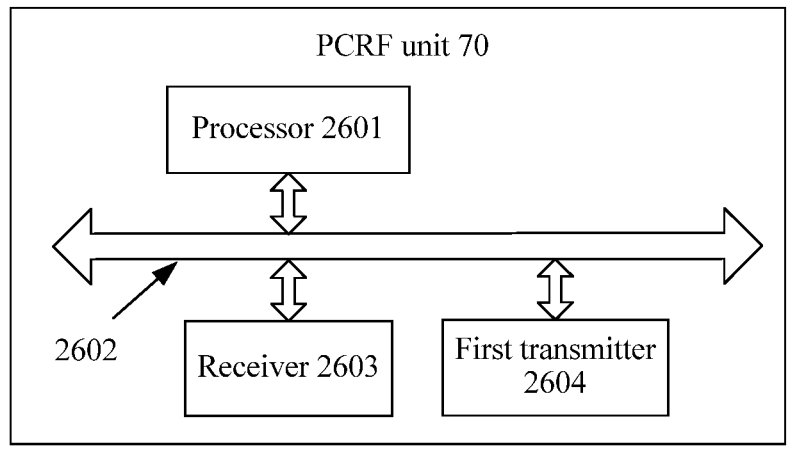
FIG. 26 is a schematic structural diagram of another PCRF unit according to an embodiment of the present disclosure.

Embodiment 19 of the present disclosure provides a PCRF unit 70. Referring to FIG. 26, the PCRF unit 70 may include at least one processor 2601, at least one communications bus 2602 configured to implement connections and mutual communication between apparatuses, a receiver 2603, and a first transmitter 2604.

The communications bus 2602 may be an ISA bus, a PCI bus, an EISA bus, or the like. The bus 2602 may be categorized as an address bus, a data bus, a control bus, or the like, which does not mean that only one bus or one type of bus exists.

The processor 2601 may be a CPU or an ASIC, or is configured as one or more integrated circuits for implementing this embodiment of the present disclosure.

The receiver 2603 is configured to receive a first notification message sent by a second network-side device or a third network-side device, where the first notification message is sent to the PCRF by the second network-side device instructed by a first network-side device when the first network-side device determines that a data service switch of UE is turned off, or the first notification message is sent to the PCRF when the third network-side device determines that a data service switch of UE is turned off, the first notification message includes first instruction information and an identity of the UE, the first instruction information instructs the PCRF to use a preset non-charging PCC policy for the UE, the preset non-charging PCC policy is a policy for skipping charging for data packets of the UE flowing through the second network-side device or the third network-side device, and the data packets of the UE include downlink data packets, or uplink data packets and downlink data packets.

The processor 2601 is configured to use the preset non-charging PCC policy for the UE according to the first notification message received by the receiver 2603.

The first transmitter 2604 is configured to send the preset non-charging PCC policy to the second network-side device or the third network-side device.

Figure 27:
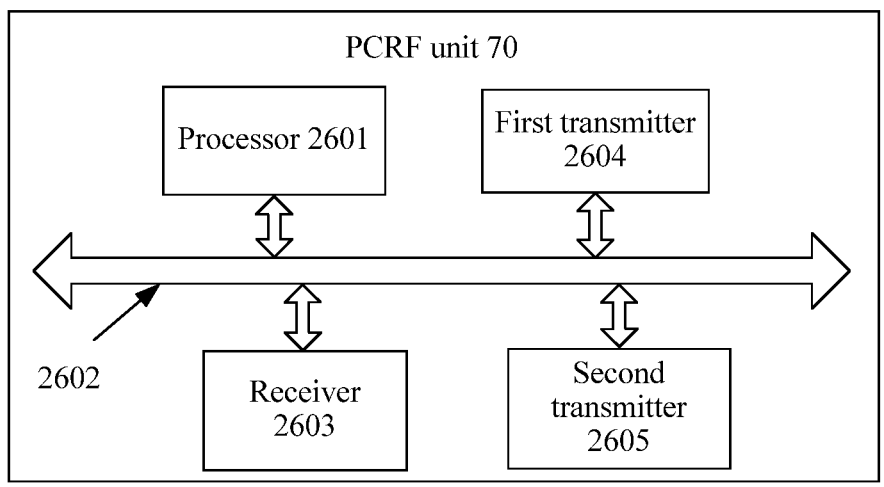
FIG. 27 is a schematic structural diagram of another PCRF unit according to an embodiment of the present disclosure.

The receiver 2603 may be further configured to receive a second notification message sent by the second network-side device or the third network-side device, where the second notification message is sent to the PCRF by the second network-side device instructed by the first network-side device when the first network-side device determines that the data service switch of the UE is turned off, or the second notification message is sent to the PCRF when the third network-side device determines that the data service switch of the UE is turned off, the second notification message includes second instruction information and the identity of the UE, and the second instruction information instructs the PCRF to notify a server providing a data service to stop sending the downlink data packets to the UE, and further, as shown in FIG. 27, the PCRF unit 70 may further include a second transmitter 2605 configured to send, according to the second notification message received by the receiver 2603, a third notification message to the server providing the data service, where the third notification message includes third instruction information and the identity of the UE, and the third instruction information instructs the server providing the data service to stop sending the downlink data packets to the UE.

The receiver 2603 may be further configured to receive a fourth notification message sent by the second network-side device or the third network-side device, where the fourth notification message is sent by the second network-side device instructed by the first network-side device if the first network-side device determines that the data service switch of the UE is turned on after the first network-side device determines that the data service switch of the UE is turned off, or the fourth notification message is sent if the third network-side device determines that the data service switch of the UE is turned on after the third network-side device determines that the data service switch of the UE is turned off, the fourth notification message includes fourth instruction information and the identity of the UE, and the fourth instruction information instructs the PCRF to use a preset charging PCC policy for the UE, where the preset charging PCC policy is a policy for charging for the data packets of the UE flowing through the second network-side device or the third network-side device.

The processor 2601 may be further configured to use the preset charging PCC policy for the UE according to the fourth notification message received by the receiver 2603.

The first transmitter 2604 may be further configured to send the preset charging PCC policy to the second network-side device or the third network-side device.

The receiver 2603 may be further configured to receive a fifth notification message sent by the second network-side device or the third network-side device, where the fifth notification message is sent by the second network-side device instructed by the first network-side device if the first network-side device determines that the data service switch of the UE is turned on after the first network-side device determines that the data service switch of the UE is turned off, or the fifth notification message is sent if the third network-side device determines that the data service switch of the UE is turned on after the third network-side device determines that the data service switch of the UE is turned off, the fifth notification message includes fifth instruction information and the identity of the UE, and the fifth instruction information instructs the PCRF to notify the server providing the data service to resume sending the downlink data packets to the UE.

The second transmitter 2605 may be further configured to send, according to the fifth notification message received by the receiver 2603, a sixth notification message to the server providing the data service, where the sixth notification message includes sixth instruction information and the identity of the UE, and the sixth instruction information instructs the server providing the data service to stop sending the downlink data packets to the UE.

This embodiment of the present disclosure provides a PCRF unit 70. The PCRF unit 70 receives a first notification message sent by a second network-side device or a third network-side device, where the first notification message is sent to the PCRF by the second network-side device instructed by a first network-side device when the first network-side device determines that a data service switch of UE is turned off, or the first notification message is sent to the PCRF when the third network-side device determines that a data service switch of UE is turned off, the first notification message includes first instruction information and an identity of the UE, the first instruction information instructs the PCRF to use a preset non-charging PCC policy for the UE, and the preset non-charging PCC policy is a policy for skipping charging for data packets of the UE flowing through the second network-side device or the third network-side device, the PCRF unit 70 uses the preset non-charging PCC policy for the UE according to the first notification message, and the PCRF unit 70 sends the preset non-charging PCC policy to the second network-side device or the third network-side device. Because the first notification message is sent to the PCRF by the second network-side device instructed by the first network-side device when the first network-side device determines that the data service switch of the UE is turned off, or the first notification message is sent to the PCRF when the third network-side device determines that the data service switch of the UE is turned off, the UE is not charged after the data service switch of the UE is turned off. This avoids generating an unnecessary data usage fee for the UE and further avoids data usage waste, and resolves a problem in the prior art that after a data service switch of UE is turned off, there is data usage waste because an unnecessary data usage fee may be generated for the UE.

Embodiment 20

Figure 28:
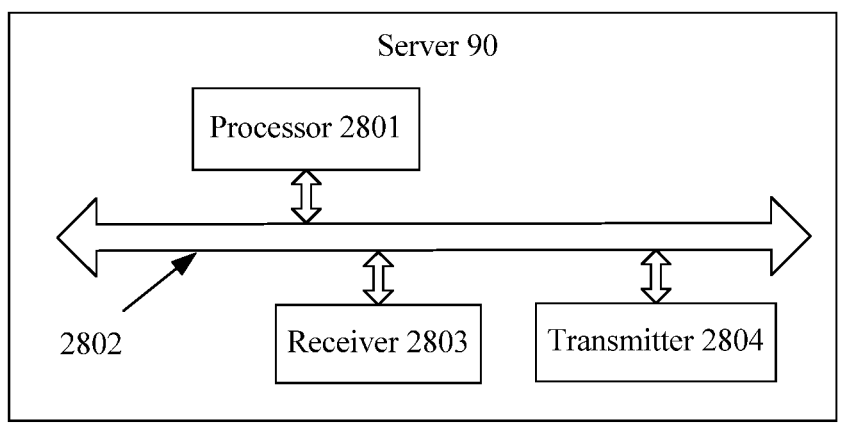
FIG. 28 is a schematic structural diagram of another server according to an embodiment of the present disclosure.

Embodiment 20 of the present disclosure provides a server 90. The server 90 is configured to provide a data service for UE. Referring to FIG. 28, the server 90 may include at least one processor 2801, at least one communications bus 2802 configured to implement connections and mutual communication between apparatuses, a receiver 2803, and a transmitter 2804.

The communications bus 2802 may be an ISA bus, a PCI bus, an EISA bus, or the like. The bus 2802 may be categorized as an address bus, a data bus, a control bus, or the like, which does not mean that only one bus or one type of bus exists.

The processor 2801 may be a CPU or an ASIC, or is configured as one or more integrated circuits for implementing this embodiment of the present disclosure.

The receiver 2803 is configured to receive a first notification message sent by a PCRF, where the first notification message is sent using the PCRF by a second network-side device instructed by a first network-side device when the first network-side device determines that a data service switch of the UE is turned off, or the first notification message is sent using the PCRF when a third network-side device determines that a data service switch of the UE is turned off, the first notification message includes first instruction information and an identity of the UE, and the first instruction information instructs the server 90 to stop sending downlink data packets to the UE.

The transmitter 2804 is configured to stop sending the downlink data packets to the UE according to the first notification message received by the receiver 2803.

Further, the receiver 2803 may be further configured to receive a second notification message sent by the PCRF, where the second notification message is sent using the PCRF by the second network-side device instructed by the first network-side device if the first network-side device determines that the data service switch of the UE is turned on after the first network-side device determines that the data service switch of the UE is turned off, or the second notification message is sent using the PCRF if the third network-side device determines that the data service switch of the UE is turned on after the third network-side device determines that the data service switch of the UE is turned off, the second notification message includes second instruction information and the identity of the UE, and the second instruction information instructs the server to resume sending the downlink data packets to the UE.

The transmitter 2804 may be further configured to resume sending the downlink data packets to the UE according to the second notification message received by the receiver 2803.

This embodiment of the present disclosure provides a server 90. The server 90 receives a first notification message sent by a PCRF, where the first notification message is sent using the PCRF by a second network-side device instructed by a first network-side device when the first network-side device determines that a data service switch of UE is turned off, or the first notification message is sent using the PCRF when a third network-side device determines that a data service switch of UE is turned off, the first notification message includes first instruction information and an identity of the UE, and the first instruction information instructs the server to stop sending downlink data packets to the UE, and the server 90 stops sending the downlink data packets to the UE according to the first notification message. Because the first notification message is sent using the PCRF by the second network-side device instructed by the first network-side device when the first network-side device determines that the data service switch of the UE is turned off, or the first notification message is sent using the PCRF when the third network-side device determines that the data service switch of the UE is turned off, the server stops sending the downlink data packets to the UE after the data service switch of the UE is turned off. Because the server stops sending the downlink data packets to the UE after the data service switch of the UE is turned off, this avoids generating an unnecessary data usage fee for the UE and further avoids data usage waste, and resolves a problem in the prior art that after a data service switch of UE is turned off, there is data usage waste because an unnecessary data usage fee may be generated for the UE.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

The integrated unit may be stored in a computer-readable storage medium when the foregoing integrated unit is implemented in a form of a software functional unit. The software functional unit is stored in a storage medium and includes several instructions for instructing a computer device (which may be a personal computer, a server, or a network device) to perform some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A first network-side device, comprising:
a processor configured to determine a status of a data service switch of user equipment (UE) that is already registered with a network, the status of the data service switch indicating the data service switch is turned on or the data service switch is turned off based on an uplink data packet received by the first network-side device from the UE; and
a transmitter coupled to the processor and configured to send a first notification message comprising first instruction information and an identity of the UE to a second network-side device when the data service switch of the UE is turned off, the first instruction information instructing the second network-side device to skip charging for data packets destined for the UE and flowing through the second network-side device, the data packets destined for the UE comprising at least one of downlink data packets or uplink data packets.

2. The first network-side device according to claim 1, further comprising a receiver coupled to the processor and configured to receive the downlink data packets from the second network-side device to the UE, when the data service switch of the UE being turned off, and the receiver receives the downlink data packets from the second network-side device to the UE, and the transmitter being further configured to:
send a downlink data packet used for Internet Protocol (IP) management to the UE; and
discard downlink data packets except the downlink data packet used for IP management.

3. The first network-side device according to claim 1, wherein the transmitter is further configured to send a second notification message to the second network-side device when the data service switch of the UE is turned off, the second notification message comprising second instruction information and the identity of the UE, and the second instruction information in instructing the second network-side device using a policy and charging rules function (PCRF) to notify a server providing a data service to stop sending the downlink data packets to the UE.

4. The first network-side device according to claim 1, wherein the transmitter is further configured to send a third notification message comprising third instruction information and the identity of the UE to the second network-side device after sending the first notification message to the second network-side device, the third instruction information instructing the second network-side device to charge for the data packets of the UE flowing through the second network-side device.

5. The first network-side device according to claim 2, wherein after sending the downlink data packet used for IP management to the UE and discarding the downlink data packets except the downlink data packet used for IP management, the transmitter is further configured to send the downlink data packets except the downlink data packet used for IP management to the UE when the data service switch of the UE is turned back on.

6. The first network-side device according to claim 3, wherein the transmitter is further configured to send a fourth notification message comprising fourth instruction information and the identity of the UE to the second network-side device after sending the second notification message to the second network-side device, the fourth instruction information instructing the second network-side device using the PCRF to notify the server providing the data service to resume sending the downlink data packets to the UE.

7. The first network-side device according to claim 1, further comprising a receiver coupled to the processor and configured to receive the uplink data packet from the UE, and wherein the processor is further configured to:
determine whether the receiver receives the uplink data packet from the UE within a preset duration, the preset duration being longer than or equal to a duration of a heartbeat packet interval of the UE;
determine that the data service switch of the UE is turned off when the receiver does not receive the uplink data packet from the UE within a preset duration; and
determine that the data service switch of the UE is turned on after determining that the data service switch of the UE is turned off and when the receiver receives the uplink data packet from the UE.

8. The first network-side device according to claim 7, wherein the processor is further configured to:
restart a timing of the preset duration after the timing of the preset duration ends when the receiver receives the uplink data packet from the UE within the preset duration; and
restart the timing of the preset duration at the time of receiving the uplink data packet from the UE when the receiver receives the uplink data packet from the UE within the preset duration.

9. A second network-side device, comprising:
a receiver configured to receive a first notification message from a first network-side device in response to determining that a data service switch of user equipment (UE) is turned off based on an uplink data packet received by the first network-side device from the UE, the first notification message comprising first instruction information and an identity of the UE, the first instruction information instructing the second network-side device to skip charging for data packets destined for the UE and flowing through the second network-side device, the data packets destined for the UE comprising at least one of downlink data packets or uplink data packets; and
a processor coupled to the receiver and configured to skip charging for the data packets destined for the UE and flowing through the second network-side device according to the first notification message.

10. The second network-side device according to claim 9, wherein either the processor is further configured to ignore a policy control and charging (PCC) policy according to the first notification message and directly skip charging for the data packets destined for the UE and flowing through the second network-side device, or
the second network-side device further comprises a transmitter coupled to the processor and configured to send a second notification message to a policy and charging rules function (PCRF) according to the first notification message, the second notification message comprising second instruction information and the identity of the UE, and the second instruction information instructing the PCRF to use a preset non-charging PCC policy for the UE.

11. The second network-side device according to claim 9, wherein the receiver is further configured to receive a third notification message from the first network-side device the data service switch of the UE being turned off, the third notification message comprising third instruction information and the identity of the UE, the third instruction information instructs the second network-side device to notify, using a policy and charging rules function (PCRF), a server providing a data service to stop sending the downlink data packets to the UE using a policy and charging rules function (PCRF), and the second network-side device further comprises a transmitter coupled to the processor and configured to send a fourth notification message to the PCRF according to the third notification message, the fourth notification message comprising fourth instruction information and the identity of the UE, the fourth instruction information instructing the PCRF to notify the server providing the data service to stop sending the downlink data packets to the UE.

12. The second network-side device according to claim 9, wherein the receiver is further configured to receive a fifth notification message from the first network-side device when the data service switch of the UE being turned on after the first network-side device sends the first notification message, the fifth notification message comprising fifth instruction information and the identity of the UE, the fifth instruction information instructing the second network-side device to charge for the data packets destined for the UE and flowing through the second network-side device, and the processor is further configured to charge for the data packets destined for the UE and flowing through the second network-side device according to the fifth notification message.

13. A method for implementing a data service at a first network-side device, comprising:
 determining a status of a data service switch of user equipment (UE) that is already registered with a network, the status of the data service switch indicating the data service switch is turned on or the data service switch is turned off based on an uplink data packet received by the first network-side device from the UE; and
 sending a first notification message comprising first instruction information and an identity of the UE to a second network-side device when the data service switch of the UE is turned off, the first instruction information instructing the second network-side device to skip charging for data packets destined for the UE and flowing through the second network-side device, the data packets destined for the UE comprising at least one of downlink data packets or uplink data packets.

14. The method for implementing the data service according to claim 13, wherein when the data service switch of the UE is turned off and when receiving the downlink data packets from the second network-side device to the UE, the method further comprises:
 sending a downlink data packet used for Internet Protocol (IP) management to the UE; and
 discarding downlink data packets except the downlink data packet used for IP management.

15. The method for implementing the data service according to claim 13, further comprising sending a second notification message to the second network-side device when the data service switch of the UE is turned off, the second notification message comprising second instruction information and the identity of the UE, the second instruction information instructing the second network-side device using a policy and charging rules function (PCRF) to notify a server providing the data service to stop sending the downlink data packets to the UE.

16. The method for implementing the data service according to claim 13, wherein after sending the first notification message to the second network-side device, the method further comprises sending a third notification message comprising third instruction information and the identity of the UE to the second network-side device and the third instruction information instructing the second network-side device to charge for the data packets destined for the UE and flowing through the second network-side device.

17. The method for implementing the data service according to claim 14, wherein after sending the downlink data packet used for IP management to the UE and discarding the downlink data packets except the downlink data packet used for IP management, the method further comprises sending the downlink data packets to the UE when the data service switch of the UE is turned back on.

18. The method for implementing the data service according to claim 15, wherein after sending the second notification message to the second network-side device, the method further comprises sending a fourth notification message comprising fourth instruction information and the identity of the UE to the second network-side device, the fourth instruction information instructing the second network-side device using the PCRF to notify the server providing the data service to resume sending the downlink data packets to the UE.

19. The method for implementing the data service according to claim 13, wherein determining the status of the data service switch of UE comprises:
 determining whether the uplink data packet from the UE is received within a preset duration that is longer than or equal to a duration of a heartbeat packet interval of the UE;
 determining that the data service switch of the UE is turned off when the uplink data packet from the UE is not received within the preset duration; and
 determining that the data service switch of the UE is turned on after determining that the data service switch of the UE is turned off and when the uplink data packet from the UE is received.

20. The method for implementing the data service according to claim 19, wherein the method further comprises:
 restarting a timing of the preset duration after the timing of the preset duration ends when the uplink data packet from the UE is received within the preset duration; and
 restarting the timing of the preset duration at the time of receiving the uplink data packet from the UE when the uplink data packet from the UE is received within the preset duration.

* * * * *

UNITED STATES PATENT AND TRADEMARK OFFICE
CERTIFICATE OF CORRECTION

PATENT NO. : 10,225,412 B2
APPLICATION NO. : 15/429495
DATED : March 5, 2019
INVENTOR(S) : Weiwei Chong et al.

Page 1 of 1

It is certified that error appears in the above-identified patent and that said Letters Patent is hereby corrected as shown below:

In the Specification

Column 83, Line 38: "information in instructing" should read "information instructing"

In the Claims

Column 85, Line 1: delete "using a policy and charging rules function (PCRF)"

Signed and Sealed this
Fifth Day of November, 2019

Andrei Iancu
*Director of the United States Patent and Trademark Office*